US012542373B2

(12) United States Patent
Leung et al.

(10) Patent No.: US 12,542,373 B2
(45) Date of Patent: Feb. 3, 2026

(54) TWO-DIMENSIONAL MICROSTRIP PATCH ANTENNAS AND ARRAYS WITH RADIATION PATTERN DECOUPLING

(71) Applicant: City University of Hong Kong, Kowloon (HK)

(72) Inventors: Kwok Wa Leung, Kowloon Tong (HK); Guangyao Liu, Kowloon Tong (HK); Nan Yang, Guangzhou (CN); Kwai Man Luk, Kowloon Tong (HK)

(73) Assignee: City University of Hong Kong, Kowloon (HK)

( * ) Notice: Subject to any disclaimer, the term of this patent is extended or adjusted under 35 U.S.C. 154(b) by 75 days.

(21) Appl. No.: 18/648,999

(22) Filed: Apr. 29, 2024

(65) Prior Publication Data

US 2025/0337174 A1 Oct. 30, 2025

(51) Int. Cl.
*H01Q 9/04* (2006.01)
*H01Q 21/06* (2006.01)
*H01Q 9/06* (2006.01)

(52) U.S. Cl.
CPC ......... *H01Q 21/065* (2013.01); *H01Q 9/0414* (2013.01); *H01Q 9/0485* (2013.01); *H01Q 9/065* (2013.01)

(58) Field of Classification Search
CPC .. H01Q 9/0407; H01Q 9/0414; H01Q 9/0428; H01Q 9/0457; H01Q 9/0485; H01Q 9/523; H01Q 21/065
See application file for complete search history.

(56) References Cited

U.S. PATENT DOCUMENTS

| | | | | |
|---|---|---|---|---|
| 11,616,300 | B1 * | 3/2023 | Bastin | H01Q 1/48 343/848 |
| 2005/0253764 | A1 * | 11/2005 | Lee | H01Q 21/0075 343/757 |
| 2017/0084990 | A1 | 3/2017 | Le Thuc et al. | |
| 2019/0165476 | A1 * | 5/2019 | Hong | H01Q 21/065 |
| 2019/0273325 | A1 * | 9/2019 | Ryoo | H01Q 21/067 |
| 2020/0014113 | A1 * | 1/2020 | Asaka | H01Q 9/0414 |

(Continued)

FOREIGN PATENT DOCUMENTS

| | | |
|---|---|---|
| CN | 214099909 | 8/2021 |
| CN | 116191014 | 5/2023 |
| WO | 2020048042 | 3/2020 |

OTHER PUBLICATIONS

C. E. Shannon, "A mathematical theory of communication," Bell Syst. Tech. J., vol. 27, No. 3, pp. 379-423, Jul. 1948.

(Continued)

*Primary Examiner* — Tung X Le
(74) *Attorney, Agent, or Firm* — Renner, Kenner, Greive, Bobak, Taylor & Weber

(57) ABSTRACT

A microstrip antenna which includes a substrate, a ground on a second side of the substrate, a first patch on a first side of the substrate, and a second patch on the first side of the substrate. The first patch is connected to a first port. The second patch is separated from the first patch and connected to a second port. Each of the first and second patches is further formed with a plurality of shorting vias connected to the ground. The radiation patterns of each element also feature the RPD characteristic, which is promising for large-scale MIMO or array antennas.

19 Claims, 31 Drawing Sheets

(56) References Cited

U.S. PATENT DOCUMENTS

| | | | | |
|---|---|---|---|---|
| 2020/0044329 | A1 | 2/2020 | Wu et al. | |
| 2020/0328518 | A1* | 10/2020 | Park | H01Q 21/065 |
| 2021/0151898 | A1* | 5/2021 | Han | H01Q 9/0414 |
| 2022/0376397 | A1* | 11/2022 | Ott | H01Q 21/08 |
| 2023/0138099 | A1 | 5/2023 | Li et al. | |

OTHER PUBLICATIONS

C. Tong, N. Yang, K. W. Leung, Z. Wu and K. Lu, "H-Plane Radiation Pattern Decoupled Patch Antennas with Zero Edge-to-Edge Spacing Using Three-Pair Vias," TENCON 2022—2022 IEEE Region 10 Conference (TENCON), Hong Kong, Hong Kong, 2022, pp. 1-3, doi: 10.1109/TENCON55691.2022.9977581.

H. Wang, "Overview of future antenna design for mobile terminals," Engineering, vol. 11, No. 5, pp. 12-14, Apr. 2022.

D. Chen et al., "A Polarization Programmable Antenna Array," Engineering, vol. 16, No. 15, pp. 100-114, Sep. 2022.

Z. X. Wang et al., "A Planar 4-Bit Reconfigurable Antenna Array Based on the Design Philosophy of Information Metasurfaces," Engineering, vol. 17, No. 10, pp. 64-74, Oct. 2022.

Y. Fang and Y. P. Zhang, "Theory and Experiment on Stacked Circular Microstrip Patch Antennas for Low-Coupling Array Design," IEEE Antennas Wireless Propag. Lett., vol. 21, No. 4, pp. 705-709, Apr. 2022.

M. Li, M. Y. Jamal, L. Jiang and K. L. Yeung, "Isolation Enhancement for MIMO Patch Antennas Sharing a Common Thick Substrate: Using a Dielectric Block to Control Space-Wave Coupling to Cancel Surface-Wave Coupling," IEEE Trans. Antennas Propag., vol. 69, No. 4, pp. 1853-1863, Apr. 2021.

C. Yang, K. Lu and K. W. Leung, "Dielectric Decoupler for Compact MIMO Antenna Systems," IEEE Trans. Antennas Propag., vol. 70, No. 8, pp. 6444-6454, Aug. 2022.

Y.-M. Zhang and S. Zhang, "A Side-Loaded-Metal Decoupling Method for 2×N Patch Antenna Arrays," IEEE Antennas Wireless Propag. Lett., vol. 20, No. 5, pp. 668-672, May 2021.

H. Xu, H. Zhou, S. Gao, H. Wang and Y. Cheng, "Multimode Decoupling Technique With Independent Tuning Characteristic for Mobile Terminals," IEEE Trans. Antennas Propag., vol. 65, No. 12, pp. 6739-6751, Dec. 2017.

J. Jiang, Y. Xia and Y. Li, "High isolated X-band mimo array using novel wheel-like metamaterial decoupling structure," Appl. Comput. Electromagn. Soc. J., vol. 34, No. 12, pp. 1829-1836, 2019.

L. Zhang, S. Zhang, Z. Song, Y. Liu, L. Ye and Q. H. Liu, "Adaptive Decoupling Using Tunable Metamaterials," IEEE Trans. Microw. Theory Tech., vol. 64, No. 9, pp. 2730-2739, Sep. 2016.

K.-L. Wu, C. Wei, X. Mei and Z.-Y. Zhang, "Array-Antenna Decoupling Surface," IEEE Trans. Antennas Propag., vol. 65, No. 12, pp. 6728-6738, Dec. 2017.

F. Liu, J. Guo, L. Zhao, X. Shen and Y. Yin, "A Meta-Surface Decoupling Method for Two Linear Polarized Antenna Array in Sub-6 GHz Base Station Applications," IEEE Access, vol. 7, pp. 2759-2768, Dec. 2018.

X. Yang, Y. Liu, Y.-X. Xu and S.-x. Gong, "Isolation Enhancement in Patch Antenna Array With Fractal UC-EBG Structure and Cross Slot," IEEE Antennas Wireless Propag. Lett., vol. 16, pp. 2175-2178, May 2017.

Y. Yu, Z. Chen, C. Zhao, H. Liu, Y. Wu, W. Yan and K. Kai, "A 39 GHz Dual-Channel Transceiver Chipset with an Advanced LTCC Package for 5G Multi-Beam MIMO Systems," Engineering, vol. 22, No. 15, pp. 125-140, Mar. 2023.

Y.-F. Cheng, X. Ding, W. Shao and B.-Z. Wang, "Reduction of Mutual Coupling Between Patch Antennas Using a Polarization-Conversion Isolator," IEEE Antennas Wireless Propag. Lett., vol. 16, pp. 1257-1260, Nov. 2016.

K. D. Xu, J. Zhu, S. Liao and Q. Xue, "Wideband Patch Antenna Using Multiple Parasitic Patches and Its Array Application With Mutual Coupling Reduction," IEEE Access, vol. 6, pp. 42497-42506, Jul. 2018.

H. H. Tran and N. Nguyen-Trong, "Performance Enhancement of MIMO Patch Antenna Using Parasitic Elements," IEEE Access, vol. 9, pp. 30011-30016, Feb. 2021.

K. Wei, J.-Y. Li, L. Wang, Z.-J. Xing and R. Xu, "Mutual Coupling Reduction by Novel Fractal Defected Ground Structure Bandgap Filter," IEEE Trans. Antennas Propag., vol. 64, No. 10, pp. 4328-4335, Oct. 2016.

M. Li, L. Jiang and K. L. Yeung, "A General and Systematic Method to Design Neutralization Lines for Isolation Enhancement in MIMO Antenna Arrays," IEEE Trans. Veh. Technol., vol. 69, No. 6, pp. 6242-6253, Jun. 2020.

S. Zhang and G. F. Pedersen, "Mutual Coupling Reduction for UWB MIMO Antennas With a Wideband Neutralization Line," IEEE Antennas Wireless Propag. Lett., vol. 15, pp. 166-169, May 2015.

B. C. Pan and T. J. Cui, "Broadband Decoupling Network for Dual-Band Microstrip Patch Antennas," IEEE Trans. Antennas Propag., vol. 65, No. 10, pp. 5595-5598, Oct. 2017.

X.-J. Zou, G.-M. Wang, Y.-W. Wang and H.-P. Li, "An Efficient Decoupling Network Between Feeding Points for Multielement Linear Arrays," IEEE Trans. Antennas Propag., vol. 67, No. 5, pp. 3101-3108, May 2019.

Y.-M. Zhang, S. Zhang, J.-L. Li and G. F. Pedersen, "A Transmission-Line-Based Decoupling Method for MIMO Antenna Arrays," IEEE Trans. Antennas Propag., vol. 67, No. 5, pp. 3117-3131, May 2019.

L. Sun, Y. Li, Z. Zhang and H. Wang, "Antenna Decoupling by Common and Differential Modes Cancellation," IEEE Trans. Antennas Propag., vol. 69, No. 2, pp. 672-682, Feb. 2021.

Q. X. Lai, Y. M. Pan, S. Y. Zheng and W. J. Yang, "Mutual Coupling Reduction in MIMO Microstrip Patch Array Using TM10 and TM02 Modes," IEEE Trans. Antennas Propag., vol. 69, No. 11, pp. 7562-7571, Nov. 2021.

H. Lin, Q. Chen, Y. Ji, X. Yang, J. Wang and L. Ge, "Weak-Field-Based Self-Decoupling Patch Antennas," IEEE Trans. Antennas Propag., vol. 68, No. 6, pp. 4208-4217, Jun. 2020.

H. Do, N. Lee and A. Lozano, "Reconfigurable ULAs for Line-of-Sight MIMO Transmission," IEEE Trans. Wirel. Commun., vol. 20, No. 5, pp. 2933-2947, May 2021.

B. Liu, X. Chen, J. Tang, A. Zhang and A. A. Kishk, "Co- and Cross-Polarization Decoupling Structure With Polarization Rotation Property Between Linearly Polarized Dipole Antennas With Application to Decoupling of Circularly Polarized Antennas," IEEE Trans. Antennas Propag., vol. 70, No. 1, pp. 702-707, Jan. 2022.

E. G. Larsson, O. Edfors, F. Tufvesson and T. L. Marzetta, "Massive MIMO for next generation wireless systems," IEEE Commun. Mag., vol. 52, No. 2, pp. 186-195, Feb. 2014.

J. Sui and K.-L. Wu, "A Self-Decoupled Antenna Array Using Inductive and Capacitive Couplings Cancellation," IEEE Trans. Antennas Propag., vol. 68, No. 7, pp. 5289-5296, Jul. 2020.

K.-L. Wong, J.-Z. Chen and W.-Y. Li, "Four-Port Wideband Annular-Ring Patch Antenna Generating Four Decoupled Waves for 5G Multi-Input-Multi-Output Access Points," IEEE Trans. Antennas Propag., vol. 69, No. 5, pp. 2946-2951, May 2021.

Y.-S. Wu, Q.-X. Chu and H.-Y. Huang, "Electromagnetic Transparent Antenna With Slot-Loaded Patch Dipoles in Dual-Band Array," IEEE Trans. Antennas Propag., vol. 70, No. 9, pp. 7989-7998, Sep. 2022.

Y. M. Pan, Y. Hu and S. Y. Zheng, "Design of Low Mutual Coupling Dielectric Resonator Antennas Without Using Extra Decoupling Element," IEEE Trans. Antennas Propag., vol. 69, No. 11, pp. 7377-7385, Nov. 2021.

Y.-L. Chang and Q.-X. Chu, "Suppression of Cross-Band Coupling Interference in Tri-Band Shared-Aperture Base Station Antenna," IEEE Trans. Antennas Propag., vol. 70, No. 6, pp. 4200-4214, Jun. 2022.

C. Tong, N. Yang, K. W. Leung, P. Gu and R. Chen, "Port and Radiation Pattern Decoupling of Dielectric Resonator Antennas," IEEE Trans. Antennas Propag., vol. 70, No. 9, pp. 7713-7726, Sep. 2022.

Y.-F. Cheng, J. Liu, C. Wei, W.-J. Wu, L. Sun and G. Wang, "Interplanted Patch-Monopole Array With Enhanced Isolation," IEEE Antennas Wireless Propag. Lett., vol. 21, No. 8, pp. 1664-1668, Aug. 2022.

(56) References Cited

OTHER PUBLICATIONS

J. Guo, F. Liu, L. Zhao, Y. Yin, G.-L. Huang and Y. Li, "Meta-Surface Antenna Array Decoupling Designs for Two Linear Polarized Antennas Coupled in H-Plane and E-Plane," IEEE Access, vol. 7, pp. 100442-100452, Jul. 2019.
Y. Zhu, Y. Chen and S. Yang, "Helical Torsion Coaxial Cable for Dual-Band Shared-Aperture Antenna Array Decoupling," IEEE Trans. Antennas Propag., vol. 68, No. 8, pp. 6128-6135, Aug. 2020.
T. Pei, L. Zhu, J. Wang and W. Wu, "A Low-Profile Decoupling Structure for Mutual Coupling Suppression in MIMO Patch Antenna," IEEE Trans. Antennas Propag., vol. 69, No. 10, pp. 6145-6153, Oct. 2021.
L. Sun, Y. Li and Z. Zhang, "Decoupling Between Extremely Closely Spaced Patch Antennas by Mode Cancellation Method," IEEE Trans. Antennas Propag., vol. 69, No. 6, pp. 3074-3083, Jun. 2021.J. Ding and Y. Wang, "A WiFi-based smart home fall detection system using recurrent neural network," IEEE Trans. Consum. Electron., vol. 66, No. 4, pp. 308-317, Nov. 2020.
N.-W. Liu, L. Zhu and W.-W. Choi, "A Differential-Fed Microstrip Patch Antenna With Bandwidth Enhancement Under Operation of TM10 and TM30 Modes," IEEE Trans. Antennas Propag., vol. 65, No. 4, pp. 1607-1614, Apr. 2017.
M. S. Sharawi, "Current Misuses and Future Prospects for Printed Multiple-Input, Multiple-Output Antenna Systems [Wireless Corner]," IEEE Antennas Propag. Mag., vol. 59, No. 2, pp. 162-170, Apr. 2017.
N. Yang, K. W. Leung and N. Wu, "Pattern-Diversity Cylindrical Dielectric Resonator Antenna Using Fundamental Modes of Different Mode Families," IEEE Trans. Antennas Propag., vol. 67, No. 11, pp. 6778-6788, Nov. 2019.
L. Chang, Y. Yu, K. Wei and H. Wang, "Polarization-Orthogonal Co-frequency Dual Antenna Pair Suitable for 5G Mimo Smartphone With Metallic Bezels," IEEE Trans. Antennas Propag., vol. 67, No. 8, pp. 5212-5220, Aug. 2019.
R.-L. Xia, S.-W. Qu, P.-F. Li, Q. Jiang and Z.-P. Nie, "An Efficient Decoupling Feeding Network for Microstrip Antenna Array," IEEE Antennas Wireless Propag. Lett., vol. 14, pp. 871-874, Dec. 2015.
A. Jafargholi, A. Jafargholi and J. H. Choi, "Mutual Coupling Reduction in an Array of Patch Antennas Using CLL Metamaterial Superstrate for MIMO Applications," IEEE Trans. Antennas Propag., vol. 67, No. 1, pp. 179-189, Jan. 2019.
Y.-F. Cheng and K.-K. M. Cheng, "Decoupling of 2×2 MIMO Antenna by Using Mixed Radiation Modes and Novel Patch Element Design," IEEE Trans. Antennas Propag., vol. 69, No. 12, pp. 8204-8213, Dec. 2021.

* cited by examiner

17b

TWO-DIMENSIONAL MICROSTRIP PATCH ANTENNAS AND ARRAYS WITH RADIATION PATTERN DECOUPLING

FIELD OF INVENTION

This invention relates to radiofrequency (RF) devices, and in particular to two-dimensional antennas.

BACKGROUND OF INVENTION

The data throughput of wireless communication systems has been increasing exponentially. To cope with the high data throughput, an antenna array can be used to improve the antenna gain, thus increasing the signal-to-noise (S/N) ratio and therefore the larger channel capacity as explained in Shannon Theorem [1]. The channel capacity can also be increased by using a multiple-input multiple-output (MIMO) antenna that makes use of spatial multiplexing and diversity techniques [2]. In either case, multiple antenna elements are needed as found in many applications, such as the base station, smart home, terminal device, vehicle including aircraft, stadium, and industrial automation, etc. With the rapid development of mobile communications, the number of antenna elements and antenna density are higher than ever, making the antenna mutual coupling a severe problem in array designs [3]-[5]. In general, the mutual coupling will undesirably decrease the S/N ratio of an antenna or MIMO array. Therefore, it is imperative to solve the mutual coupling problem in a multi-antenna design to advance the modern wireless communication system.

Traditionally, based on the dimensions of the decoupling structures, the antenna decoupling techniques can be roughly divided into four categories. Three-dimensional (3-D) decoupling structure can be used to restrict or guide an electromagnetic wave in the free space. This approach has used a superstrate [6], dielectric block [7], [8], conductor wall [9], [10], and metamaterial [11], [12]. For two-dimensional (2-D) decoupling structure, the metasurface [13], [14], electromagnetic band-gap structure [15], [16], polarization-conversion isolator [17], parasitic units [18], [19], and defected ground structure [20] are usually used to suppress the currents that enhance the mutual coupling. The third category is the circuit-based decoupling method. In this method, the neutralization line [21], or transmission-line-based decoupling network [23]-[26] is used to cancel the couplings between the antenna ports. Recently, the self-decoupling method has been proposed. It avoids using a decoupling structure by locating the antenna feed at the point where the fields from other elements are weak [27], [28].

REFERENCES

The following references are referred to throughout this specification, as indicated by the numbered brackets. The disclosures of each of these references are hereby incorporated by reference herein in their entireties for all purposes.

[1] C. E. Shannon, "A mathematical theory of communication," Bell Syst. Tech. J., vol. 27, no. 3, pp. 379-423, July 1948.

[2] D. Tse and P. Viswanath, Fundamentals of Wireless Communication. Cambridge, U.K.: Cambridge Univ. Press, 2005.

[3] H. Wang, "Overview of future antenna design for mobile terminals," Engineering, vol. 11, no. 5, pp. 12-14, April 2022.

[4] D. Chen et al., "A Polarization Programmable Antenna Array," Engineering, vol. 16, no. 15, pp. 100-114, Spt. 2022.

[5] Z. X. Wang et al., "A Planar 4-Bit Reconfigurable Antenna Array Based on the Design Philosophy of Information Metasurfaces," Engineering, vol. 17, no. 10, pp. 64-74, October 2022.

[6] Y. Fang and Y. P. Zhang, "Theory and Experiment on Stacked Circular Microstrip Patch Antennas for Low-Coupling Array Design," IEEE Antennas Wireless Propag. Lett., vol. 21, no. 4, pp. 705-709, April 2022.

[7] M. Li, M. Y. Jamal, L. Jiang and K. L. Yeung, "Isolation Enhancement for MIMO Patch Antennas Sharing a Common Thick Substrate: Using a Dielectric Block to Control Space-Wave Coupling to Cancel Surface-Wave Coupling," IEEE Trans. Antennas Propag., vol. 69, no. 4, pp. 1853-1863 April 2021.

[8] C. Yang, K. Lu and K. W. Leung, "Dielectric Decoupler for Compact MIMO Antenna Systems," IEEE Trans. Antennas Propag., vol. 70, no. 8, pp. 6444-6454 August 2022.

[9] Y.-M. Zhang and S. Zhang, "A Side-Loaded-Metal Decoupling Method for 2×N Patch Antenna Arrays," IEEE Antennas Wireless Propag. Lett., vol. 20, no. 5, pp. 668-672, May 2021.

[10] H. Xu, H. Zhou, S. Gao, H. Wang and Y. Cheng, "Multimode Decoupling Technique With Independent Tuning Characteristic for Mobile Terminals," IEEE Trans. Antennas Propag., vol. 65, no. 12, pp. 6739-6751 December 2017.

[11] J. Jiang, Y. Xia and Y. Li, "High isolated X-band mimo array using novel wheel-like metamaterial decoupling structure," Appl. Comput. Electromagn. Soc. J., vol. 34, no. 12, pp. 1829-1836, 2019.

[12] L. Zhang, S. Zhang, Z. Song, Y. Liu, L. Ye and Q. H. Liu, "Adaptive Decoupling Using Tunable Metamaterials," IEEE Trans. Microw. Theory Tech., vol. 64, no. 9, pp. 2730-2739 September 2016.

[13] K.-L. Wu, C. Wei, X. Mei and Z.-Y. Zhang, "Array-Antenna Decoupling Surface," IEEE Trans. Antennas Propag., vol. 65, no. 12, pp. 6728-6738 December 2017.

[14] F. Liu, J. Guo, L. Zhao, X. Shen and Y. Yin, "A Meta-Surface Decoupling Method for Two Linear Polarized Antenna Array in Sub-6 GHz Base Station Applications," IEEE Access, vol. 7, pp. 2759-2768 December 2018.

[15] X. Yang, Y. Liu, Y.-X. Xu and S.-x. Gong, "Isolation Enhancement in Patch Antenna Array With Fractal UC-EBG Structure and Cross Slot," IEEE Antennas Wireless Propag. Lett., vol. 16, pp. 2175-2178 May 2017.

[16] Y. Yu, Z. Chen, C. Zhao, H. Liu, Y. Wu, W. Yan and K. Kai, "A 39 GHZ Dual-Channel Transceiver Chipset with an Advanced LTCC Package for 5G Multi-Beam MIMO Systems," Engineering, vol. 22, no. 15, pp. 125-140, March 2023.

[17] Y.-F. Cheng, X. Ding, W. Shao and B.-Z. Wang, "Reduction of Mutual Coupling Between Patch Antennas Using a Polarization-Conversion Isolator," IEEE Antennas Wireless Propag. Lett., vol. 16, pp. 1257-1260 November 2016.

[18] K. D. Xu, J. Zhu, S. Liao and Q. Xue, "Wideband Patch Antenna Using Multiple Parasitic Patches and Its Array Application With Mutual Coupling Reduction," IEEE Access, vol. 6, pp. 42497-42506, July 2018.

[19] H. H. Tran and N. Nguyen-Trong, "Performance Enhancement of MIMO Patch Antenna Using Parasitic Elements," IEEE Access, vol. 9, pp. 30011-30016, February 2021.
[20] K. Wei, J.-Y. Li, L. Wang, Z.-J. Xing and R. Xu, "Mutual Coupling Reduction by Novel Fractal Defected Ground Structure Bandgap Filter," IEEE Trans. Antennas Propag., vol. 64, no. 10, pp. 4328-4335 October 2016.
[21] M. Li, L. Jiang and K. L. Yeung, "A General and Systematic Method to Design Neutralization Lines for Isolation Enhancement in MIMO Antenna Arrays," IEEE Trans. Veh. Technol., vol. 69, no. 6, pp. 6242-6253 June 2020.
[22] S. Zhang and G. F. Pedersen, "Mutual Coupling Reduction for UWB MIMO Antennas With a Wideband Neutralization Line," IEEE Antennas Wireless Propag. Lett., vol. 15, pp. 166-169, May 2015.
[23] B. C. Pan and T. J. Cui, "Broadband Decoupling Network for Dual-Band Microstrip Patch Antennas," IEEE Trans. Antennas Propag., vol. 65, no. 10, pp. 5595-5598 October 2017.
[24] X.-J. Zou, G.-M. Wang, Y.-W. Wang and H.-P. Li, "An Efficient Decoupling Network Between Feeding Points for Multielement Linear Arrays," IEEE Trans. Antennas Propag., vol. 67, no. 5, pp. 3101-3108 May 2019.
[25] Y.-M. Zhang, S. Zhang, J.-L. Li and G. F. Pedersen, "A Transmission-Line-Based Decoupling Method for MIMO Antenna Arrays," IEEE Trans. Antennas Propag., vol. 67, no. 5, pp. 3117-3131 May 2019.
[26] L. Sun, Y. Li, Z. Zhang and H. Wang, "Antenna Decoupling by Common and Differential Modes Cancellation," IEEE Trans. Antennas Propag., vol. 69, no. 2, pp. 672-682, February 2021.
[27] Q. X. Lai, Y. M. Pan, S. Y. Zheng and W. J. Yang, "Mutual Coupling Reduction in MIMO Microstrip Patch Array Using TM10 and TM02 Modes," IEEE Trans. Antennas Propag., vol. 69, no. 11, pp. 7562-7571 November 2021.
[28] H. Lin, Q. Chen, Y. Ji, X. Yang, J. Wang and L. Ge, "Weak-Field-Based Self-Decoupling Patch Antennas," IEEE Trans. Antennas Propag., vol. 68, no. 6, pp. 4208-4217 June 2020.
[29] H. Do, N. Lee and A. Lozano, "Reconfigurable ULAs for Line-of-Sight MIMO Transmission," IEEE Trans. Wirel. Commun., vol. 20, no. 5, pp. 2933-2947 May 2021.
[30] B. Liu, X. Chen, J. Tang, A. Zhang and A. A. Kishk, "Co- and Cross-Polarization Decoupling Structure With Polarization Rotation Property Between Linearly Polarized Dipole Antennas With Application to Decoupling of Circularly Polarized Antennas," IEEE Trans. Antennas Propag., vol. 70, no. 1, pp. 702-707, January 2022.
[31] E. G. Larsson, O. Edfors, F. Tufvesson and T. L. Marzetta, "Massive MIMO for next generation wireless systems," IEEE Commun. Mag., vol. 52, no. 2, pp. 186-195, February 2014.
[32] J. Sui and K.-L. Wu, "A Self-Decoupled Antenna Array Using Inductive and Capacitive Couplings Cancellation," IEEE Trans. Antennas Propag., vol. 68, no. 7, pp. 5289-5296 July 2020.
[33] K.-L. Wong, J.-Z. Chen and W.-Y. Li, "Four-Port Wideband Annular-Ring Patch Antenna Generating Four Decoupled Waves for 5G Multi-Input-Multi-Output Access Points," IEEE Trans. Antennas Propag., vol. 69, no. 5, pp. 2946-2951 May 2021.
[34] Y.-S. Wu, Q.-X. Chu and H.-Y. Huang, "Electromagnetic Transparent Antenna With Slot-Loaded Patch Dipoles in Dual-Band Array," IEEE Trans. Antennas Propag., vol. 70, no. 9, pp. 7989-7998 September 2022.
[35] Y. M. Pan, Y. Hu and S. Y. Zheng, "Design of Low Mutual Coupling Dielectric Resonator Antennas Without Using Extra Decoupling Element," IEEE Trans. Antennas Propag., vol. 69, no. 11, pp. 7377-7385 November 2021.
[36] Y.-L. Chang and Q.-X. Chu, "Suppression of Cross-Band Coupling Interference in Tri-Band Shared-Aperture Base Station Antenna," IEEE Trans. Antennas Propag., vol. 70, no. 6, pp. 4200-4214 June 2022.
[37] C. Tong, N. Yang, K. W. Leung, P. Gu and R. Chen, "Port and Radiation Pattern Decoupling of Dielectric Resonator Antennas," IEEE Trans. Antennas Propag., vol. 70, no. 9, pp. 7713-7726 September 2022.
[38] Y.-F. Cheng, J. Liu, C. Wei, W.-J. Wu, L. Sun and G. Wang, "Interplanted Patch-Monopole Array With Enhanced Isolation," IEEE Antennas Wireless Propag. Lett., vol. 21, no. 8, pp. 1664-1668 August 2022.
[39] J. Guo, F. Liu, L. Zhao, Y. Yin, G.-L. Huang and Y. Li, "Meta-Surface Antenna Array Decoupling Designs for Two Linear Polarized Antennas Coupled in H-Plane and E-Plane," IEEE Access, vol. 7, pp. 100442-100452, July 2019.
[40] Y. Zhu, Y. Chen and S. Yang, "Helical Torsion Coaxial Cable for Dual-Band Shared-Aperture Antenna Array Decoupling," IEEE Trans. Antennas Propag., vol. 68, no. 8, pp. 6128-6135 August 2020.
[41] T. Pei, L. Zhu, J. Wang and W. Wu, "A Low-Profile Decoupling Structure for Mutual Coupling Suppression in MIMO Patch Antenna," IEEE Trans. Antennas Propag., vol. 69, no. 10, pp. 6145-6153 October 2021.
[42] P. S. Kildal, Foundations of Antenna Engineering: A Unified Approach for Line-of-Sight and Multipath, Norwood, MA, USA: Artech House, 2015.
[43] N.-W. Liu, L. Zhu and W.-W. Choi, "A Differential-Fed Microstrip Patch Antenna With Bandwidth Enhancement Under Operation of TM10 and TM30 Modes," IEEE Trans. Antennas Propag., vol. 65, no. 4, pp. 1607-1614 April 2017.
[44] M. S. Sharawi, "Current Misuses and Future Prospects for Printed Multiple-Input, Multiple-Output Antenna Systems [Wireless Corner]," IEEE Antennas Propag. Mag., vol. 59, no. 2, pp. 162-170, April 2017.
[45] N. Yang, K. W. Leung and N. Wu, "Pattern-Diversity Cylindrical Dielectric Resonator Antenna Using Fundamental Modes of Different Mode Families," IEEE Trans. Antennas Propag., vol. 67, no. 11, pp. 6778-6788 November 2019.
[46] L. Chang, Y. Yu, K. Wei and H. Wang, "Polarization-Orthogonal Co-frequency Dual Antenna Pair Suitable for 5G MIMO Smartphone With Metallic Bezels," IEEE Trans. Antennas Propag., vol. 67, no. 8, pp. 5212-5220 August 2019.
[47] C. A. Balanis, Advanced Engineering Electromagnetics, Hoboken, NJ, USA: Wiley, 2000.
[48] R.-L. Xia, S.-W. Qu, P.-F. Li, Q. Jiang and Z.-P. Nie, "An Efficient Decoupling Feeding Network for Microstrip Antenna Array," IEEE Antennas Wireless Propag. Lett., vol. 14, pp. 871-874, December 2015.
[49] A. Jafargholi, A. Jafargholi and J. H. Choi, "Mutual Coupling Reduction in an Array of Patch Antennas Using CLL Metamaterial Superstrate for MIMO Applications," IEEE Trans. Antennas Propag., vol. 67, no. 1, pp. 179-189, January 2019.
[50] Y.-F. Cheng and K.-K. M. Cheng, "Decoupling of 2×2 MIMO Antenna by Using Mixed Radiation Modes and Novel Patch Element Design," IEEE Trans. Antennas Propag., vol. 69, no. 12, pp. 8204-8213 December 2021.

[51] L. Sun, Y. Li and Z. Zhang, "Decoupling Between Extremely Closely Spaced Patch Antennas by Mode Cancellation Method," IEEE Trans. Antennas Propag., vol. 69, no. 6, pp. 3074-3083 June 2021. J. Ding and Y. Wang, "A WiFi-based smart home fall detection system using recurrent neural network," IEEE Trans. Consum. Electron., vol. 66, no. 4, pp. 308-317, November 2020.

[52] C. Tong, N. Yang, K. W. Leung, Z. Wu and K. Lu, "H-Plane Radiation Pattern Decoupled Patch Antennas with Zero Edge-to-Edge Spacing Using Three-Pair Vias," TENCON 2022-2022 IEEE Region 10 Conference (TENCON), Hong Kong, Hong Kong, 2022, pp. 1-3.

SUMMARY OF INVENTION

Accordingly, the present invention, in one aspect, is a microstrip antenna which includes a substrate, a ground on a second side of the substrate, a first patch on a first side of the substrate, and a second patch on the first side of the substrate. The first patch is connected to a first port. The second patch is separated from the first patch and connected to a second port. Each of the first and second patches is further formed with a plurality of shorting vias connected to the ground.

In some embodiments, the first patch and the second patch each have a rectangular shape.

In some embodiments, the number of the plurality of the shorting vias is four on the first patch or the second patch.

In some embodiments, the plurality of the shorting vias on the first patch defines a rectangular shape nested in the rectangular shape of the first patch. The plurality of the shorting vias on the second patch defines a rectangular shape nested in the rectangular shape of the second patch.

In some embodiments, the first port is not located within the rectangular shape defined by the plurality of the shorting vias on the first patch. The second port is not located within the rectangular shape defined by the plurality of the shorting vias on the second patch.

In some embodiments, on each of the first patch and the second patch, the plurality of the shorting vias is divided into a first pair and a second pair. The first pair and the second pair of shorting vias are symmetrical about a virtual line which passes a corresponding one of the first port and the second port.

In some embodiments, the first patch and the second patch have a same shape and a same dimension.

In some embodiments, relative location of the first port on the first patch is the same as relative location of the second port on the second patch.

In some embodiments, relative locations of the plurality of the shorting vias on the first patch are the same as relative locations of the plurality of the shorting vias on the second patch.

In some embodiments, the first port or the second port is a coaxial probe.

In some embodiments, a slot structure is configured in the ground on the second side of the substrate.

In some embodiments, the slot structure surrounds at least one of the first and second patches.

In some embodiments, the slot structure forms a substantially "H" shape that encloses two sides of the first and second patches that face each other.

In some embodiments, a plurality of patches which includes the first and second patches. The number of the plurality of the patches is a square of N, wherein Nis an integer equal to or larger than two.

In some embodiments, the plurality of the patches is configured on the substrate to form a square shape.

In some embodiments, the microstrip antenna further includes a plurality of dummy elements that surrounds the plurality of the patches.

In some embodiments, a slot structure is configured in the ground on the second side of the substrate.

In some embodiments, the slot structure includes a plurality of periodical cross portions. The cross portions substantially enclose each of the plurality of the patches.

One can see that embodiments of the invention therefore provide a new radiation pattern decoupling (RPD) method that can work for a general m×n array. Notably, the radiation patterns of each antenna element in the array feature the RPD characteristic, which is promising for large-scale MIMO or array antennas. Such RPD method may be used for either H-plane decoupling or E-plane decoupling, and in some embodiments within the same array both H-plane and E-plane decoupling may be achieved at the same time. In some embodiments, the microstrip patches are surrounded by slot structures in the ground of the substrate, which improve port isolations in the array.

In some embodiments, the foregoing summary is neither intended to define the invention of the application, which is measured by the claims, nor is it intended to be limiting as to the scope of the invention in any way.

BRIEF DESCRIPTION OF FIGURES

The foregoing and further features of the present invention will be apparent from the following description of embodiments which are provided by way of example only in connection with the accompanying figures, of which:

FIG. 17*b* shows measured and simulated realized gains and realized radiation efficiencies of the ports of the $5^{th}$ and $6^{th}$ patches of the array in FIG. 14 according to the specific implementation.

In the drawings, like numerals indicate like parts throughout the several embodiments described herein.

DETAILED DESCRIPTION

Almost all existing antenna decoupling methods have focused on port isolation, and the radiation patterns so obtained are usually distorted. This distortion can strongly affect their applications, e.g., the line-of-sight transmission. Thus far, only very little attention has been paid to the radiation pattern. Embodiments of the invention hereby provide a RPD method that can work for a general m×n antenna. Note that the term “antenna” is used herein interchangeably with “antenna array”, and each one of the m×n elements is an antenna element. For example, in a microstrip antenna, each antenna element may be defined by a microstrip patch. The method deploys shorting vias to introduce extra current that cancels out the original coupled current on an antenna element. In the following sections, firstly exemplary embodiments will be described with the RPD method being applied to various 1×2 microstrip antenna (MA) arrays, with the antenna elements operating in their fundamental $TM_{10}$ mode. To analyze the mutual coupling, the arrays are modeled by two Hertzian dipoles. Each MA element (e.g., a microstrip patch) has four shorting vias, which introduce extra current $J_v$ on the MA element. As a result, each MA element has two current components on the patch surface, $J_v$ in additional to the original active patch current $J_a$. Each of these current components will couple the $TM_{10}$-mode fields to an adjacent MA element. When the coupled fields of the two current components are out of phase, the adjacent MA element will have zero net coupled fields, effectively solving the mutual coupling problem. Apart from the 1×2 MIMO arrays, in another exemplary embodiment a 4×4 MIMO array is also described to demonstrate the generality of the RPD method. Measurements were done to verify the simulations, and reasonable agreement is observed for each of the above-described exemplary arrays.

Figure 1A:
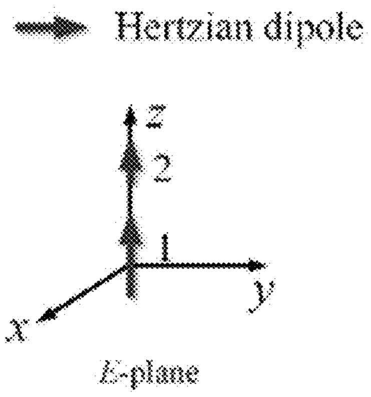
FIG. 1*a* shows a model of two z-directed Hertzian dipole sources as a 1×2 antenna array.
Figure 1B:
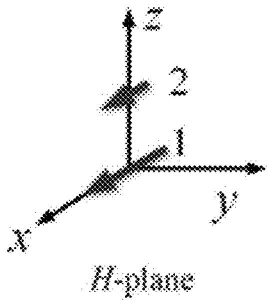
FIG. 1*b* shows a model of two x-directed Hertzian dipole sources as a 1×2 antenna array.

Next, the principle of decoupling used in exemplary embodiments of the invention will be described. When designing a 2-D array, there is a need to suppress both E-plane and H-plane couplings because the couplings will generally affect the radiation pattern of each antenna element, causing the main beam of each element to deviate from its original direction. It is known that all antennas can be modeled by a set of Hertzian dipoles [42]. For simplicity, only the dominating Hertzian dipole is considered here to obtain an approximate solution of the array problem. Therefore, the coupling situation of any two adjacent antenna elements (no matter in what orientation they are aligned with each other) can be simplified as two coupled Hertzian dipoles. FIG. 1*a* and FIG. 1*b* show respectively the E-plane and H-plane 1×2 Hertzian dipole antenna arrays. In both FIGS. 1*a* and 1*b*, Dipole 1 is excited, and its fields are coupled to Dipole 2. To obtain an RPD effect, the maximum radiation direction of dipole antenna should be along the +y-axis for each case. These two dipole sources (both H-plane and E-plane) can be further simplified to the situation as shown in FIG. 1*c*.

Figure 1C:
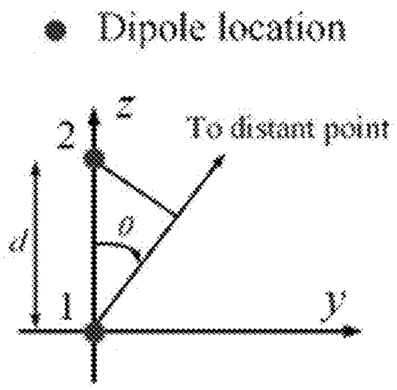
FIG. 1*c* shows a simplified two-dipole-source model for the cases in FIGS. 1*a*) and 1*b*).

In FIG. 1*c*, when Source 1 is excited and denoted as the reference point, the amplitude of its field at a distant point is given by $E_0$. Source 2 is separated from Source 1 by a distance of d, and then coupled with an amplitude attenuation of a (assume $0 \le a < 1$) and a phase delay of δ, and therefore the total field of two-dipole-source model can be given by (1).

$$E = E_0\left(1 + a \cdot e^{j(kd\cos\theta+\delta)}\right) \quad (1)$$

where k is the free-space wavenumber. Then, the RPD problem is changed to find the maximum radiation along θ=90° direction, and the solution is given as follows, $$a = 0, \text{ or } \delta = 0 \quad (2)$$

Figure 2:
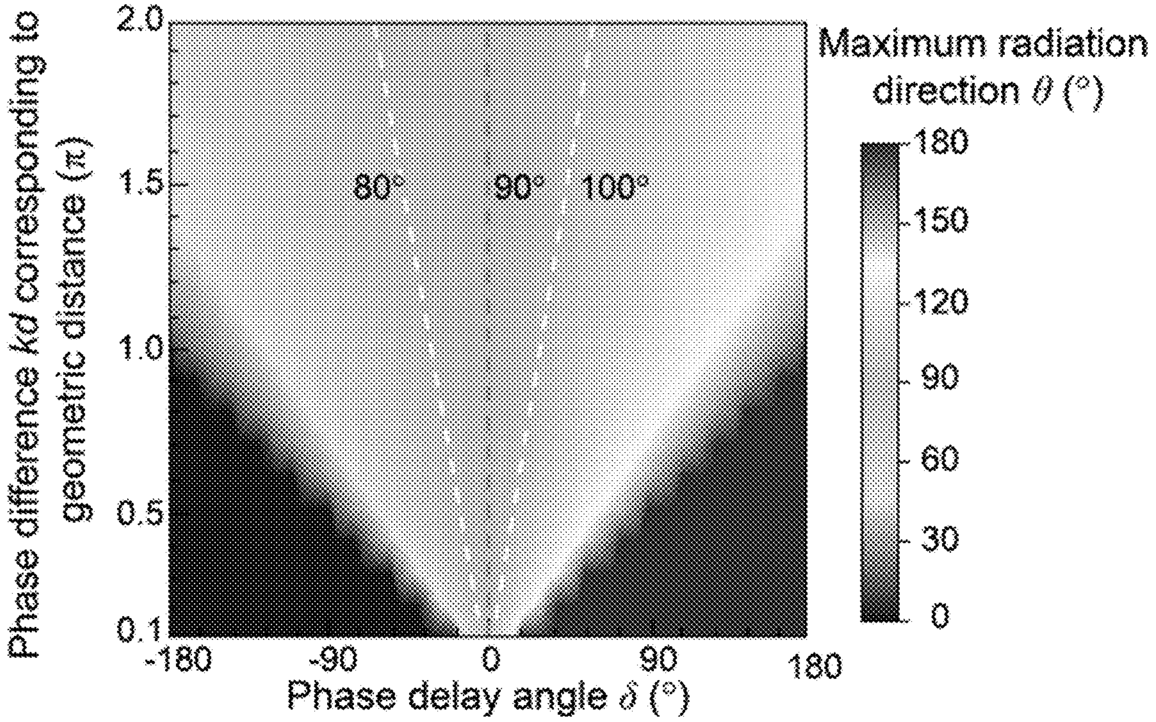
FIG. 2 shows a maximum radiation direction of superposed fields of the two-dipole sources in FIG. 1*c* when a=0.1.
Figure 3:
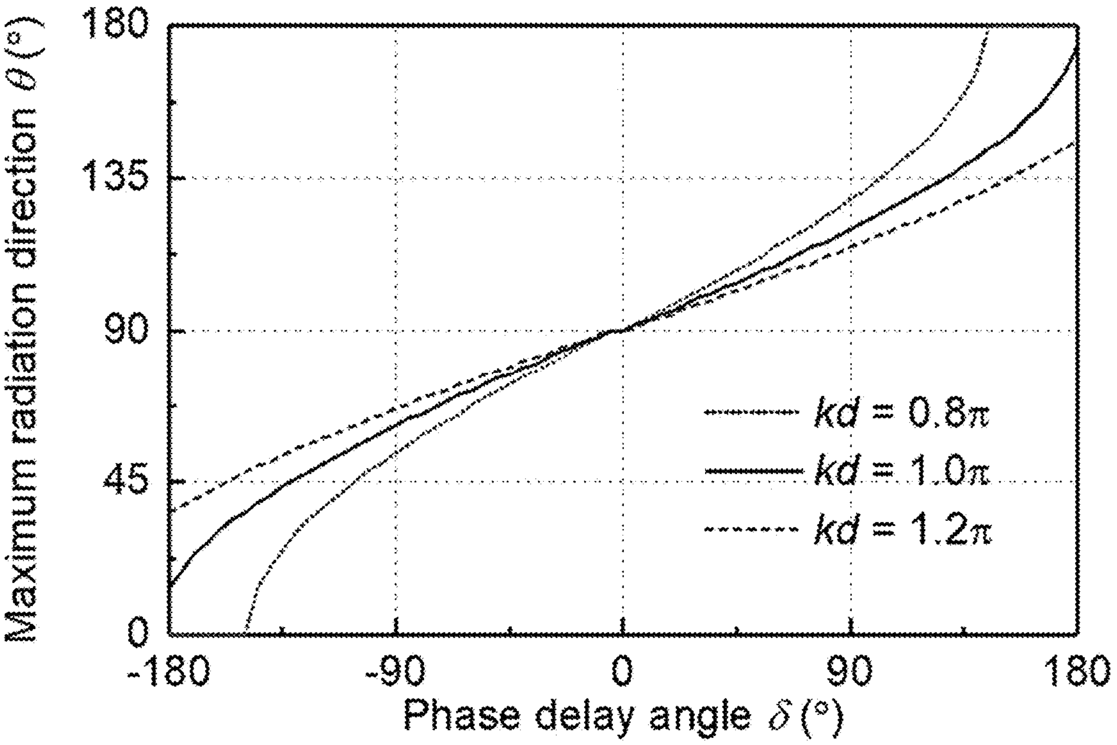
FIG. 3 shows in comparison the maximum radiation direction corresponding to phase difference kd and phase delay angle δ, when kd=0.8π, 1.0π, and 1.2π respectively.

With reference to (2), a=0 implies no coupling E-field, thus resulting in the RPD effect. When a>0, the phase delay δ should be equal to 0. FIG. 2 displays the maximum radiation direction θ as functions of phase difference kd and phase delay angle δ with an assumption of a=0.1. FIG. 3 further shows the maximum radiation direction as a function of δ with specific phase difference kd for ease of understanding. With reference to FIGS. 2-3, it can be observed that the maximum radiation will be along the θ=90° direction only when δ=0, verifying (2).

Figure 4A:
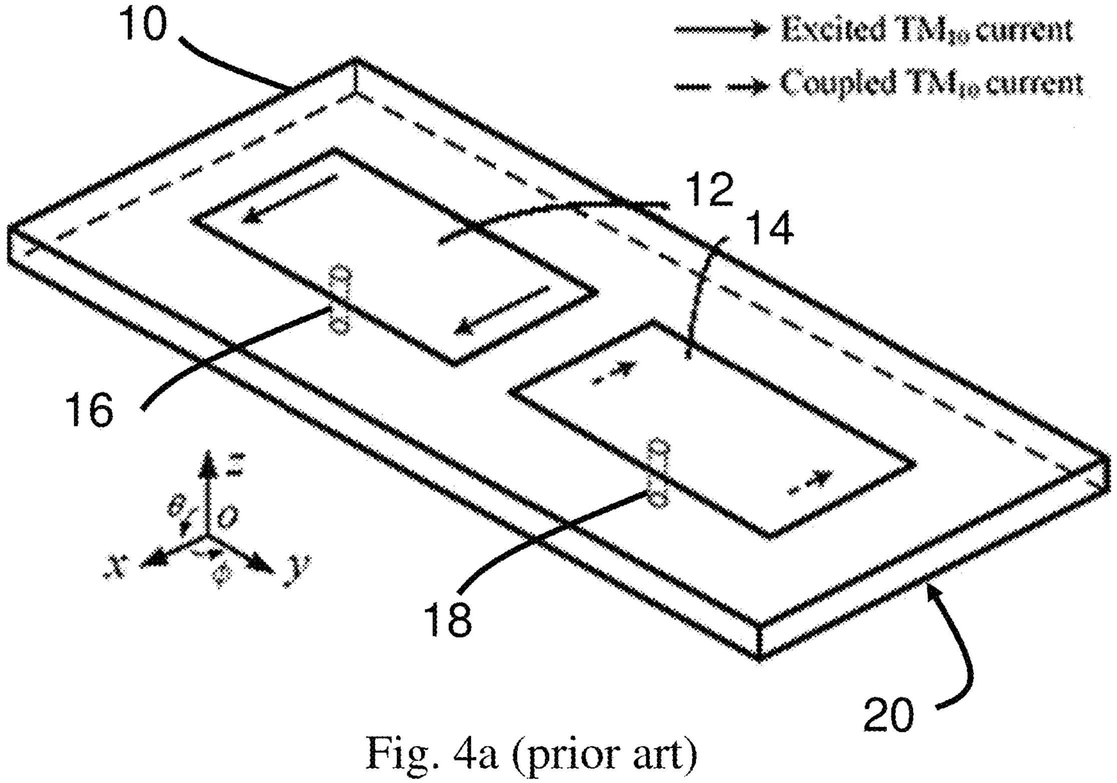
Fig. 4a (prior art)
FIG. 4*a* shows a perspective view of a conventional H-plane-coupled antenna with 1×2 MA elements.

Turning now to FIG. 4*a*, a conventional H-plane-coupled antenna with 1×2 MA elements contains a substrate 10, a first patch 12 on a top side of the substrate 10, and a second patch 14 on the top side of the substrate 10. A material of the substrate 10 may include all dielectric substrate materials used conventionally in the art such as Bakelite, FR4 Glass Epoxy, RO4003, Taconic TLC, RT-Duroid, Teflon, a high-resistance silicon, glass, alumina, low temperature co-fired ceramic (LTCC), air foam, and the like. Each of the first patch 12 and the second patch 14 has a rectangular shape, and they are identical in size and orientation (the orientation being that with respect to the substrate 10). The first patch 12 is separated from the second patch 14 on the substrate 10, and the first patch 12 and the second patch 14 each have one of their short sides facing each other. The substrate 10 as shown in FIG. 4*a* also has a rectangular shape, and the rectangular shapes of the first patch 12 and the second patch 14 are each nested in the rectangular shape of the substrate 10. For instance, in terms of the first patch 12, the rectangular shape of the first patch 12 has the same orientation as that of the substrate 10 (i.e., corresponding sides of the two rectangular shapes are parallel to each other), and the rectangular shape of the first patch 12 has a decreasing size/dimension that fits inside the rectangular shape of the substrate 10. The first patch 12 is connected to a first port 16, and the second patch 14 is connected to a second port 18.

One or both of the first and second ports 16, 18 may be a coaxial probe that for example can be connected to a feeding cable (not shown) with a SMA (SubMiniature version A) connector.

As shown in FIG. 4*a*, relative location of the first port 16 on the first patch 12 is the same as relative location of the second port 18 on the second patch 14. In particular, both the first and second ports 16, 18 are located respectively on the first and second patches 12, 14 near the same long side thereof. As such, the distance between the first port 16 and the closer long side of the substrate 10 is the same as the distance between the second port 18 and the same closer long side of the substrate 10. In addition, both the first and second ports 16, 18 are located with equal distances to the two short sides of the rectangular shape of respectively the first and second patches 12, 14. On a bottom side of the substrate 10, there is a ground plane (not shown). The ground plane and the first and second patches 12, 14 may be formed by the same or different metallization. The antenna shown in FIG. 4*a* works in the fundamental $TM_{10}$ mode, and FIG. 4*a* shows a scenario where the first patch 12 is excited via the first port 16, while the second patch 14 is coupled by the second port 18 connected with a matching load (not shown, e.g., 50Ω), where currents on the excited first patch 12 and the coupled second patch 14 are shown in FIG. 4*a*.

Figure 4B:
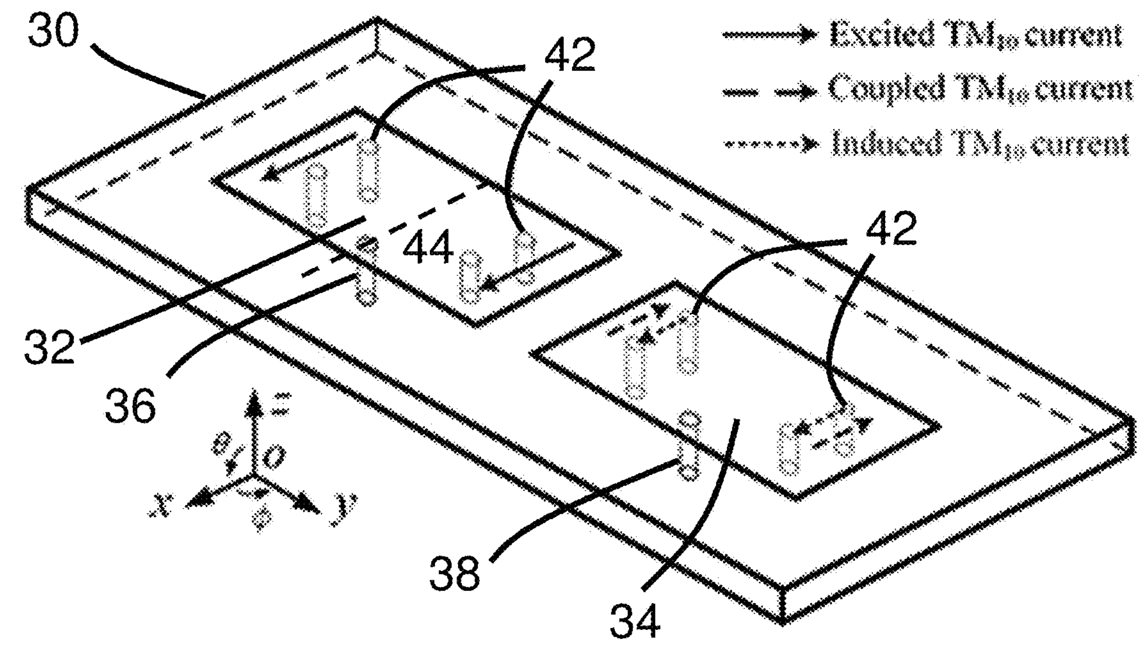
FIG. 4*b* shows a perspective view of a H-plane-decoupled antenna with 1×2 MA elements according to an embodiment of the invention.

FIG. 4*b* shows a H-plane-decoupled antenna with 1×2 MA elements according to an embodiment of the invention, and the antenna in FIG. 4*b* has a structure generally similar to that of the antenna in FIG. 4*a*. Therefore, components and structures that are common or similar in the antennas of FIGS. 4*a* and 4*b* will not be described again for the sake of brevity. Rather, only differences between the two antennas are discussed herein. Compared to the antenna in FIG. 4*a*, the antenna in FIG. 4*b* notably contains a plurality of shorting vias 42 formed on each one of a first patch 32 and a second patch 34. The shorting vias 42 are each adapted to short the first patch 32 or the second patch 34 to a ground plane (not shown) of a substrate 30 on the top surface of which the first patch 32 and the second patch 34 are formed. As shown in FIG. 4*b*, there are four such shorting vias 42 on each of the first patch 32 and the second patch 34, and the four shorting vias 42 define a rectangular shape (with the four shorting vias 42 located at corners of the rectangular shape). The rectangular shape defined by the four shorting vias 42 on the first patch 32 is nested in the rectangular shape of the first patch 32, and the rectangular shape defined by the four shorting vias 42 on the second patch 34 is nested in the rectangular shape of the second patch 34. As shown in FIG. 4*b*, a first port 36 that can be used to excite the first patch 32 is not located within the rectangle defined by the four shorting vias 42 on the first patch 32, and so is a second port 38 on the second patch 34 with respect to the rectangle defined by the four shorting vias 42 on the second patch 34. If a virtual line 44 is defined as being a line that pass through the first port 36 and being normal to the long sides of the first patch 32, then the four shorting vias 42 on the first patch 32 can be divided into two pairs, with a first pair of shorting vias 42 being on a first side of the virtual line 44, and a second pair of shorting vias 42 being on a second side of the virtual line 44. The first pair and the second pair of shorting vias are symmetrical about the virtual line 44. Although not shown, the above spatial relationship also applies to the second port 38 and the four shorting vias 42 on the second patch 34. As such, relative locations of the four shorting vias 42 on the first patch 32 are the same as relative locations of the four shorting vias 42 on the second patch 34.

The four shorting vias 42 on each of the first and second patches 32, 34 form a decoupling structure. With reference to FIG. 4*b*, in a scenario when the first patch 32 is excited and the second patch 34 is coupled, the four shorting vias 42 on the second patch 34 can induce out-of-phase induced current to the coupled current, which will be cancelled to each other with optimal parameters and, consequently, obtain RPD effect. It should be noted that although not shown, if it is the second patch 34 that is excited, and the first patch 32 is coupled, then similar induced currents will be generated on the first patch 32.

In one specific implementation, the first and second patches 32, 34 each have a size of 18.5×31.7 $mm^2$, with their closest sides spaced from each other by 7.0 mm. The thickness and dielectric constant of the substrate 30 are 3.148 mm and 3.55, respectively.

Figure 5A:
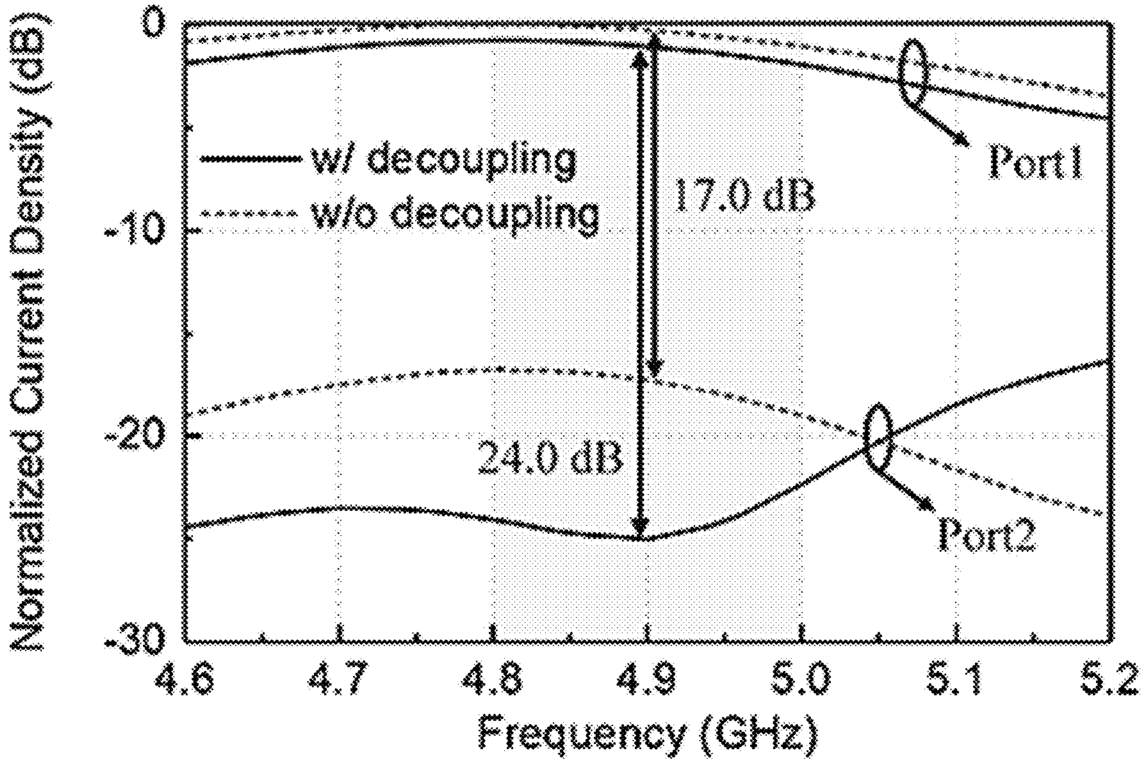
FIG. 5*a* shows simulated average current density on the two patches of the antenna in FIG. 4*b*, as compared to that of the antenna in FIG. 4*a*.
Figure 5B:
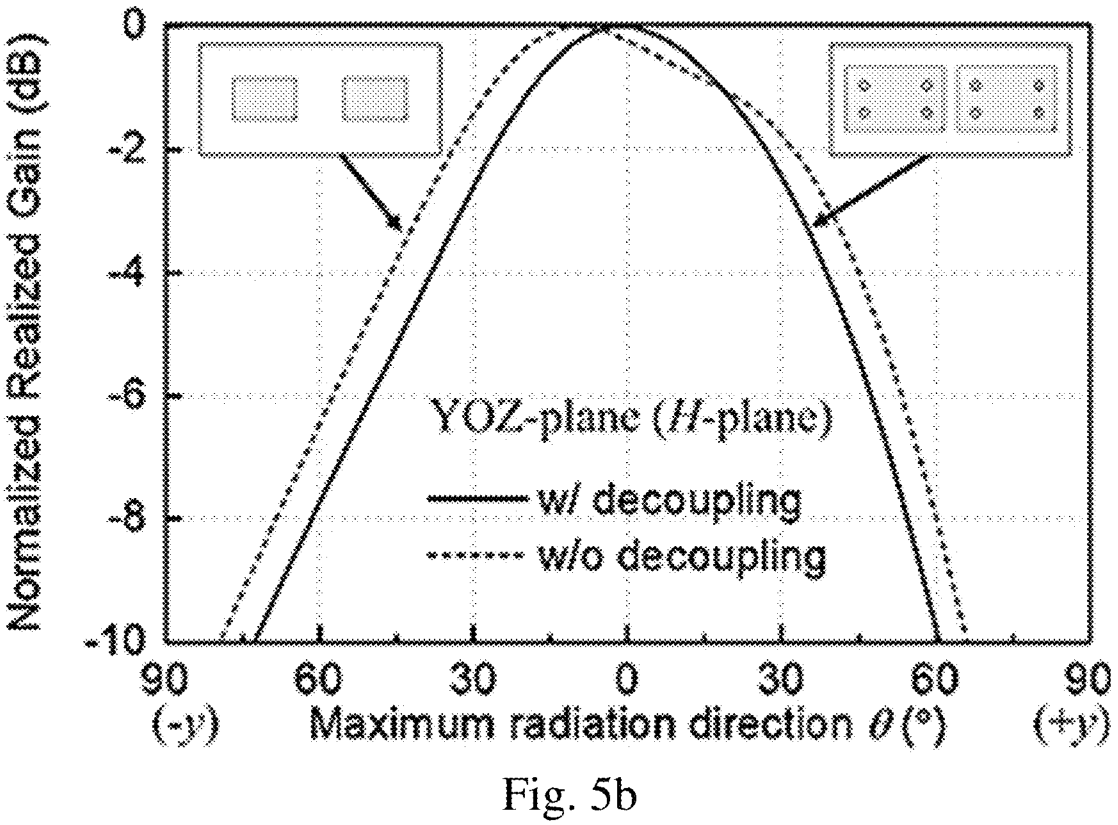
FIG. 5*b* shows co-polarizations of radiation patterns of the antenna in FIG. 4*b*, as compared to that of the antenna in FIG. 4*a*.

FIGS. 5*a* and 5*b* compare the simulated results of the antenna in FIG. 4*a* and the antenna in FIG. 4*b*, where the results from the antenna in FIG. 4*a* are labeled as "w/o decoupling" in FIGS. 5*a* and 5*b*, and the results from the antenna in FIG. 4*b* are labeled as "w/decoupling" in FIGS. 5*a* and 5*b*. For a fair comparison, the patches in the antenna of FIG. 4*b* are each set to have the size of 18.5×31.7 $mm^2$ in the simulation, and the patches in the antenna of FIG. 4*a* are each set to have a size proportionally reduced to 14.3×24.7 $mm^2$ with the same aspect ratio, which makes MAs resonate at 4.9 GHz [43]. In addition, the center-to-center spacing of 38.0 mm is same for the two patches in the antenna in FIG. 4*b*, and for the two patches in the antenna in FIG. 4*a*. For ease of verification, average current density on each patch is calculated over a period, and then displayed in FIG. 5*a*. It can be found that the difference of the current density greatly increases from 17.0 dB to 24.0 dB at 4.9 GHz in the case of the antenna of FIG. 4*b*, as compared to that of the antenna of FIG. 4*a*. In this case, although the edge-to-edge spacing reduced significantly from 13.3 to 4.0 mm, the isolation level is still enhanced by 7.0 dB. This implies that little energy exists on the second patch 34, namely a=0 in (2). In addition, the co-polarizations of the radiation patterns for the cases with and without the shorting vias are simultaneously shown in FIG. 5*b*. As can be observed, the maximum radiation direction is corrected from θ=10° to θ=0° for the antenna of FIG. 4*b* with the decoupling structure loaded, which verifies the RPD effect and design idea.

Figure 6A:
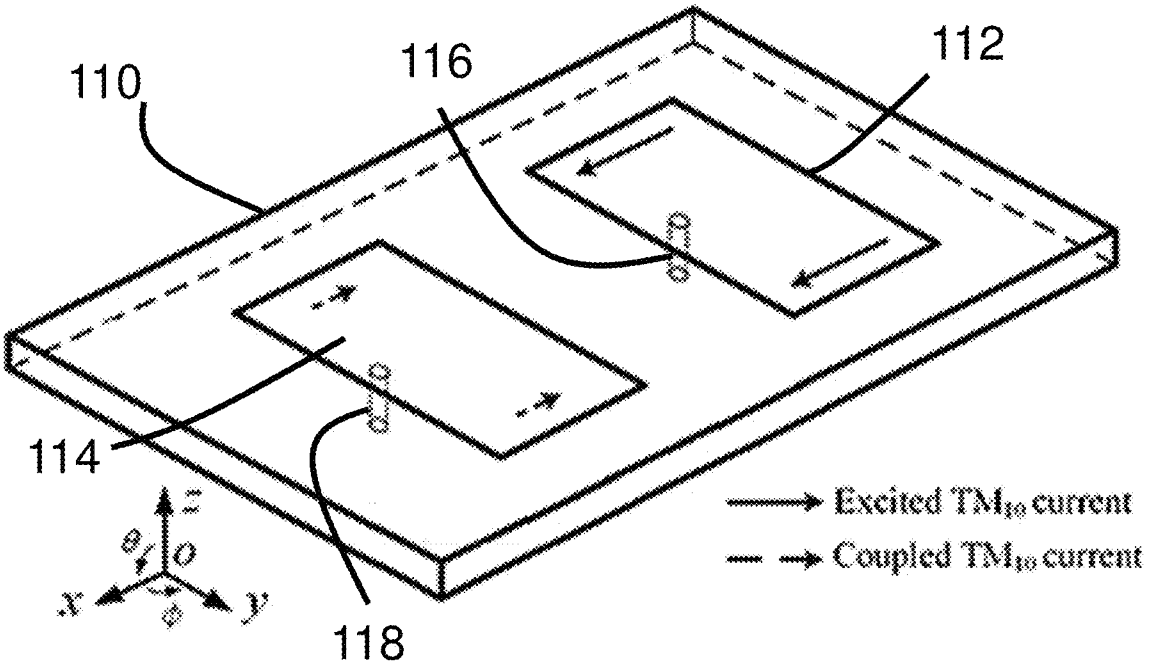
Fig. 6a (prior art)
FIG. 6*a* shows a perspective view of a conventional E-plane-coupled antenna with 1×2 MA elements.

Turning to FIG. 6*a*, which shows another conventional H-plane-coupled antenna with 1×2 MA elements [52]. Like the antenna of FIG. 4*a*, the antenna of FIG. 6*a* also contains two antenna elements supported by a substrate 110 that are defined by respectively a first patch 112 and a second patch 114, which are generally the same as their respective counterparts in FIG. 4*a*. Therefore, components and structures that are common or similar in the antennas of FIGS. 4*a* and 6*a* will not be described again for the sake of brevity. Rather, only differences between the two antennas are discussed herein. Notably, the relative spatial relationships of the first patch 112 and a second patch 114 on the substrate 110 are different between the antennas of FIGS. 4*a* and 6*a*. In FIG. 6*a*, it is a long side of the first patch 112 that faces a long side of the second patch 114. A first port 116 is located near the long side of the first patch 112 that faces the second patch 114, and a second port 118 is located near a long side of the second patch 114 that is farthest apart from the first patch 112. Again, rectangular shapes of both the first and second patches 112, 114 are nested in the rectangular shape of the substrate 110. The antenna shown in FIG. 6*a* works in the fundamental $TM_{10}$ mode, and FIG. 6*a* shows a scenario where the first patch 112 is excited via the first port 116, while the second patch 114 is coupled by the second port 118 connected with a matching load (not shown, e.g., 50Ω), where currents on the excited first patch 112 and the coupled second patch 114 are shown in FIG. 6*a*.

Figure 6B:
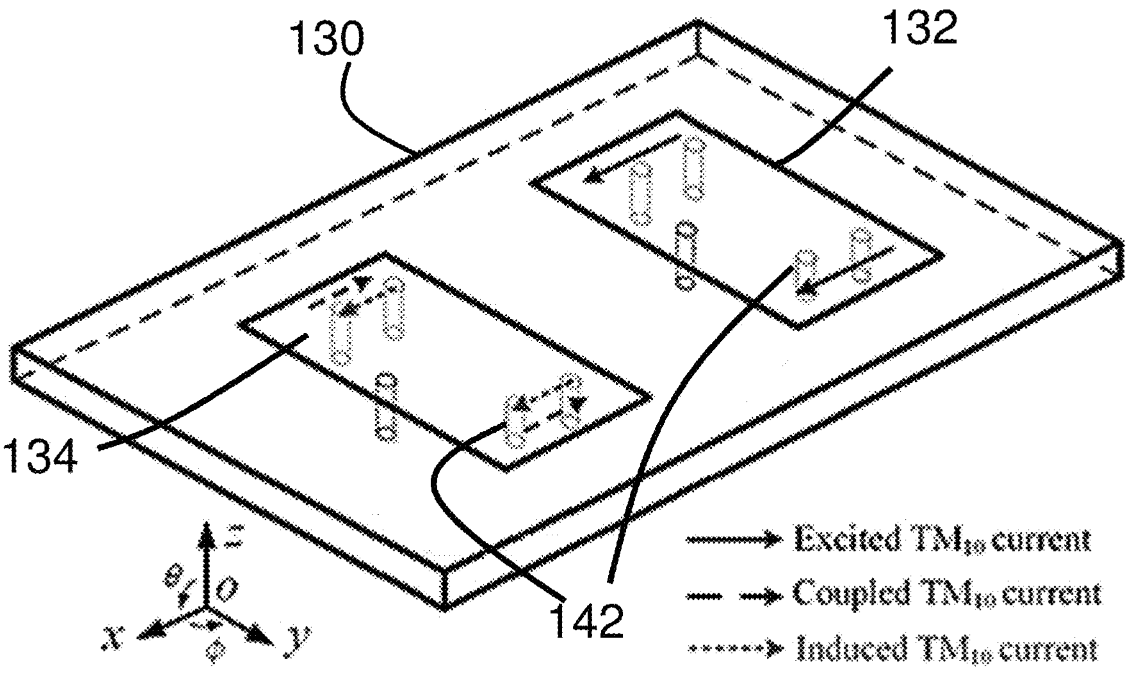
FIG. 6*b* shows a perspective view of a E-plane-decoupled antenna with 1×2 MA elements according to an embodiment of the invention.

FIG. 6*b* shows a E-plane-decoupled antenna with 1×2 MA elements according to an embodiment of the invention, and the antenna in FIG. 6*b* has a structure generally similar to that of the antenna in FIG. 6*a*. Therefore, components and structures that are common or similar in the antennas of FIGS. 6*a* and 6*b* will not be described again for the sake of brevity. Rather, only differences between the two antennas are discussed herein. Each of first and second patches 132, 134 on a substrate 130 in the antenna of FIG. 6*b* contains four shorting vias 142, the configurations and relative locations of which with respect to the first patch 132 or the second patch 134 are similar to those shown in FIG. 4*b*. Notably, the two rectangular shapes defined by the four shorting vias 142 on the first and second patches 132, 134 also have their long sides facing each other, just like the case of the first patch 132 and the second patch 134.

In one specific implementation, the first and second patches 132, 134 each have a size of 17.8×33.2 $mm^2$, with their closest sides spaced from each other by 9.5 mm. The thickness and its dielectric constant of the substrate 130 are 3.148 mm and 3.55, respectively.

The plurality of shorting vias 142 is intended to achieve RPD effect just like those in the antenna of FIG. 4*b*. However, what is different is that the shorting vias 142 will mainly change the current phase difference between the two patches 132, 134 rather than the coupling current amplitude. With proper design parameters, the coupled current will be in-phase compared to the excited current, which introduces RPD effect.

Figure 7A:
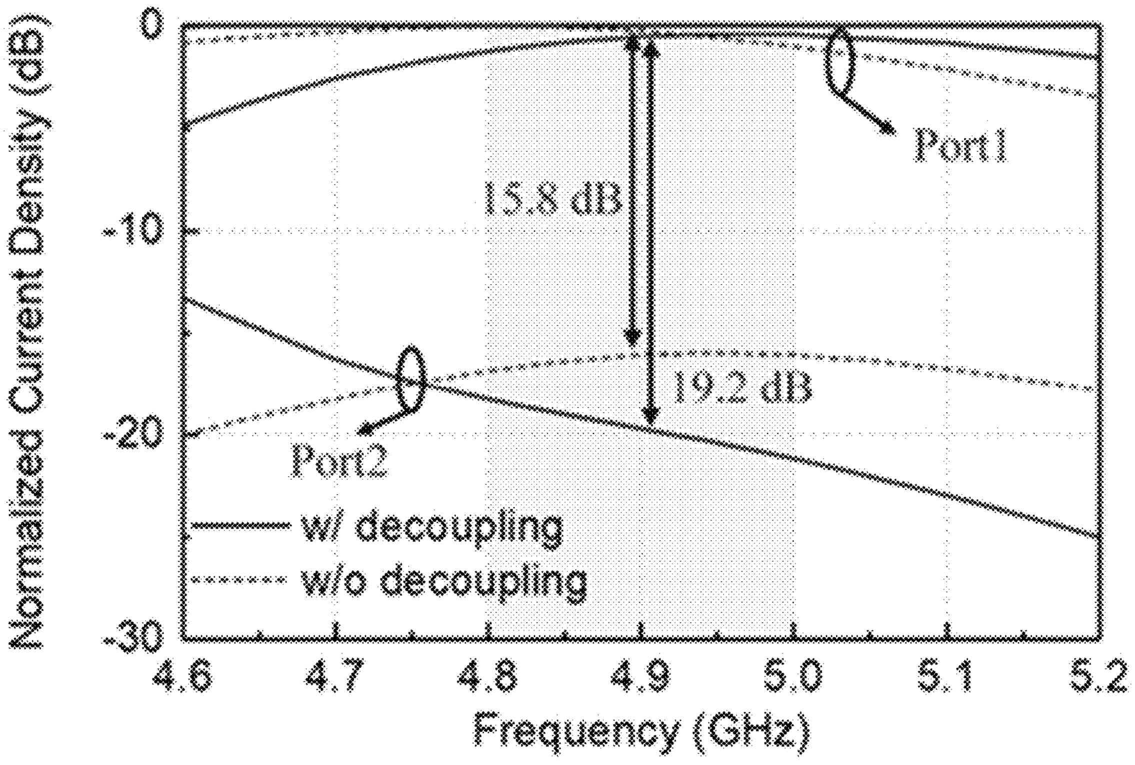
FIG. 7*a* shows simulated average current density on the two patches of the antenna in FIG. 6*b*, as compared to that of the antenna in FIG. 6*a*.
Figure 7B:
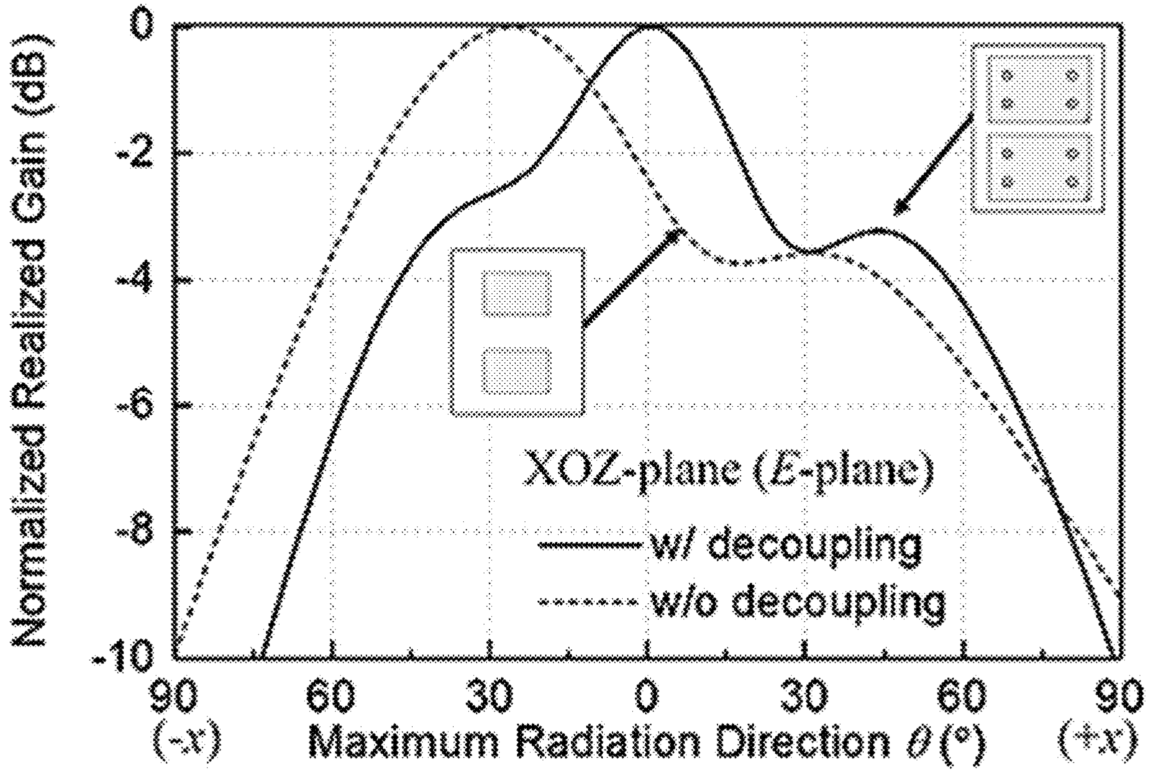
FIG. 7*b* shows co-polarizations of radiation patterns of the antenna in FIG. 6*b*, as compared to that of the antenna in FIG. 6*a*.

For verification, the simulated average current density and the co-polarizations of radiation patterns of displayed in FIGS. 7*a* and 7*b*, respectively. FIGS. 7*a* and 7*b* compare the simulated results of the antenna in FIG. 6*a* and the antenna in FIG. 6*b*, where the results from the antenna in FIG. 6*a* are labeled as "w/o decoupling" in FIGS. 7*a* and 7*b*, and the results from the antenna in FIG. 6*b* are labeled as "w/decoupling" in FIGS. 7*a* and 7*b*. For a fair comparison, the patches in the antenna of FIG. 7*b* are each set to have the size of 17.8×33.2 $mm^2$ in the simulation, and the patches in the antenna of FIG. 7*a* are each set to have a size proportionally reduced to 14.3×25.0 $mm^2$ with the same aspect ratio. With reference to FIG. 7*a*, the current density difference changes from 15.8 dB to 19.2 dB at 4.9 GHz. Meanwhile, the main beam of coupled MA is tilted along θ=26°, which implies out-of-phase current on the coupled patch (see FIGS. 2 and 3). After loaded with the decoupling shorting vias 142, the main beam is corrected to the broadside direction, as shown in FIG. 7*b*. This phenomenon corresponds to the situation of δ=0 in (2).

Figure 8A:
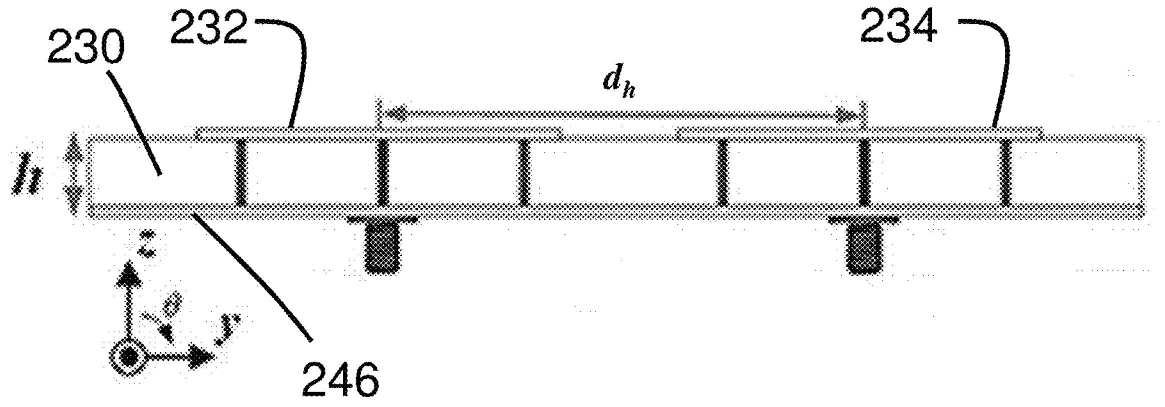
FIG. 8*a* shows a front view of a H-plane-decoupled antenna with 1×2 MA elements according to another embodiment of the invention.
Figure 8B:
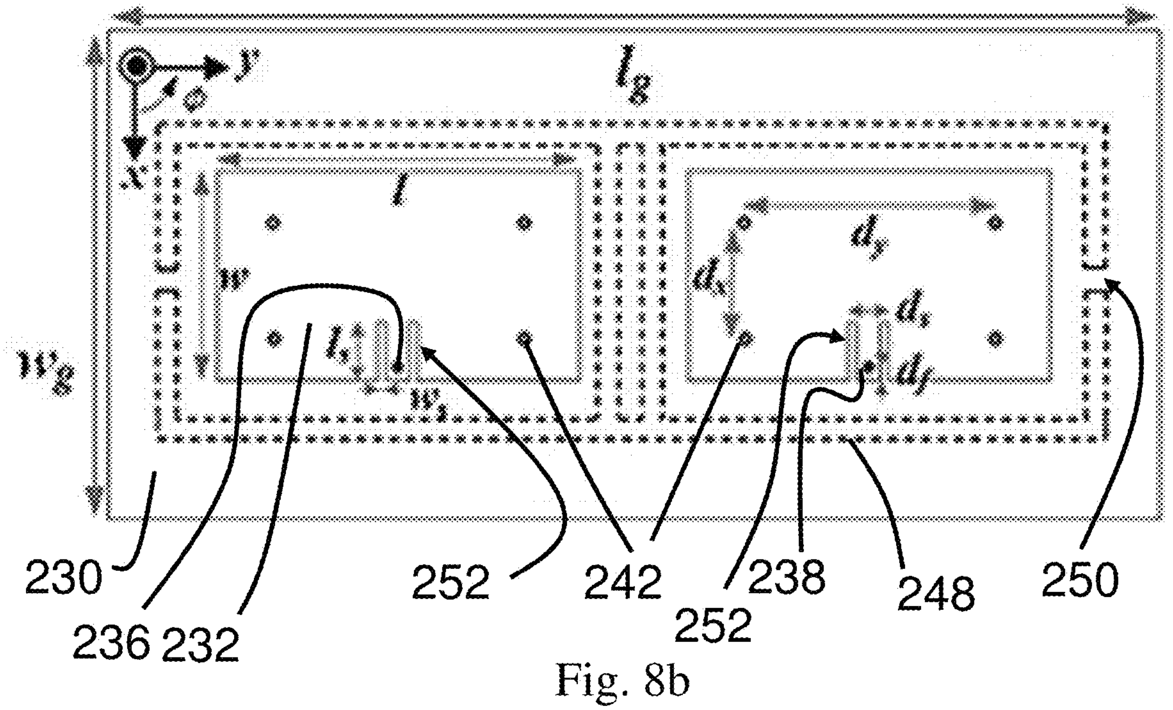
FIG. 8*b* is a top view of the antenna of FIG. 8*a* which shows a slot structure at the bottom side of the substrate by dash lines.
Figure 8C:
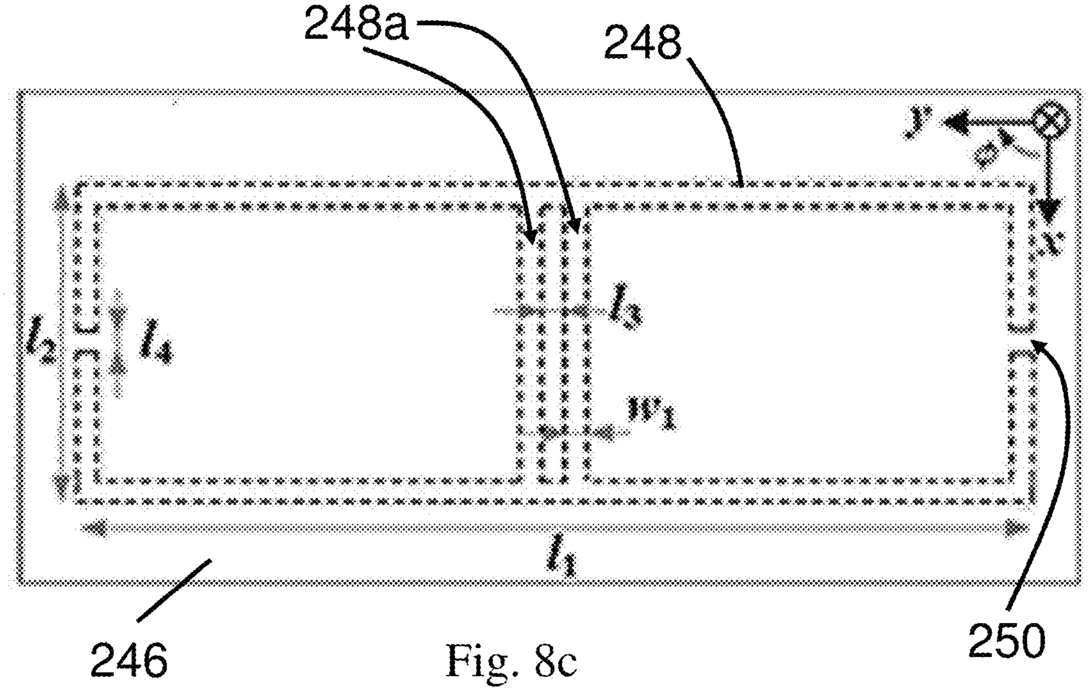
FIG. 8*c* is a bottom view of the antenna of FIG. 8*a* which shows the slot structure at the bottom side of the substrate by dash lines. The front side of the substrate shown in FIG. 8*a* is the bottom edge of the substrate in FIG. 8*c*.

Turning to FIGS. 8*a*-8*c*, which show a H-plane-decoupled antenna with 1×2 MA elements according to another embodiment of the invention, and the antenna in FIGS. 8*a*-8*c* has a structure generally similar to that of the antenna in FIG. 4*b*. Therefore, components and structures that are common or similar in the antennas of FIGS. 4*b* and 8*a*-8*c* will not be described again for the sake of brevity. Rather, only differences between the two antennas are discussed herein. Compared to the antenna in FIG. 4*b*, the antenna in FIGS. 8*a*-8*c* notably contains a slot structure 248 located at a bottom side of a substrate 230, and in particular the slot structure 248 is etched in a ground plane 246. As best shown in FIGS. 8*b* and 8*c*, the slot structure 248 in the top and bottom views of the antenna has a 90°-rotated "8" shape, and surrounds each of a first patch 232 and a second patch 234 on the substrate 230. However, parts of the slot structure 248 surrounding each of the first and second patches 232, 234 does not form a fully closed shape, but instead there is a small gap 250 in the slot structure 248 near each of the two farthest-apart sides of the first and second patches 232, 234. In addition, while the rest of the slot structure 248 has only a single slot segment extending, there are two slot segments 248*a* run in parallel and separated from each other, and located between the two facing sides of the first and second patches 232, 234.

There are four shorting vias 242 on each of the first and second patches 232, 234 like those in FIG. 4*b*. Similarly, a first port 236 and a second port 238 are configured respectively on the first patch 232 and the second patch 234, with the relative locations of the first port 236 or the second port 238 to its corresponding shorting vias 242 being similar to that in FIG. 4*b*. However, on each of the first and second patches 232, 234 there are configured further with two slits 252 located on two sides of a corresponding one of the first port 236 and the second port 238. The slits 252 extend inward to a center of the first patch 232 or the second patch 234 from a long side thereof, near which the corresponding one of the first port 236 and the second port 238 is located.

The first and second patches 232, 234 have a center-to-center distance between them which is $d_h$, and are printed on top of the substrate 230. The substrate 230 has dimensions of $l_g \times w_g \times h$, a dielectric constant of 3.55, and a loss tangent of 0.0027. The first and second patches 232, 234 share the same length l and width w. The four shorting vias 242 are inserted into the substrate 230, with separation distances of $d_x$ and $d_y$ along x- and y-axes, respectively. In one example, coaxial probes are respectively employed at the first port 236 and the second port 238 to excite the antennas with a distance of $d_f$ away from the patch edge. Each of the slits 252 is $l_s$-long and $w_s$-wide, and is etched in the first and second patches 232, 234 with a distance of $d_s$, for a better impedance matching. Surrounding the first and second patches 232, 234, the slot structure 248 provides improved port isolations.

In one specific implementation, the optimal design parameters of the antenna in FIGS. 8*a*-8*c* are $l_g$=91.0 mm, $w_s$=42.0 mm, l=34.0 mm, w=18.0 mm, $d_x$=10.0 mm, $d_y$=21.0 mm, $l_s$=5.0 mm, $w_s$=0.7 mm, $d_h$=38.0 mm, h=3.1 mm, $l_1$=78.0 mm, $l_2$=24.5 mm, $l_3$=1.0 mm, $l_4$=1.0 mm, $l_5$=0.5 mm, $d_s$=3.6 mm, and $d_f$=1.5 mm.

To verify the design idea of the antenna of FIG. 8*b*, a prototype made according to the design parameters in the above-mentioned specific implementation which is optimized at 4.9 GHZ. ANSYS HESS is used to obtain the optimal design parameters. The S-parameters are measured with an Agilent N5230A vector network analyzer, while the radiation patterns, realized gains, and realized radiation efficiencies are measured with a Satimo Starlab near-field measurement system. It should be noted that when one port is under test, the other port should be connected with a 50-Ω load.

FIGS. 9*a*-9*e* compare the measured (from the prototype described above) and simulated results of the H-plane-decoupled 1×2 MA antenna in FIG. 8*b*, showing S-parameters, radiation patterns, realized gains and realized radiation efficiencies, and ECCs respectively. It should be noted that the results of the two ports should be the same due to symmetry, and therefore only the results of one port are given for brevity. As can be observed in FIG. 9*a*, the measured 10 dB impedance bandwidth is 5.3%, ranging from 4.82 to 5.08 GHz, which agree reasonably with the simulated one of 4.9% (4.80-5.05 GHz). In addition to the reflection coefficients, the transmission coefficients are also plotted in FIG. 9*a*, with good agreement obtained. Over the working band, the measured $|S_{21}|$ is lower than −24 dB, which is good enough for practical applications. The discrepancy may be due to fabrication tolerance and measurement error.

Figure 9A:
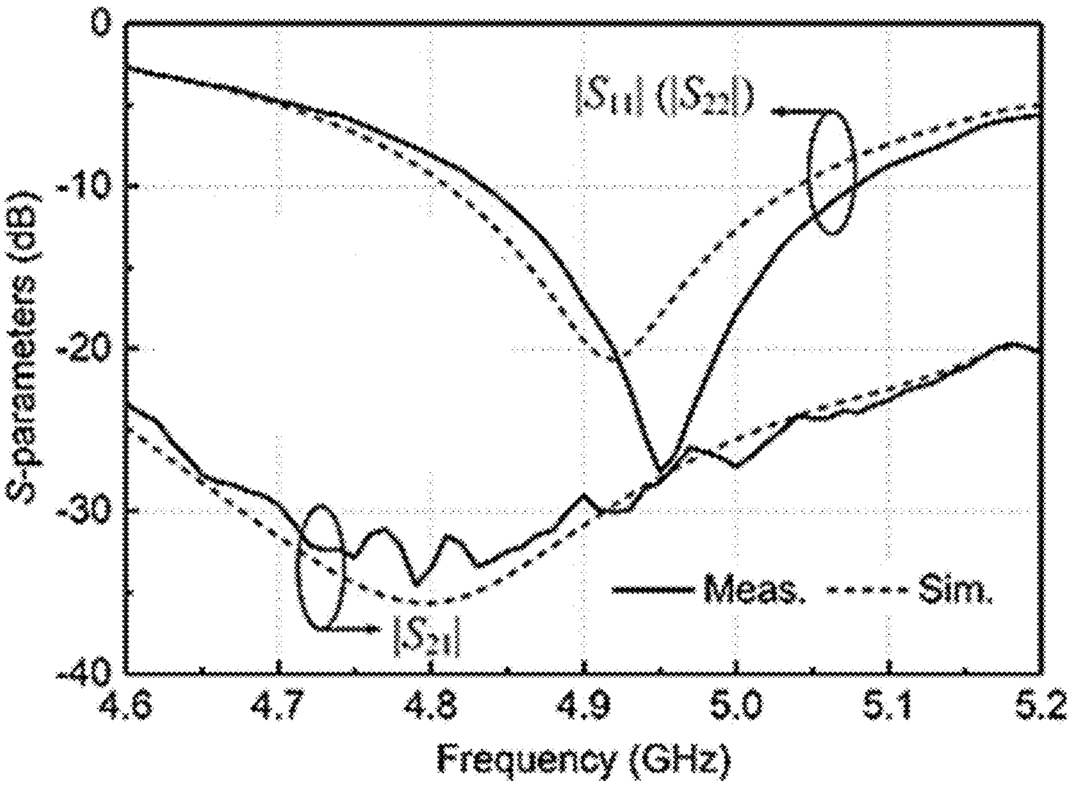
FIG. 9*a* illustrates the measured and simulated S-parameters of the antenna in FIGS. 8*a*-8*c* in one specific implementation.
Figure 9B:
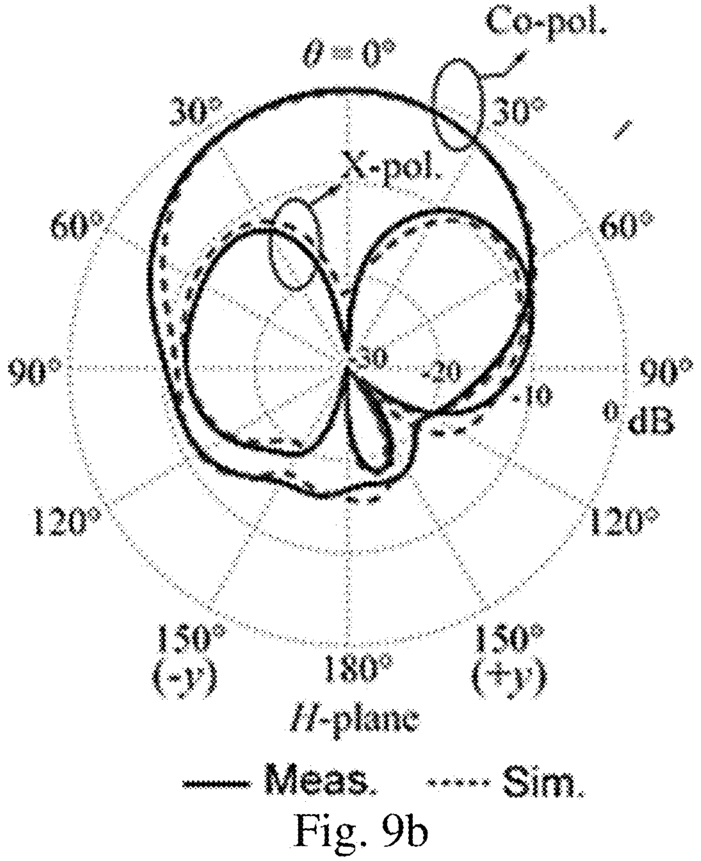
FIG. 9*b* shows the measured and simulated H-plane radiation pattern at 4.9 GHz of the antenna in FIGS. 8*a*-8*c* in the specific implementation.
Figure 9C:
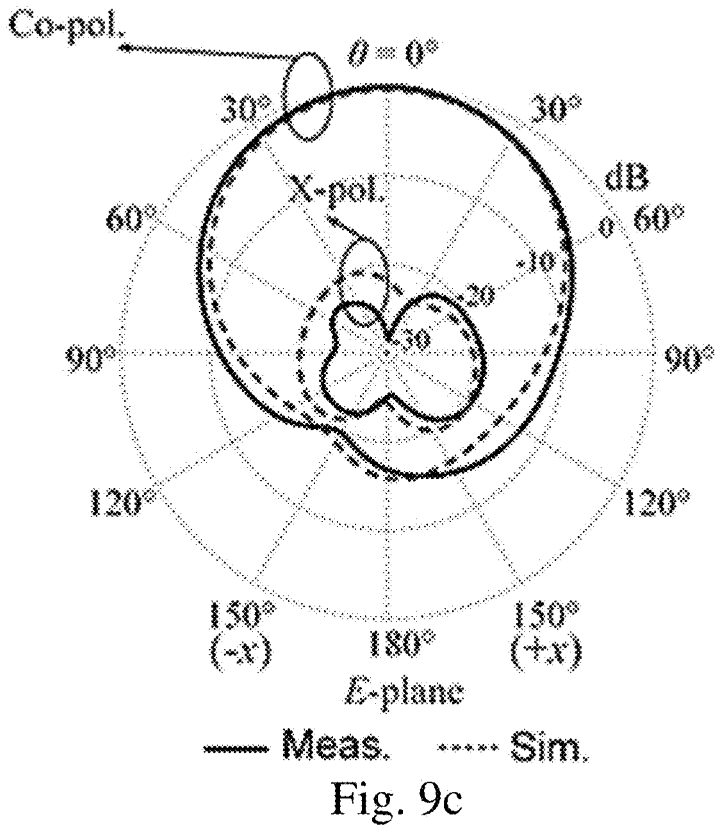
FIG. 9*c* shows the measured and simulated E-plane radiation pattern at 4.9 GHz of the antenna in FIGS. 8*a*-8*c* in the specific implementation.

With reference to FIGS. 9*b*-9*c*, good agreement between the measured and simulated results can be observed with typical unidirectional radiation patterns. The cross-polar level is 20 dB lower than the co-polar counterpart in the E-plane, while a higher cross-polarization can be found off the θ=0° direction in the H-plane. Since the aspect ratio of the each of the patches is close to 2, its $TM_{02}$ mode will resonate near the $TM_{10}$ mode. It can be predicted that the $TM_{02}$ mode worsens the cross-polarization in the H-plane. It should be highlighted that the maximum radiation is along the broadside direction, verifying the RPD effectiveness.

Figure 9D:
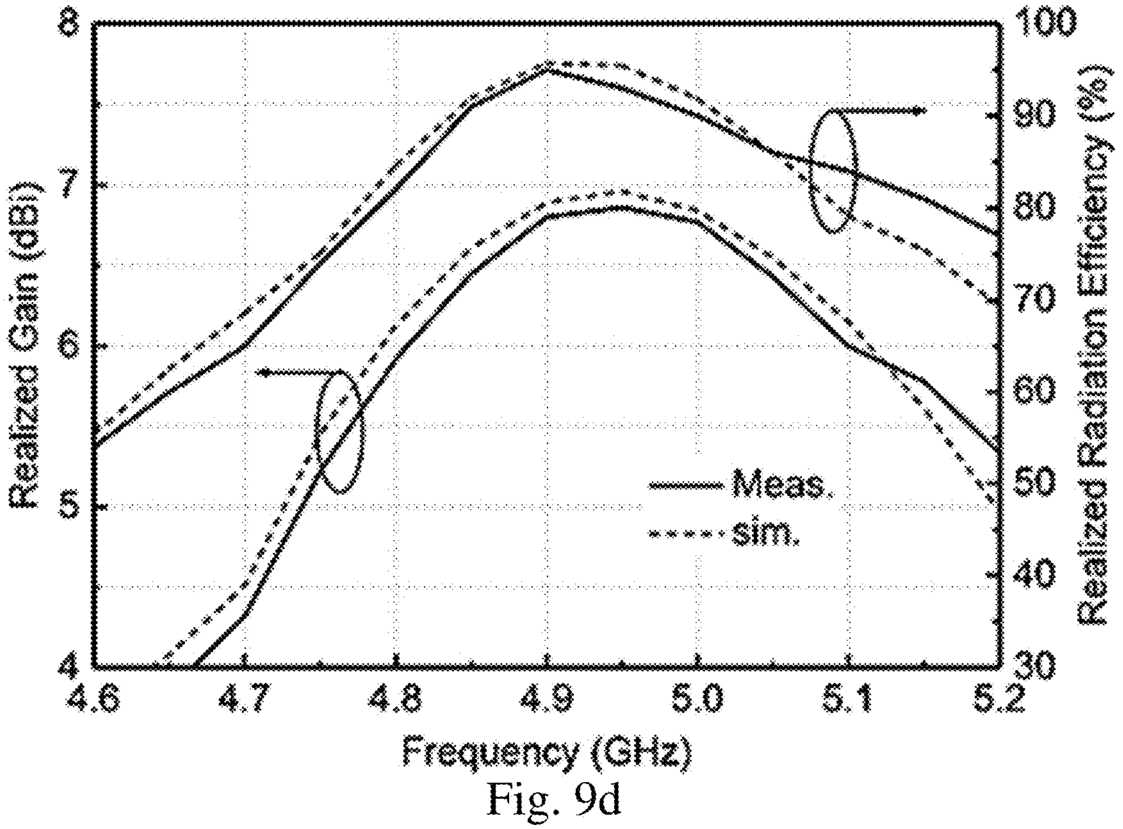
FIG. 9*d* shows the measured and simulated results of realized gains and realized radiation efficiencies of the antenna in FIGS. 8*a*-8*c* in the specific implementation.

As can be seen in FIG. 9*d*, the measured realized gain is larger than 6.0 dBi over the 10 dB impedance bandwidth, with a peak of 6.8 dBi at 4.95 GHz, which agrees well with the simulated one, ranging from 6.1 dBi to 7.0 dBi. The measured and simulated realized radiation efficiencies are higher than 82% and 85%, respectively, with the same trend, which is also displayed in FIG. 9*d*. These realized gains and realized radiation efficiencies are suitable for practical applications. The little difference may come from the lossy substrate and copper.

Figure 9E:
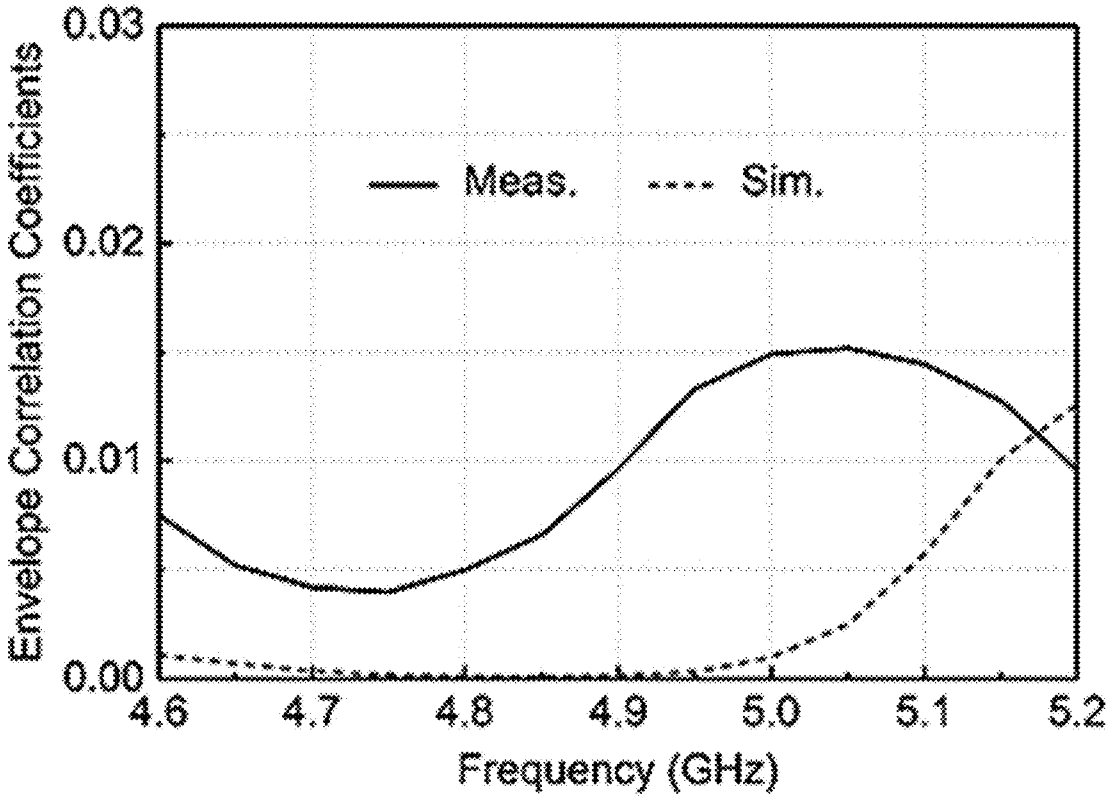
FIG. 9*e* shows the measured and simulated envelope correlation coefficients (ECCs) of the antenna in FIGS. 8*a*-8*c* in the specific implementation.

FIG. 9*e* displays the measured and simulated ECCs of the antenna of FIGS. 8*a*-8*c*, calculated based on the measured and simulated 3-D radiation patterns [44], [45]. With reference to FIG. 9*e*, the measured ECC is less than 0.015 over the operating band, which is much smaller than the criterion of 0.5 [46]. The mismatch between the measurement and the simulation may be due to the measurement error.

To verify the operating modes, a parametric study is carried out. It can be found that changing the width w of the patch will significantly shift the resonant frequency, implying an MA mode. It can be also found that the resonant frequency remains almost unchanged with different thicknesses h of the substrate, or probe length, which indicates that the antenna is not working in the probe mode.

Figure 10:
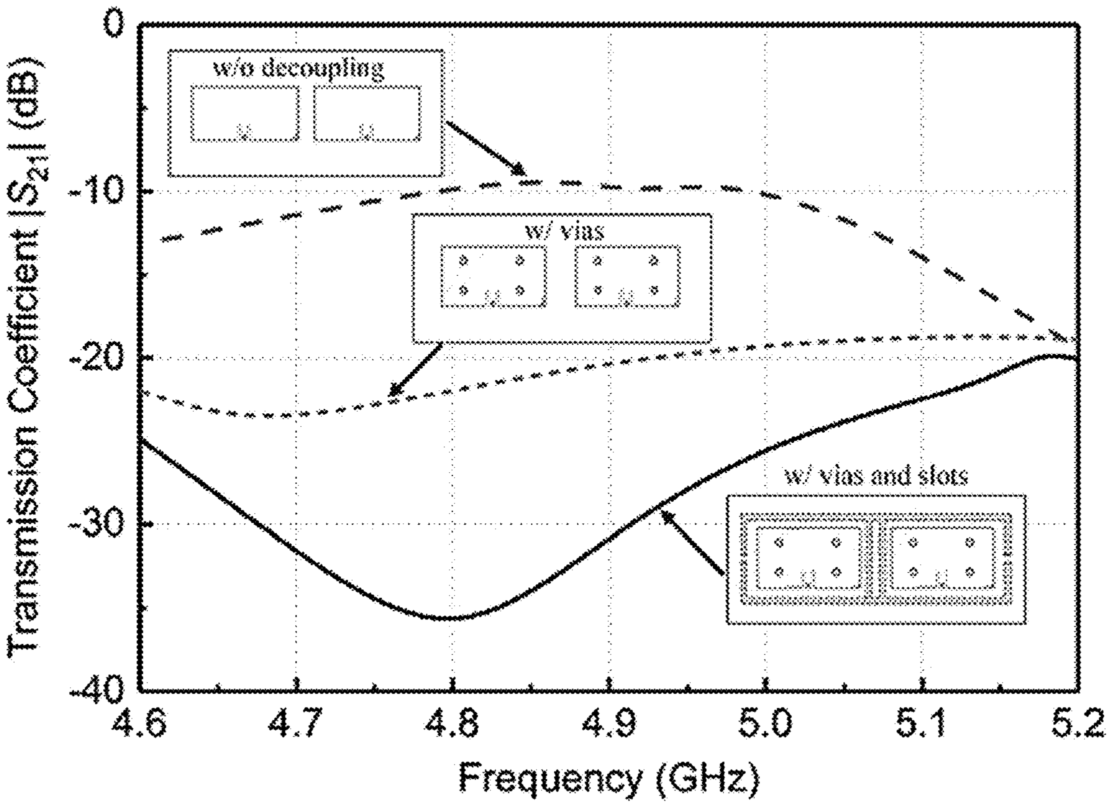
FIG. 10 illustrates simulated transmission coefficients of the antenna of FIGS. 8*a*-8*c* with and without various decoupling structures.

FIG. 10 shows the simulated transmission coefficients with and without the decoupling structures. It should be mentioned that in the case without any decoupling structures the patch size is changed to l=32 mm and w=16.7 mm with other parameters unchanged, to keep the same resonant frequency. With reference to FIG. 10, the coupled patches peak a transmission coefficient of ~−10 dB. With the introduction of decoupling shorting vias, the $|S_{21}|$ curve is lowered to −20 dB. The slot structure can further improve it to ~−30 dB level, as expected due to the restrict on the current flowing on the ground.

Figure 11A:
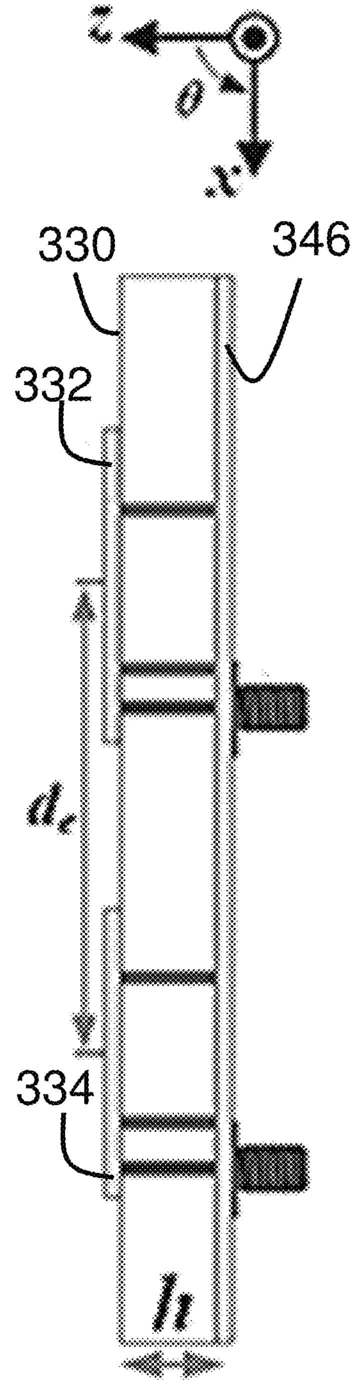
FIG. 11*a* shows a front view of a E-plane-decoupled antenna with 1×2 MA elements according to another embodiment of the invention.
Figure 11B:
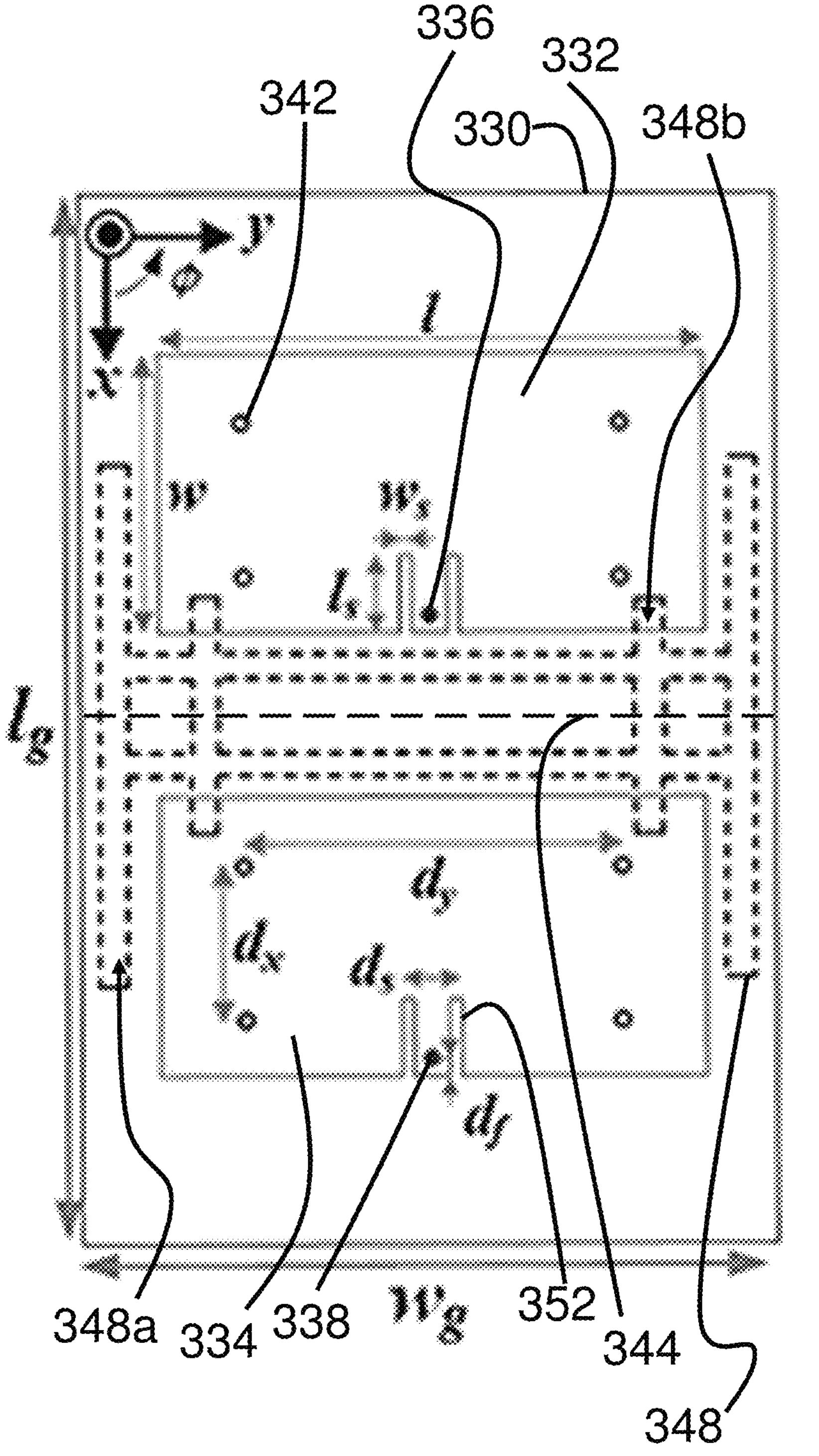
FIG. 11*b* is a left view of the antenna of FIG. 11*a* which shows a slot structure at the bottom side of the substrate by dash lines.
Figure 11C:
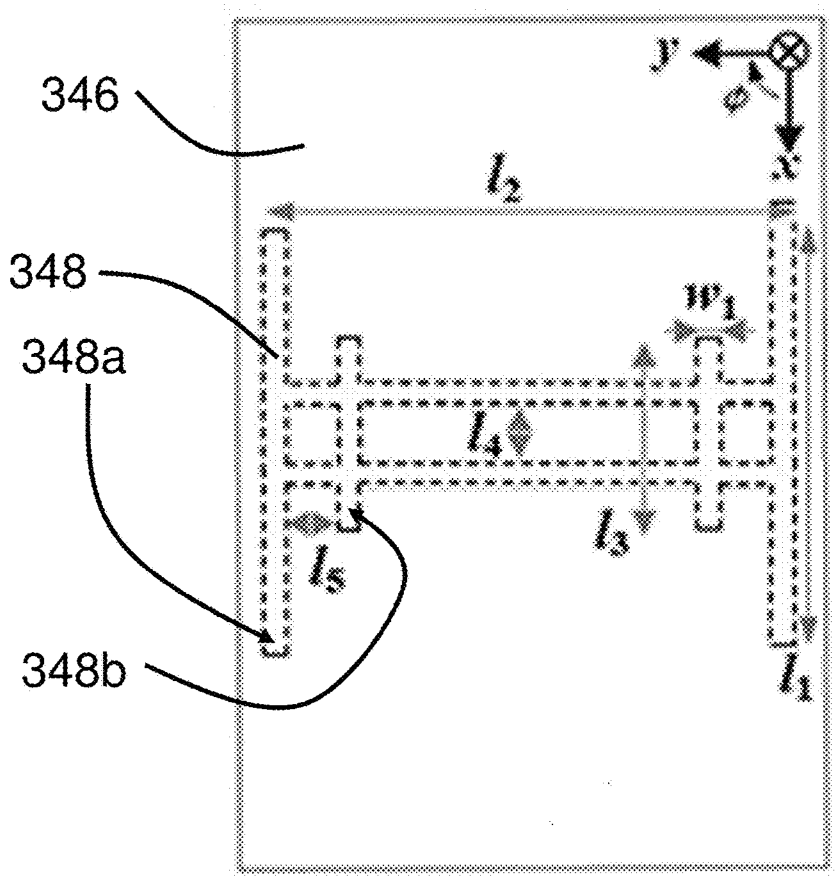
FIG. 11*c* is a right view of the antenna of FIG. 11*a* which shows the slot structure at the bottom side of the substrate by dash lines.

Turning to FIGS. 11*a*-11*c*, which show the configuration of a E-plane-decoupled antenna with 1×2 MA elements according to another embodiment of the invention, and the antenna in FIGS. 11*a*-11*c* has a structure generally similar to that of the antenna in FIG. 6*b*. Therefore, components and structures that are common or similar in the antennas of FIGS. 6*b* and 11*a*-11*c* will not be described again for the sake of brevity. Rather, only differences between the two antennas are discussed herein. Compared to the antenna in FIG. 6*b*, the antenna in FIGS. 11*a*-11*c* notably contains a slot structure 348 located at a bottom side of a substrate 330, and in particular the slot structure 348 is etched in a ground plane 346. As best shown in FIGS. 11*b* and 11*c*, the slot structure 348 in the top and bottom views of the antenna has a substantially "H" shape, and is symmetrical about a virtual line 344 that is between a first patch 332 and a second patch 334 and being equidistant to the first and second patches 332, 334. On each side of the virtual line 344, the slot structure 348 contains two longer slot segments 348*a* and two shorter slot segments 348*b*. There are four longer slot segments 348*a* in FIGS. 11*b* and 11*c* which define partially the "H" shape. The longer slot segments 348*a* extend alongside the short sides of the first and second patches 332, 334 but do not fully surround the latter. As such, only the two long sides of the first and second patches 332, 334 that face each other are fully enclosed by the slot structure 348, and the other two long sides of the first and second patches 332, 334 that are farthest apart from each other is not surrounded by any part of the slot structure 348. The shorter slot segments 348*b* (the number of which is also four in FIGS. 11*b* and 11*c*) extend partially into projections of the first and second patches 332, 334 on the bottom side of the substrate 330 as shown in FIGS. 11*b* and 11*c*.

There are four shorting vias 342 on each of the first and second patches 332, 334 like those in FIG. 6*b*. Similarly, a first port 336 and a second port 338 are configured respectively on the first patch 332 and the second patch 334 respectively, with the relative locations of the first port 336 or the second port 338 to its corresponding shorting vias 342 being similar to that in FIG. 6*b*. There are also slits 352 located on two sides of each one of the first port 336 and the second port 438 like those in FIG. 8*a*-8*c*. With reference to FIGS. 11*a*-11*c*, the design parameters of the antenna are similar with those in FIGS. 8*a*-8*c*, except the center-to-center distance $d_e$. It should be noted the antenna feeding points (where the first and second ports 336, 338 are located) are fixed with reference to the patches, for ease of extension in 2-D arrays. To further enhance the isolation level, the slot structure 348 as decoupling slots is also used.

In one specific implementation, optimal design parameters of the antenna in FIGS. 11*a*-11*c* are: $l_g$=74 mm, $w_g$=42.5 mm, l=34 mm, w=18 mm, $d_x$=10 mm, $d_y$=21 mm, $l_s$=5 mm, $w_s$=0.7 mm, $d_e$=25.5 mm, h=3.1 mm, $l_1$=33 mm, $l_2$=39.2 mm, $l_3$=15 mm, $l_4$=1.5 mm, $l_5$=3.8 mm, and $w_1$=0.5 mm.

A prototype of the antenna in FIGS. 11*a*-11*c* was designed and fabricated at 4.9 GHZ according to the optimal design parameters in the above-mentioned specific implementation. All of the measurements are carried out with the same test instruments and methods. It should be noted that the results of Ports 1 and 2 will be slightly different due to the configuration asymmetry.

Figure 12A:
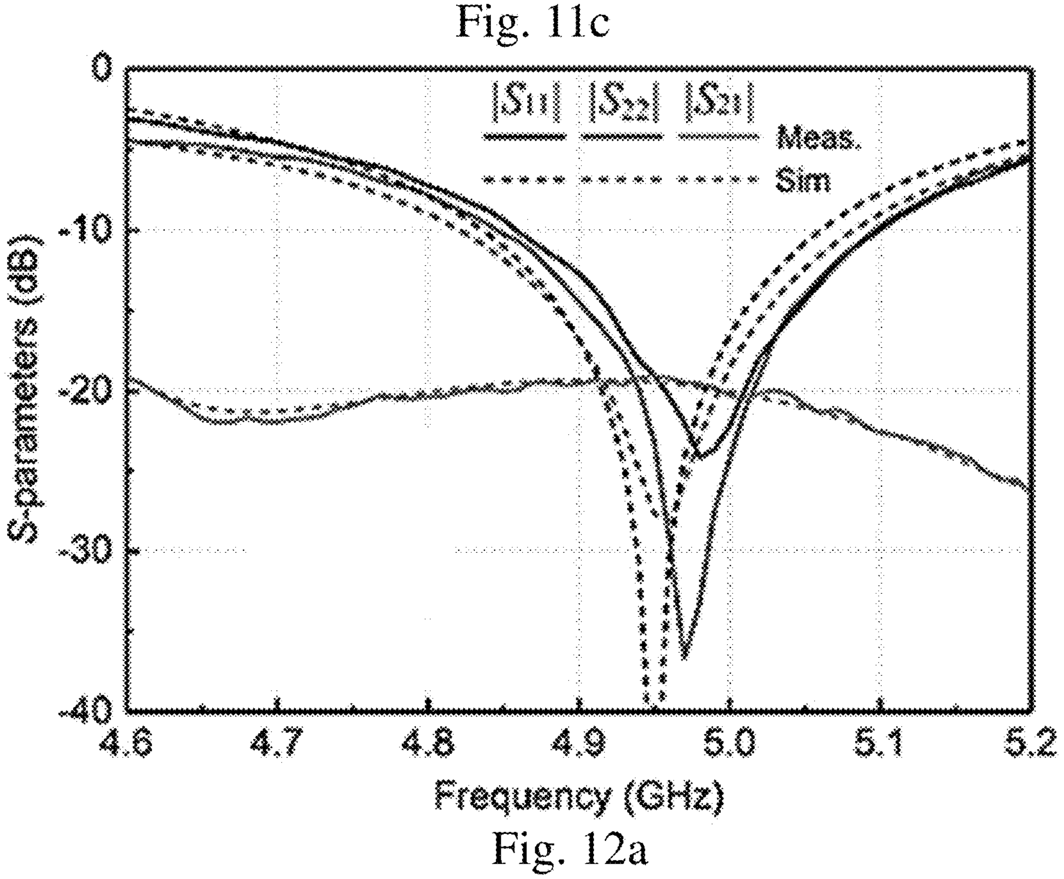
FIG. 12*a* illustrates measured and simulated S-parameters of the antenna in FIGS. 11*a*-11*c* in one specific implementation.
Figure 12B:
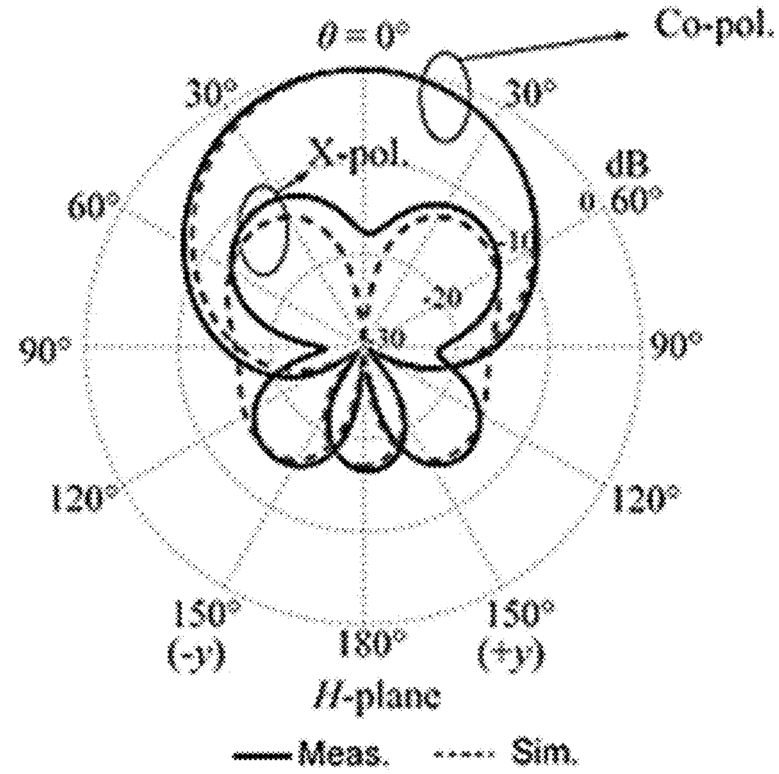
FIG. 12*b* shows measured and simulated H-plane radiation pattern of the first port at 4.9 GHz of the antenna in FIGS. 11*a*-11*c* in the specific implementation.
Figure 12C:
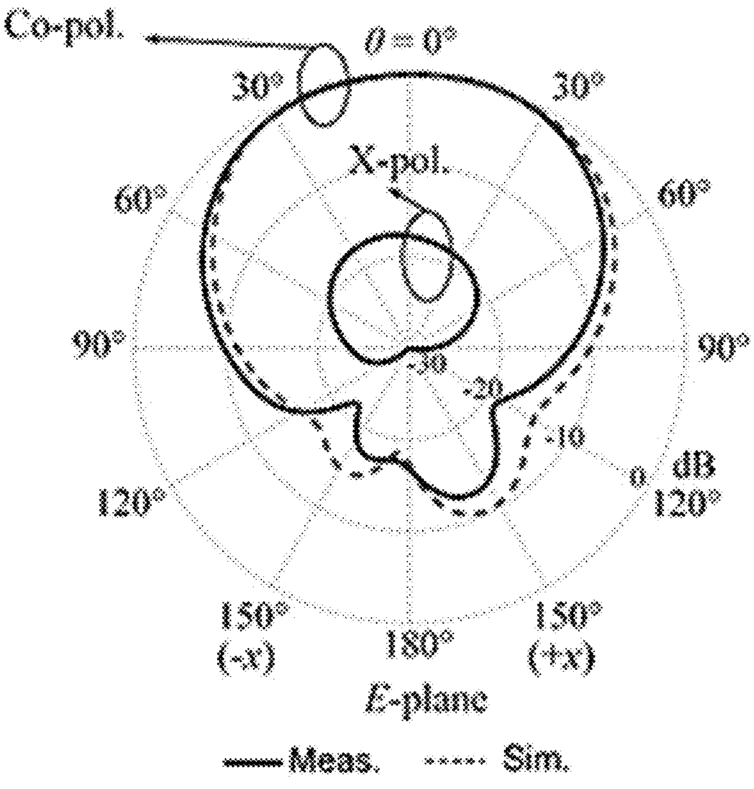
FIG. 12*c* shows measured and simulated E-plane radiation pattern of the first port at 4.9 GHz of the antenna in FIGS. 11*a*-11*c* in the specific implementation.
Figure 12D:
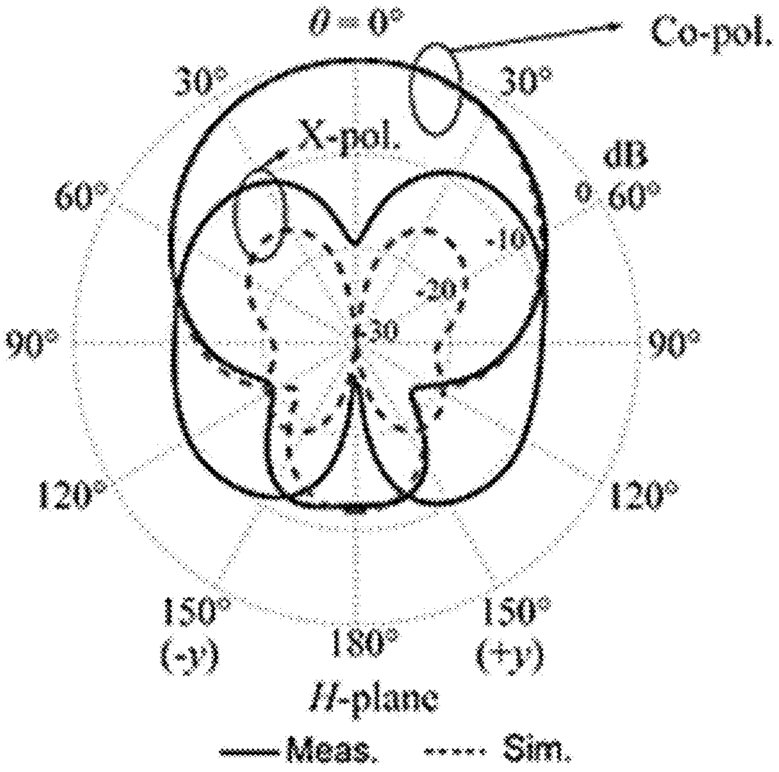
FIG. 12*d* shows measured and simulated H-plane radiation pattern of the second port at 4.9 GHz of the antenna in FIGS. 11*a*-11*c* in the specific implementation.
Figure 12E:
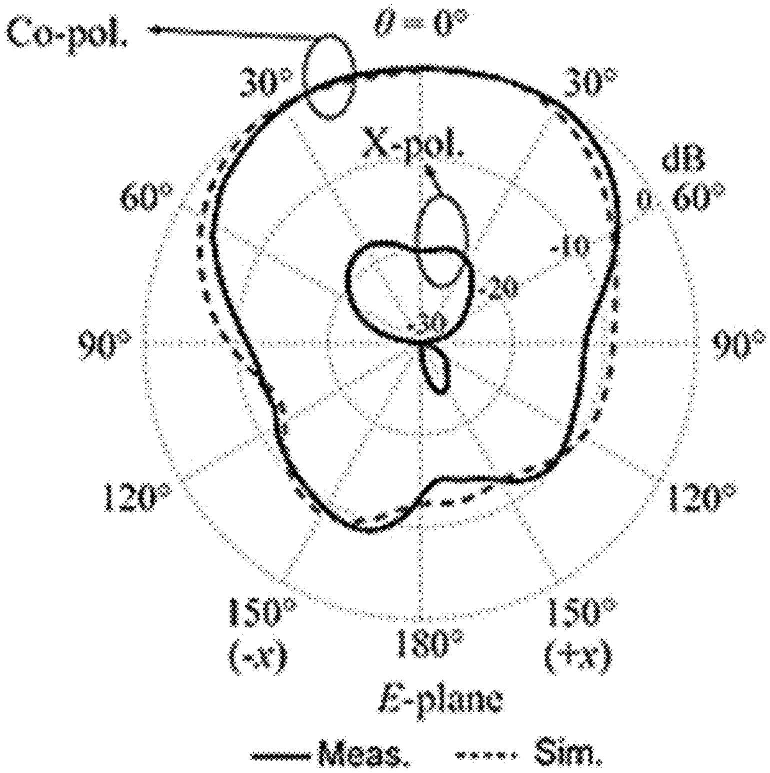
FIG. 12*e* shows measured and simulated E-plane radiation pattern of the second port at 4.9 GHz of the antenna in FIGS. 11*a*-11*c* in the specific implementation.

FIG. 12*a* shows the measured and simulated S-parameters of the antenna of FIGS. 11*a*-11*c*, with good agreement observed. For the first port 336 (Port 1), the measured 10 dB impedance bandwidth is 4.8% (4.85-5.09 GHz), agreeing well with the simulated 5.2% (4.82-5.08 GHz). For the second port 338 (Port 2), the measured $|S_{22}|$ is lower than −10 dB from 4.86 to 5.10 GHz (4.8%), whereas the simulated working band is 4.84-5.06 GHZ (4.4%). It should be mentioned that the E-plane-decoupled case with the same patch size differ from the H-plane-decoupled antenna in FIGS. 8*a*-8*c* slightly, due to the loading effect. Over the working band, both of the measured and simulated $|S_{21}|$s are lower than −19.5 dB, reasonable for most applications.

FIGS. 12*b*-12*e* show the radiation patterns at 4.9 GHz for Ports 1 and 2, respectively. It can be found that the measured cross-polarizations are lower than their co-polarizations by −17 dB and −20 dB along the broadside direction for Ports 1 and 2, respectively. Again, the maximum radiation is along θ=0° direction, verifying the RPD effect and design idea. The deteriorated cross-polarization may mainly come from the $TM_{02}$ mode and fabrication tolerance.

Figure 12F:
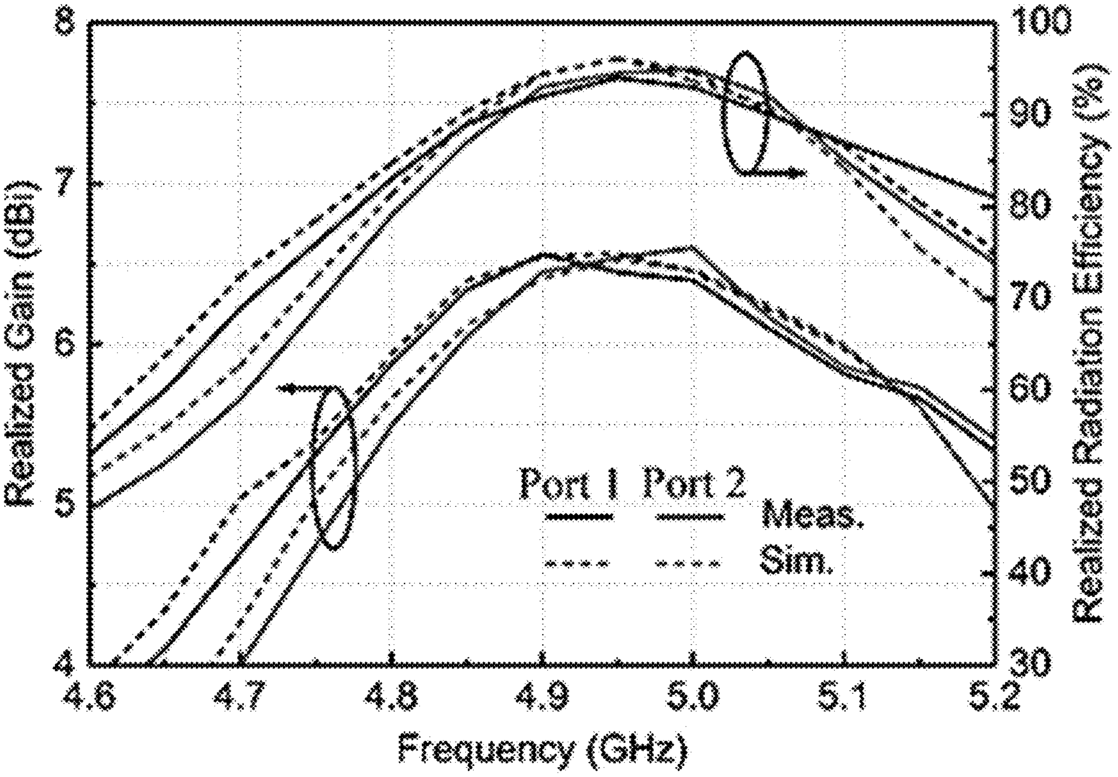
FIG. 12*f* shows the measured and simulated results of realized gains and realized radiation efficiencies of the antenna in FIGS. 11*a*-11*c* in the specific implementation.

Good agreement can be observed for realized gains and realized radiation efficiencies, as shown in FIG. 12*f*. With reference to the figure, both of the measured realized gains of the two ports are higher than 5.8 dBi, with the simulated ones higher than 6.1 dBi. In addition, the measure realized radiation efficiencies are larger than 85% over the working band (4.85-5.08 GHZ), with a peak value of 95% at 5.0 GHz, which is high enough for practical applications. The little discrepancy may come from fabrication tolerance and measurement error.

Figure 12G:
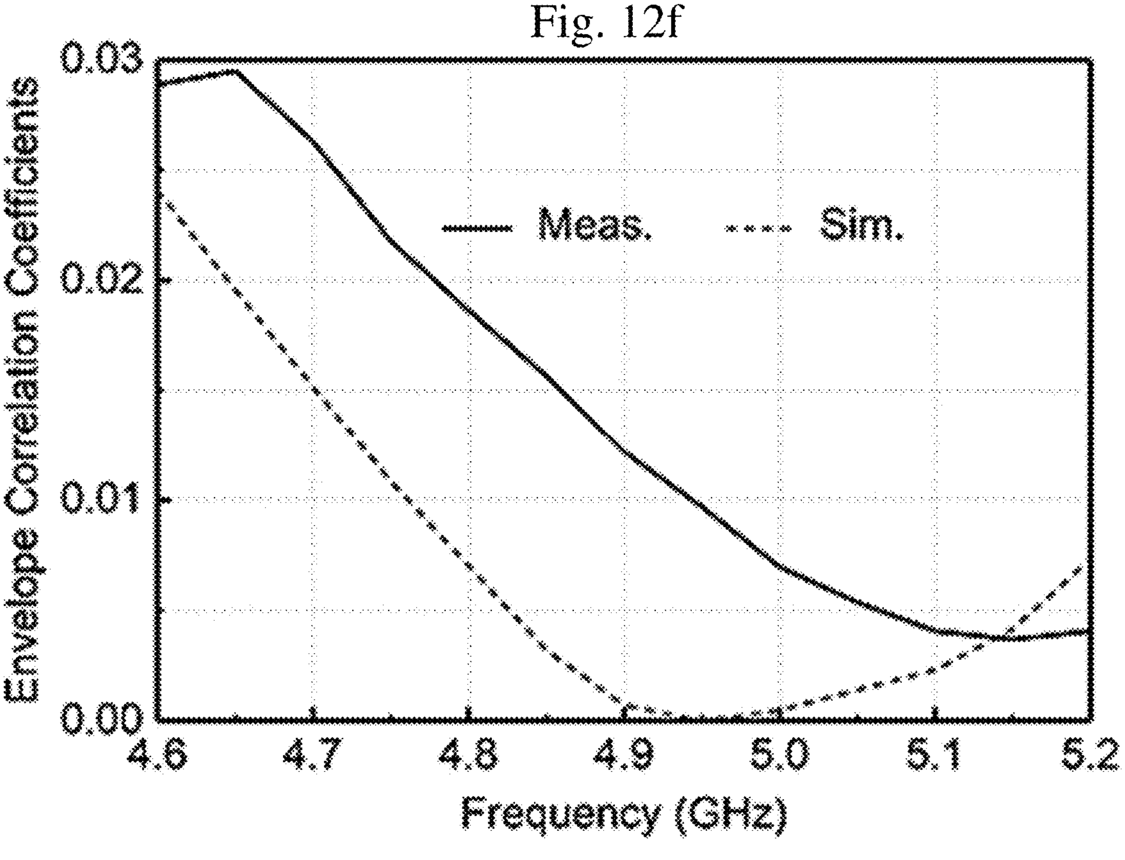
FIG. 12*g* shows the measured and simulated ECCs of the antenna in FIGS. 11*a*-11*c* in the specific implementation.

FIG. 12*g* compares the measured and simulated ECCs of the E-plane-decoupled 1×2 MA antenna of FIGS. 11*a*-11*c*. As can be seen in FIG. 12*g*, the measured ECC value is less than 0.019 in the operating band, low enough for practical applications. Also, the measured ECC curve shifts by ~0.2 GHz, which may be mainly due to measurement error.

Figure 13:
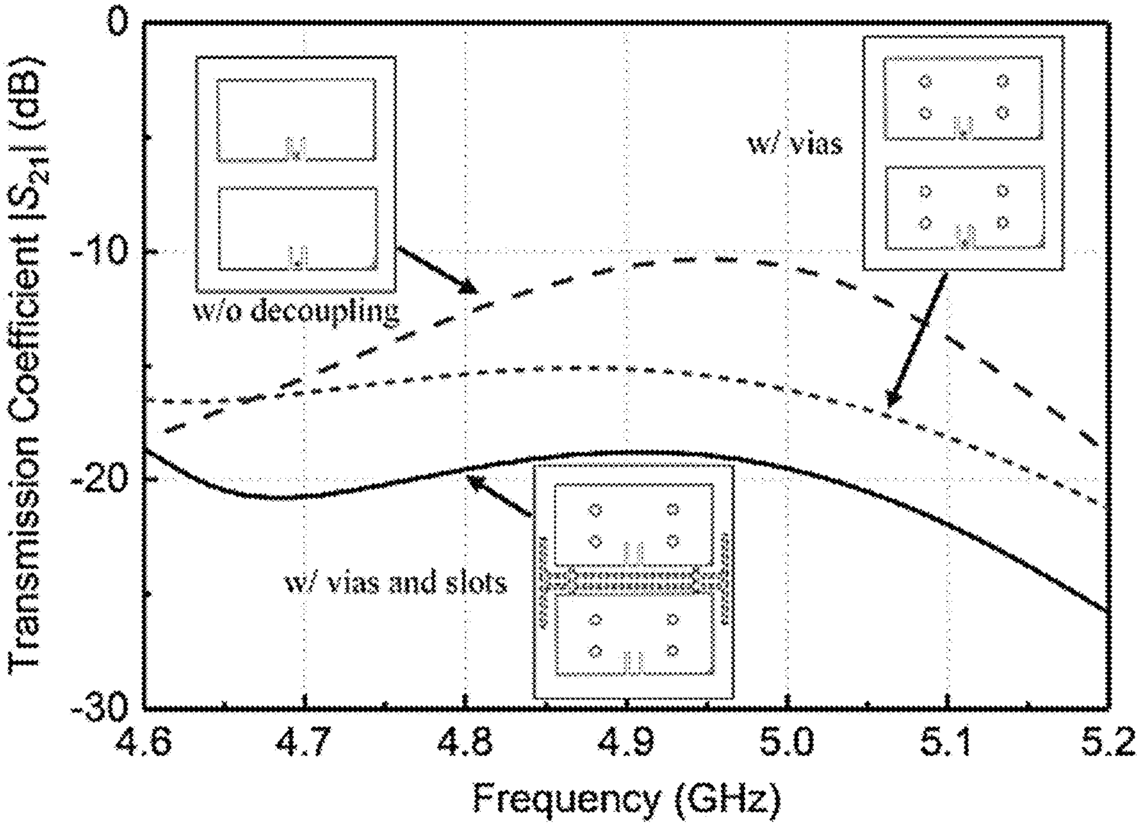
FIG. 13 illustrates simulated transmission coefficients of the antenna of FIGS. 11*a*-11*c* with and without various decoupling structures.

FIG. 13 compares the simulated $|S_{21}|$ curves to identify the decoupling effects of different decoupling structures. Similarly, the patch size without any decoupling structures is changed to l=32.2 mm and w=16.8 mm to resonate at the same center frequency. As can be observed in FIG. 13, the shorting vias 342 can enhance the isolation ($-|S_{21}|$) from larger than 10 dB to larger than 15 dB, with an RPD effect which is not shown here for brevity. To obtain better isolation, the slot structure 448 is employed to fine tune the current on the ground, and the $|S_{21}|$ curve can be further lowered to ~−20 dB.

Figure 14:
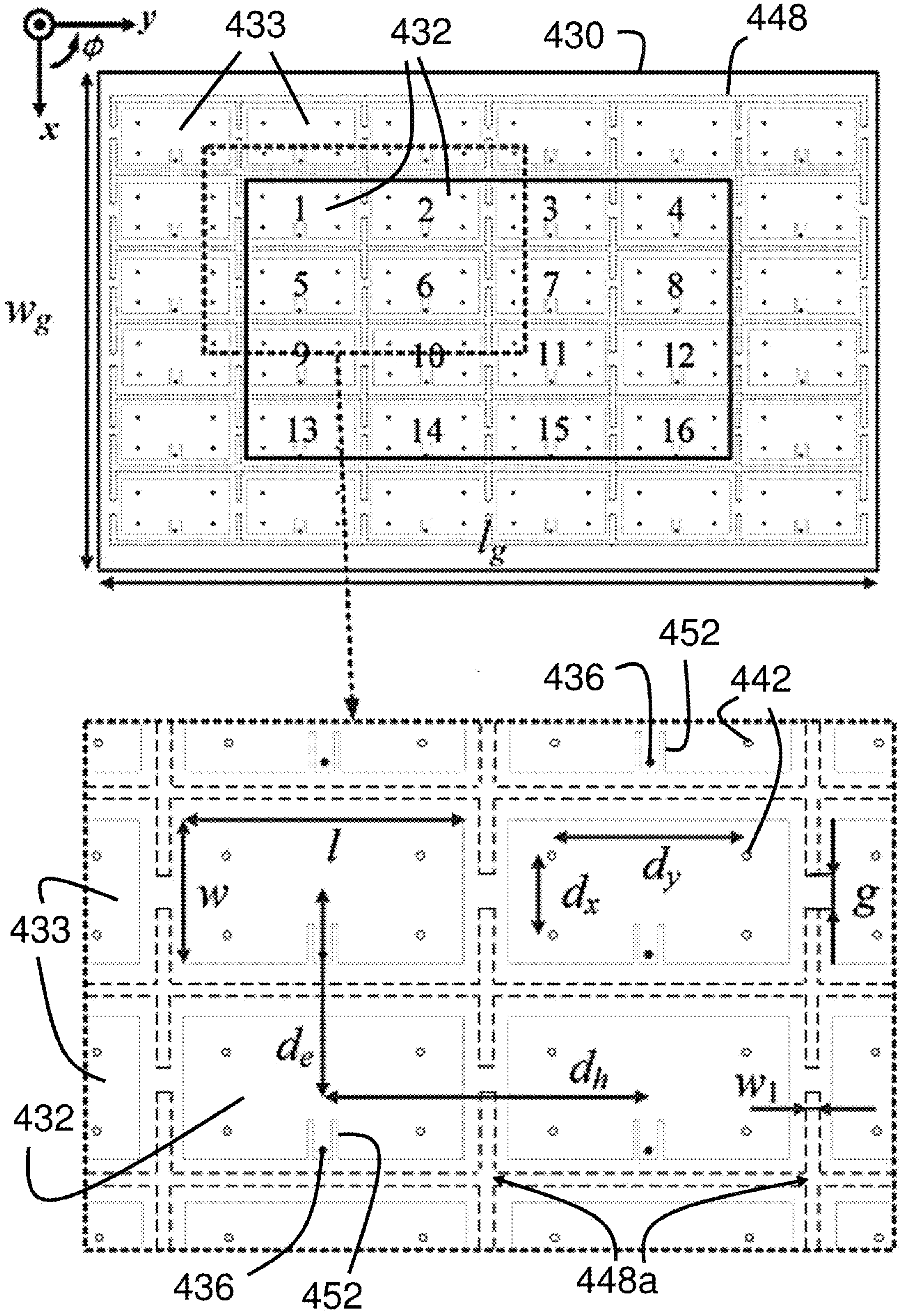
FIG. 14 illustrates a 4×4 decoupled MA array according to another embodiment of the invention.

Turning to FIG. 14, in which a 4×4 decoupled MA array according to another embodiment of the invention is shown, where the upper part of FIG. 14 shows the top view and the lower part of FIG. 14 zooms in on a 2×2 subarea. There are sixteen patches 432 in total in the array of FIG. 14, which are designated by the index numbers 1-16 in FIG. 14. The number of sixteen follows the principle that the number of the plurality of the patches being a square of N, wherein N is an integer equal to or larger than two. In addition, the sixteen patches 432 form a square shape. It can be seen in FIG. 14 that each of the sixteen individual patches 432 has a similar configuration including its shorting vias 442, port 436, and slits 452 as those of FIG. 8*b* and FIG. 11*b*. The patches 432 are formed on the top side of a substrate 430. For each of the 2×2 subarea, there are decouplings both in the H-plane and in the E-plane, because for example in the 2×2 subarea formed by the $1^{st}$, $2^{nd}$, $5^{th}$ and $6^{th}$ patches 432, the $1^{st}$ and $5^{th}$ patches 432 actually form a structure similar to that FIG. 11*b*, so there is E-plane-decoupling achieved. The same applies to the $2^{nd}$ and $6^{th}$ patches 432. On the other hand, in the 2×2 subarea formed by the $1^{st}$, $2^{nd}$, $5^{th}$ and $6^{th}$ patches 432, the $1^{st}$ and $2^{nd}$ patches 432 actually form a structure similar to that FIG. 8*b*, so there is H-plane-decoupling achieved. The same applies to the $5^{th}$ and $6^{th}$ patches 432.

As shown in FIG. 14, each of the patches 432 has length l and width w, with distances of $d_e$ and $d_h$ along +x- and +y-axes, respectively. The four shorting vias 442 are used again and inserted into every MA to realize RPD effects, with dx and dy separations along +x- and +y-axis, respectively. It should be noted that as shown in FIG. 14, surrounding the sixteen patches 432 are dummy elements 433, which are used to keep the radiation pattern symmetry of outermost ones of the sixteen patch 432 namely the $1^{st}$-$5^{th}$, $8^{th}$, $9^{th}$ and $12^{th}$-$16^{th}$ patches 432. As shown in FIG. 14, there are in total twenty such dummy elements 433. It can be seen in FIG. 14 that each of the dummy elements 433 has a similar configuration including its shorting vias 442, port 436, and slits 452 as the patches 432. The only differences are that the dummy elements 433 are not excited.

On the bottom side of the substrate 430, there is etched a slot structure 448, which contains a plurality of periodical cross slot sections 448*a* that surround the patches 432 and the dummy elements 433. The cross slot sections 448*a* are intended to achieve higher isolation, which are based on single slot sections with a uniform width $w_1$. Note that at along the direction of the x-axis, adjacent cross slot sections 448*a* do not touch each other, but there is a gap g between every two cross slot sections 448*a*. However, along the direction of the y-axis, all the cross slot sections 448*a* are interconnected. In one specific implementation, optimal design parameters for the array in FIG. 14 are as follows: $l_g$=266 mm, $w_g$=187 mm, $d_e$=26.5 mm, $w_1$=0.5 mm, $l_1$=36.5 mm, and g=2 mm.

Again, a prototype of the array in FIG. 14 is designed at 4.8-5.0 GHz band for 5G applications. With ANSYS HESS, the prototype was optimized and then fabricated, using the exemplary design parameters mentioned in the specific implementation above. With the same measurement equipment, S-parameters, radiation patterns, realized gains, realized radiation efficiencies, and ECCs are obtained. It should be noted that all of the dummy elements 433 should be always loaded with 50Ω resistors. For the patches 432, when one of the ports 436 is under test, all of the other ports 436 are also connected with 50Ω matching loads. It is also worth mentioning that only the ports 436 in the $1^{st}$, $2^{nd}$, $5^{th}$, and $6^{th}$ patches 432 are shown here for brevity, without loss of generality.

Figure 15A:
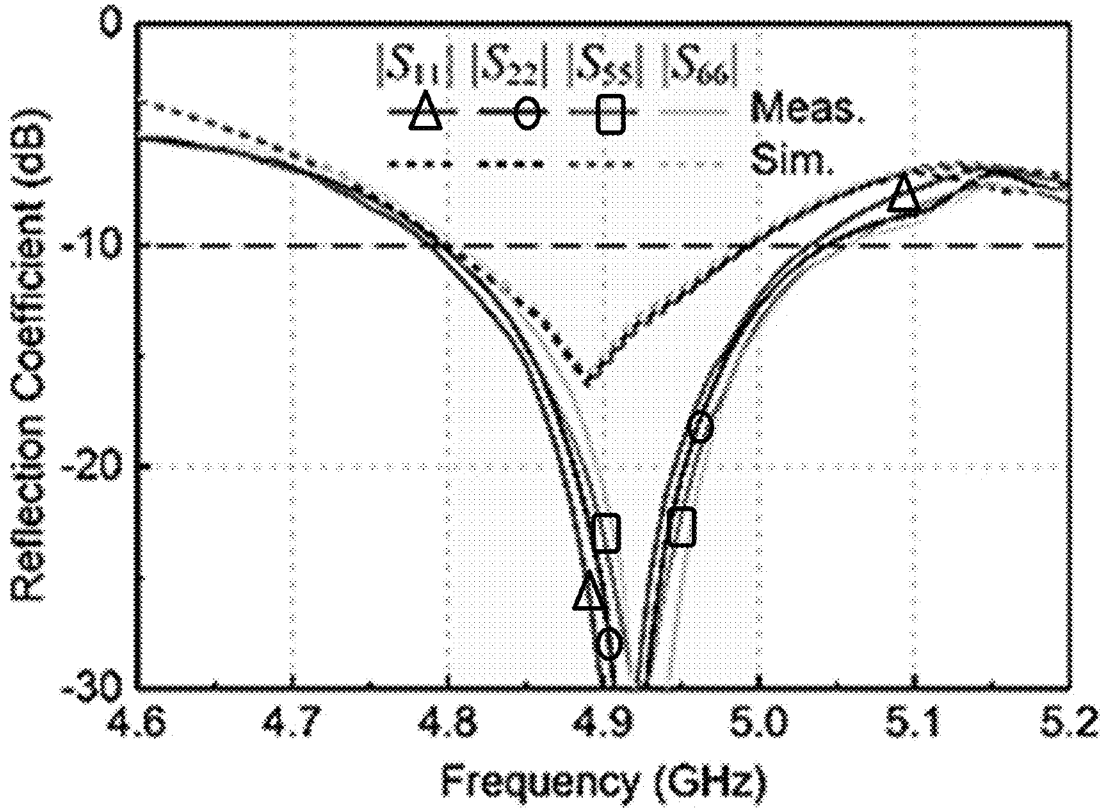
FIG. 15*a* shows measured and simulated reflection coefficients of the ports of the $1^{st}$, $2^{nd}$, $5^{th}$ and $6^{th}$ patches of the array in FIG. 14 according to one specific implementation.
Figure 15B:
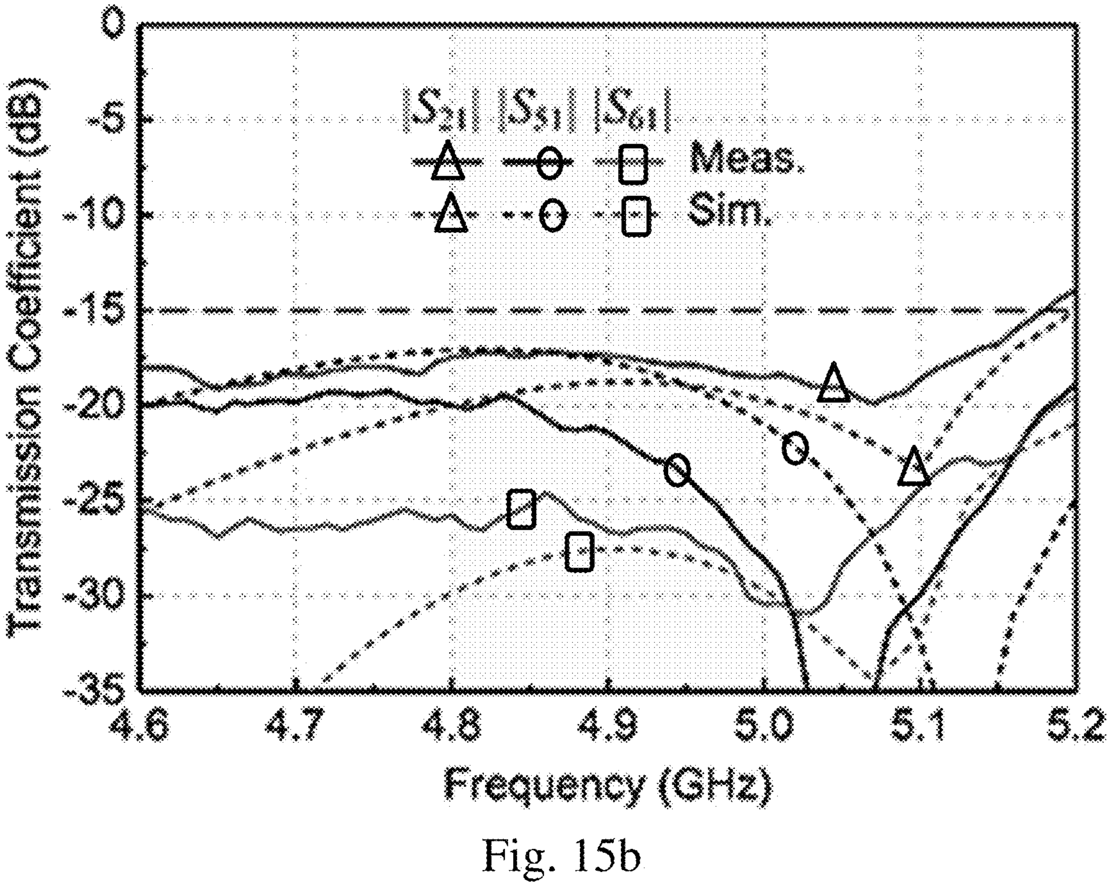
FIG. 15*b* shows transmission coefficients of the port of the $1^{st}$ patch of the array in FIG. 14 according to the specific implementation.
Figure 15C:
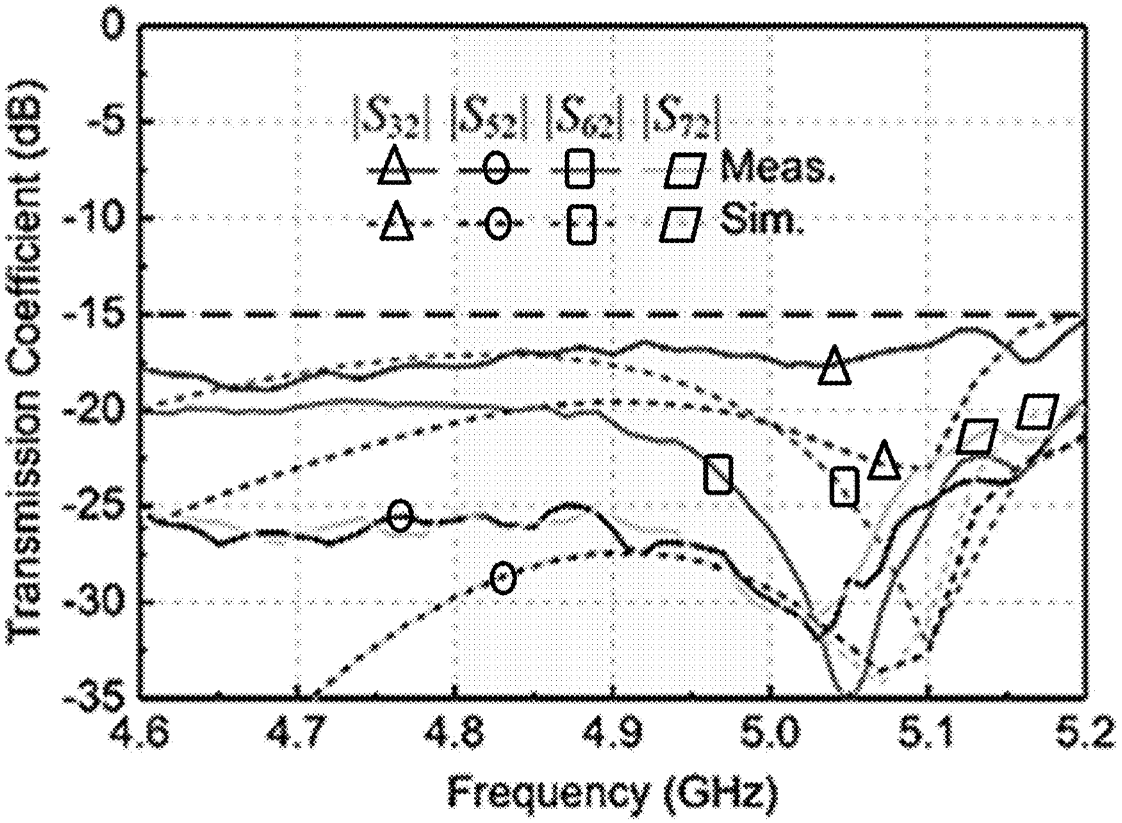
FIG. 15*c* shows transmission coefficients of the port of the $2^{nd}$ patch of the array in FIG. 14 according to the specific implementation.
Figure 15D:
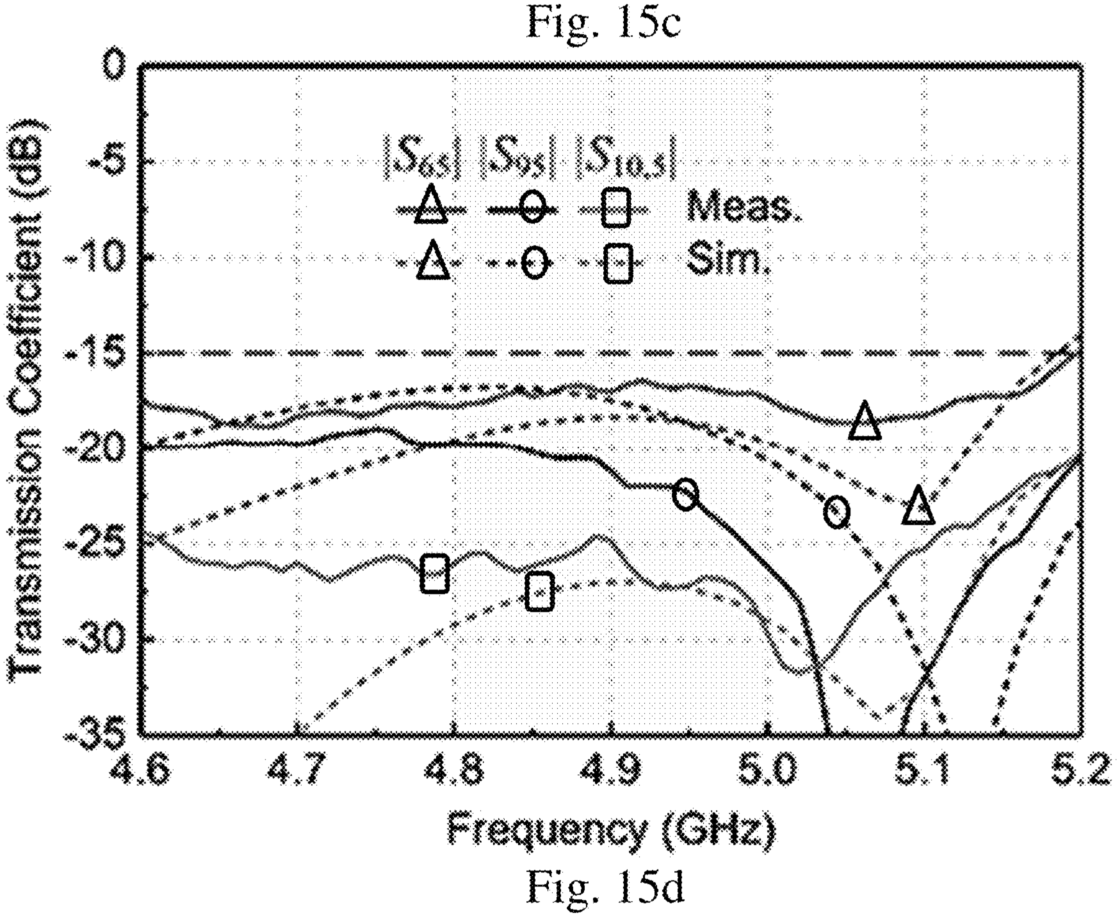
FIG. 15*d* shows transmission coefficients of the port of the $5^{th}$ patch of the array in FIG. 14 according to the specific implementation.
Figure 15E:
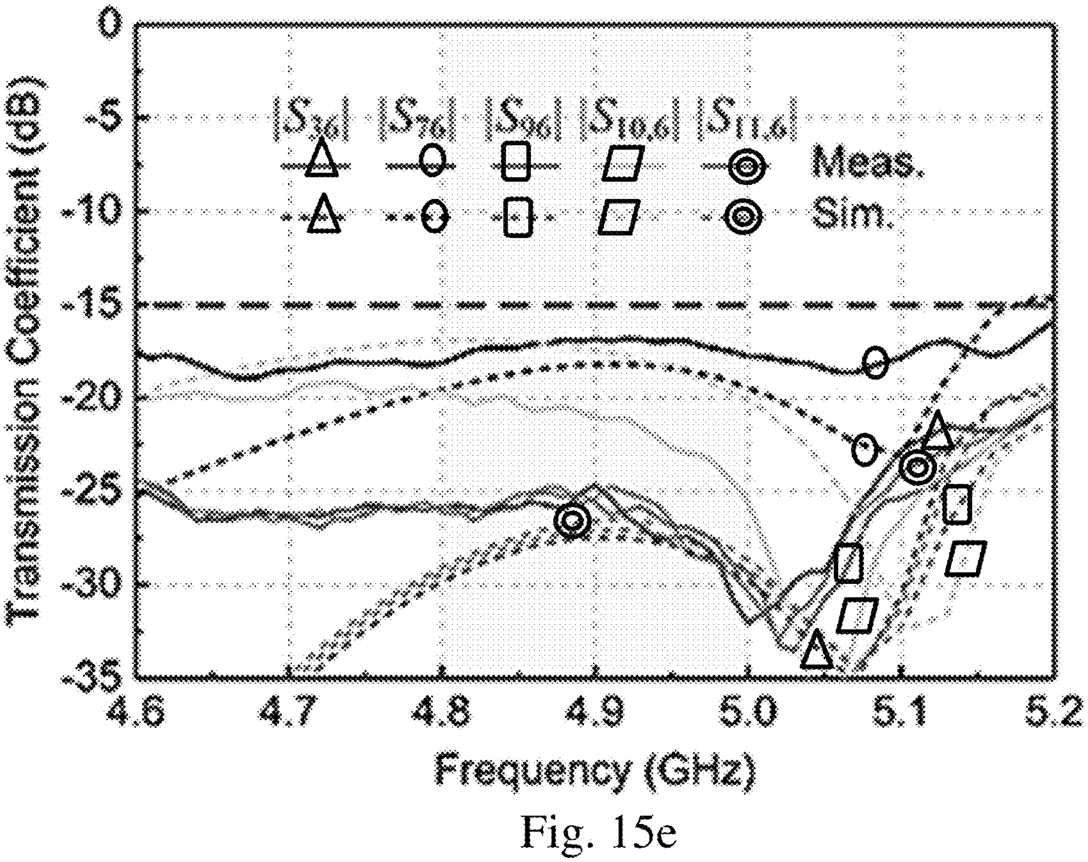
FIG. 15*e* shows transmission coefficients of the port of the $6^{th}$ patch of the array in FIG. 14 according to the specific implementation.
Figure 16A:
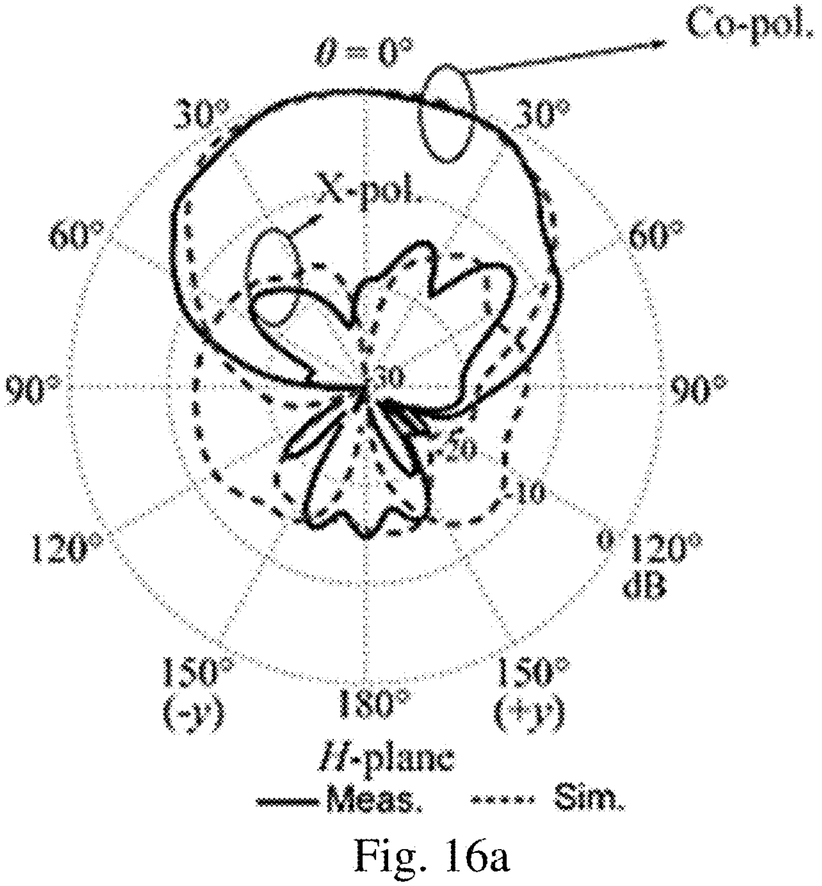
FIG. 16*a* shows measured and simulated H-plane radiation pattern of the port of the $1^{st}$ patch of the array in FIG. 14 according to the specific implementation.
Figure 16B:
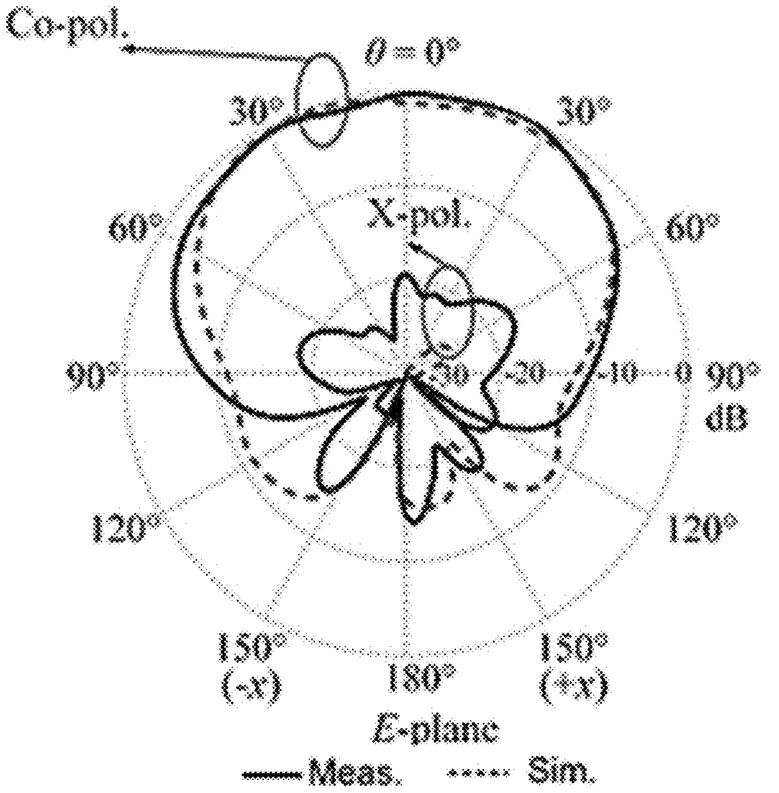
FIG. 16*b* shows measured and simulated E-plane radiation pattern of the port of the $1^{st}$ patch of the array in FIG. 14 according to the specific implementation.
Figure 16C:
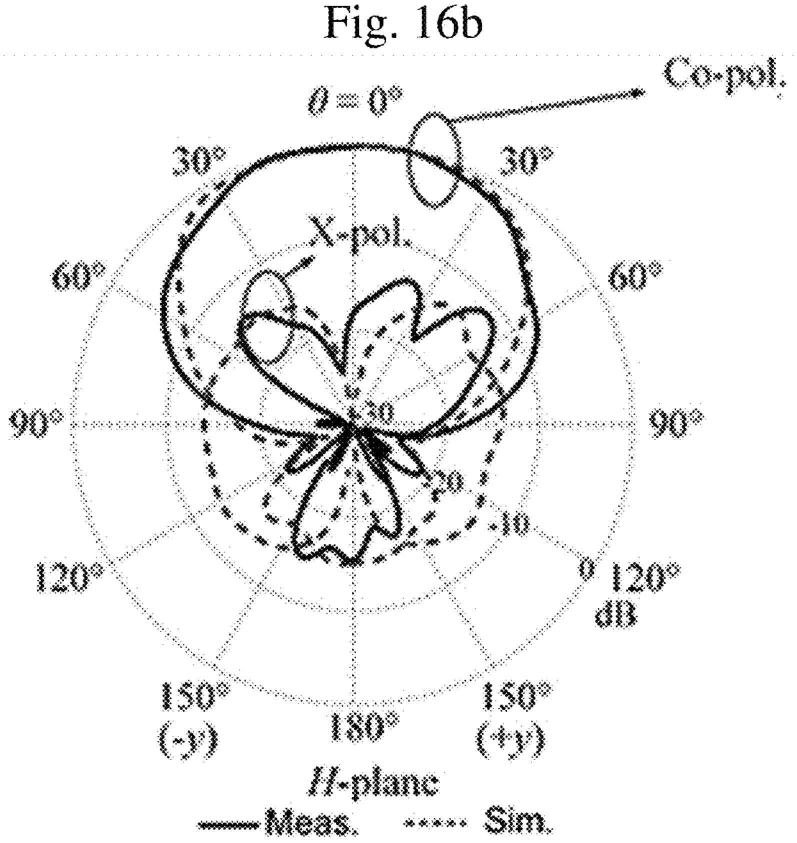
FIG. 16*c* shows measured and simulated H-plane radiation pattern of the port of the $2^{nd}$ patch of the array in FIG. 14 according to the specific implementation.
Figure 16D:
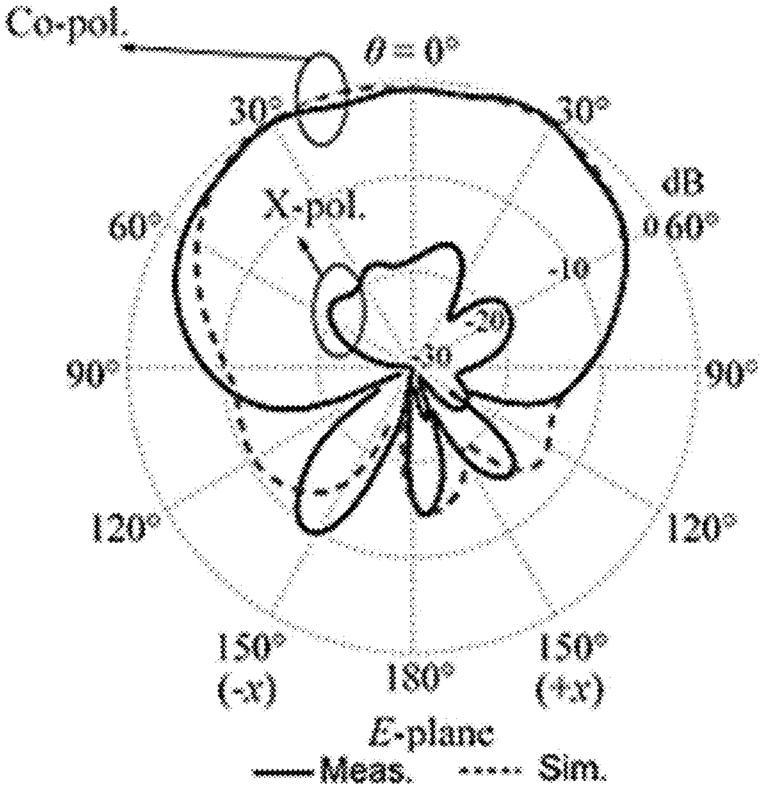
FIG. 16*d* shows measured and simulated E-plane radiation pattern of the port of the $2^{nd}$ patch of the array in FIG. 14 according to the specific implementation.
Figure 16E:
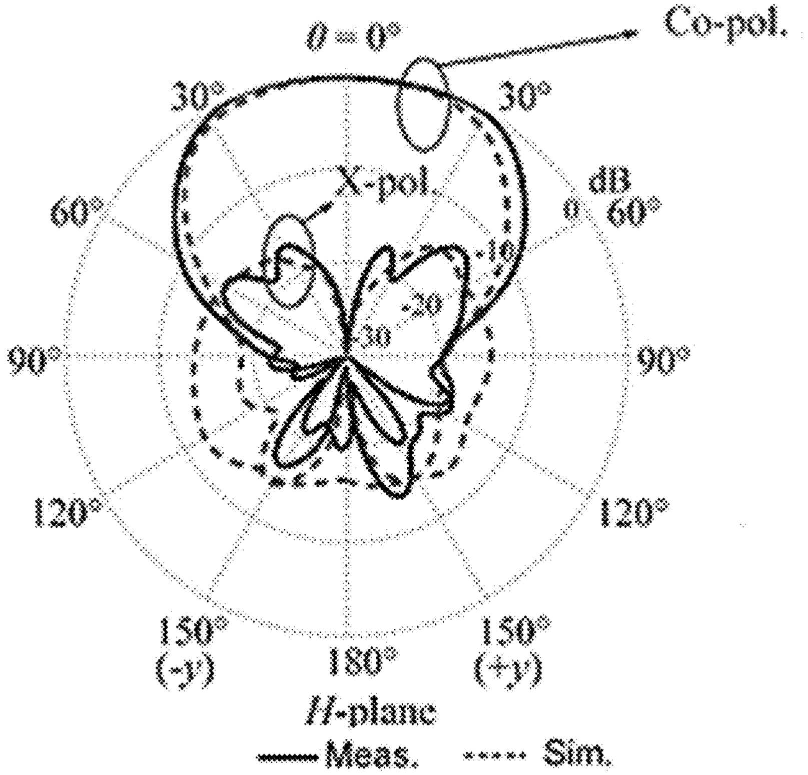
FIG. 16*e* shows measured and simulated H-plane radiation pattern of the port of the $5^{th}$ patch of the array in FIG. 14 according to the specific implementation.
Figure 16F:
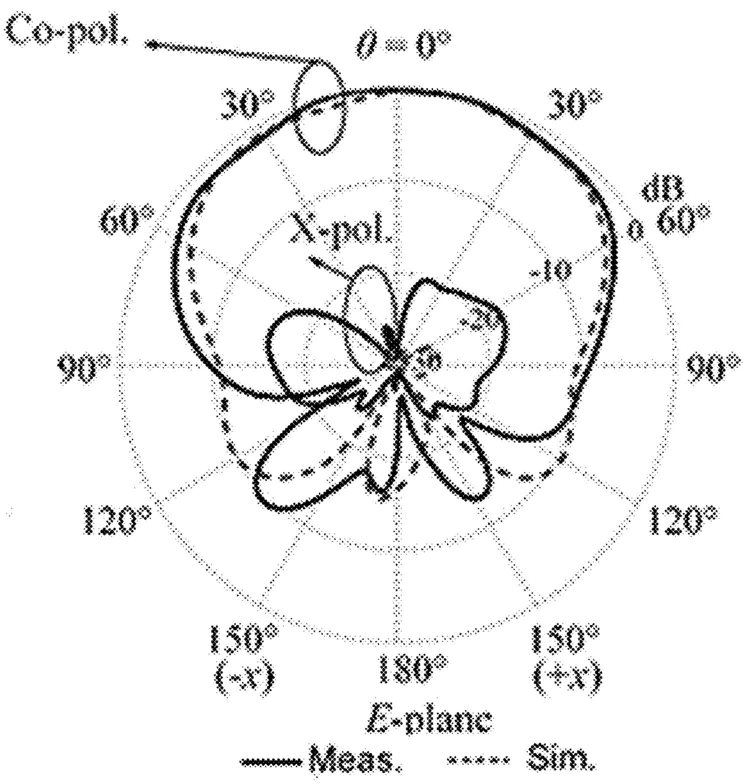
FIG. 16*f* shows measured and simulated E-plane radiation pattern of the port of the $5^{th}$ patch of the array in FIG. 14 according to the specific implementation.
Figure 16G:
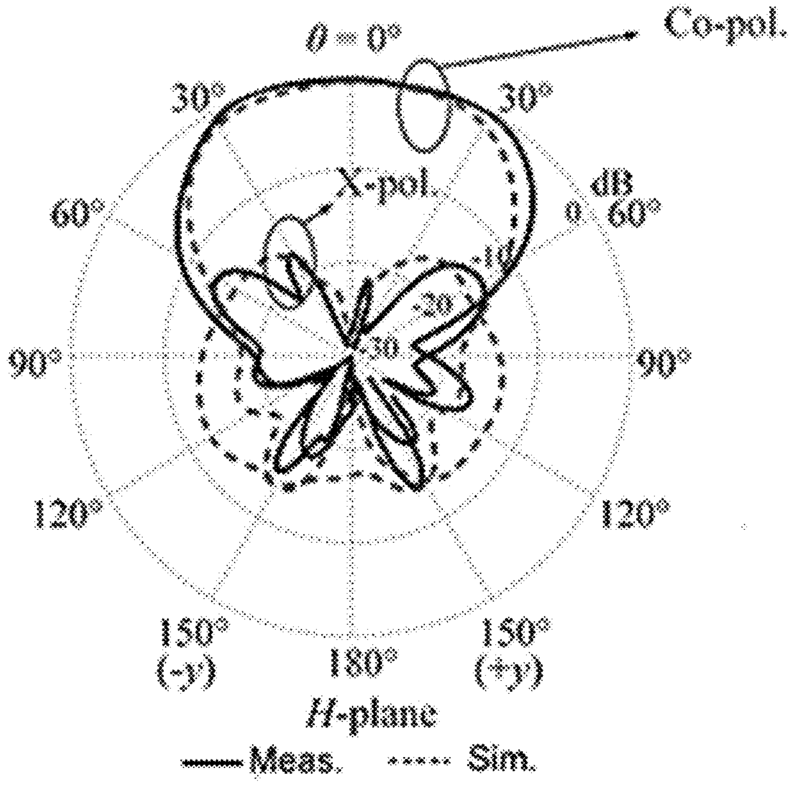
FIG. 16*g* shows measured and simulated H-plane radiation pattern of the port of the $6^{th}$ patch of the array in FIG. 14 according to the specific implementation.
Figure 16H:
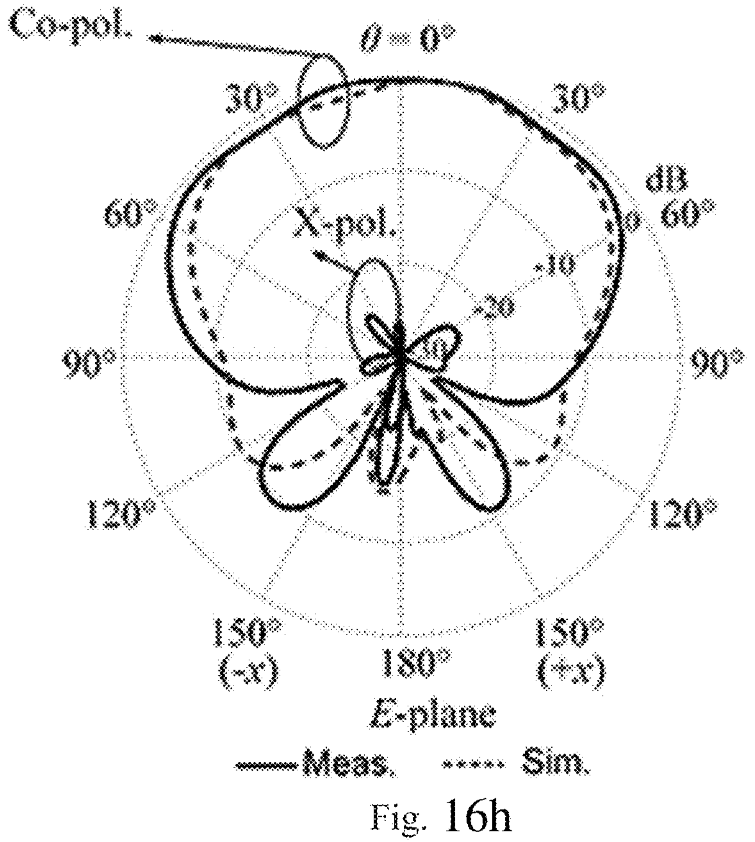
FIG. 16*h* shows measured and simulated E-plane radiation pattern of the port of the $6^{th}$ patch of the array in FIG. 14 according to the specific implementation.

FIGS. 15*a*-15*e* compare measured and simulated S-parameters of the antenna array of FIG. 14, where FIG. 15*a* gives the reflection coefficients and FIGS. 15*b*-15*e* display the transmission coefficients. With reference to FIG. 15*a*, the measured overlapping 10 dB impedance bandwidth is 5.1% (4.79-5.04 GHZ), which agrees well with the simulated value of 4.1% (4.80-5.00 GHz), fully covering the desired 4.8-5.0 GHz band. The little discrepancy may be due to the loss of the antennas and connectors. For the transmission coefficients, all of the measured results are lower than −16.5 dB, reasonably agreeing with the simulated ones lower than −17 dB. It should also be noted that the transmission coefficients between non-adjacent ports are not included in FIGS. 15*b*-15*e* for brevity, since they are lower than −25 dB in measurements and simulations.

FIGS. 16*a*-16*h* show the measured and simulated radiation patterns of the antenna of FIG. 14 at 4.90 GHz, where reasonable agreement can be seen. As can be observed in FIGS. 16*a*-16*h*, all of the radiation patterns are typical unidirectional ones. All of the cross-polarizations are lower than their co-polar counterparts by at least −19 dB at the broadside direction. The measured 3 dB beamwidths of the E- and H-plane are ~110° and ~80°, respectively. The radiation patterns are relatively uniform, and fluctuate by less than 10°, namely the RPD effect. Also, the front-to-back ratios are larger than 15 dB, which can be used for practical scenarios. The discrepancy may be due to fabrication tolerance and experimental errors.

Figure 17A:
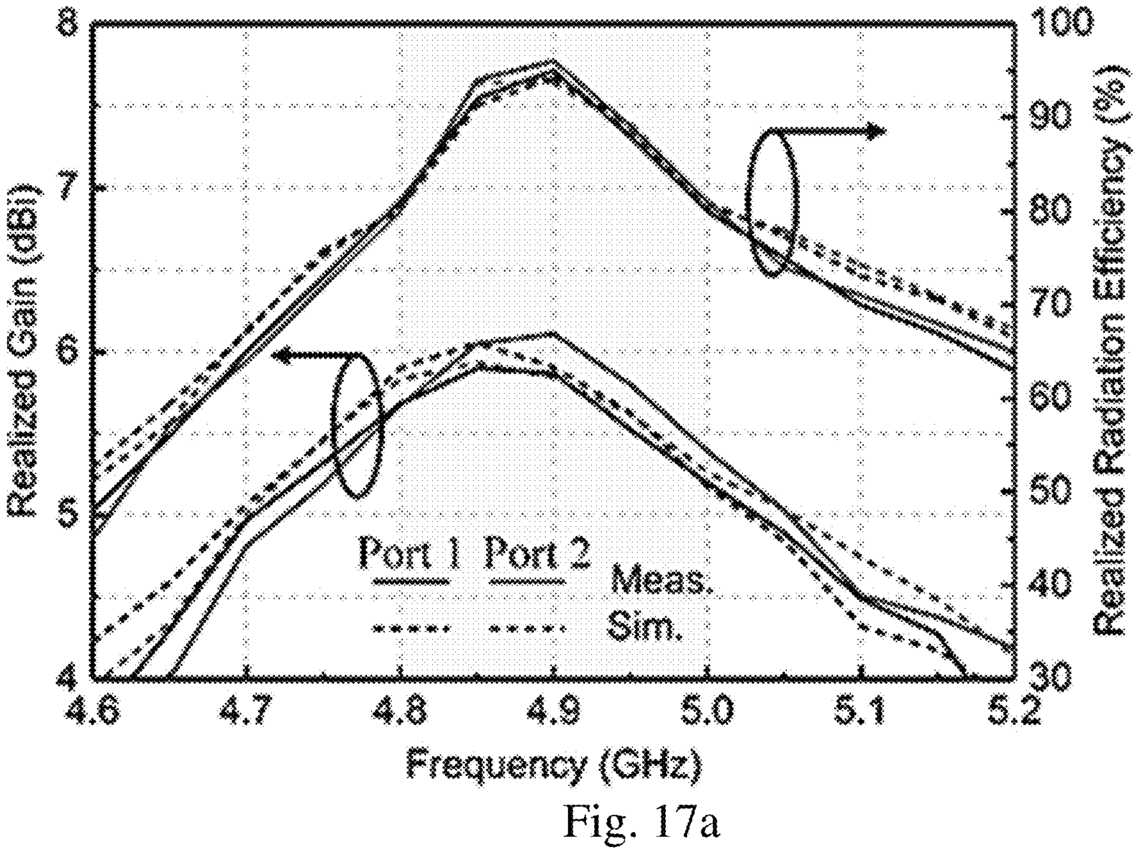
FIG. 17*a* shows measured and simulated realized gains and realized radiation efficiencies of the ports of the $1^{st}$ and $2^{nd}$ patches of the antenna array in FIG. 14 according to the specific implementation.
Figure 18A:
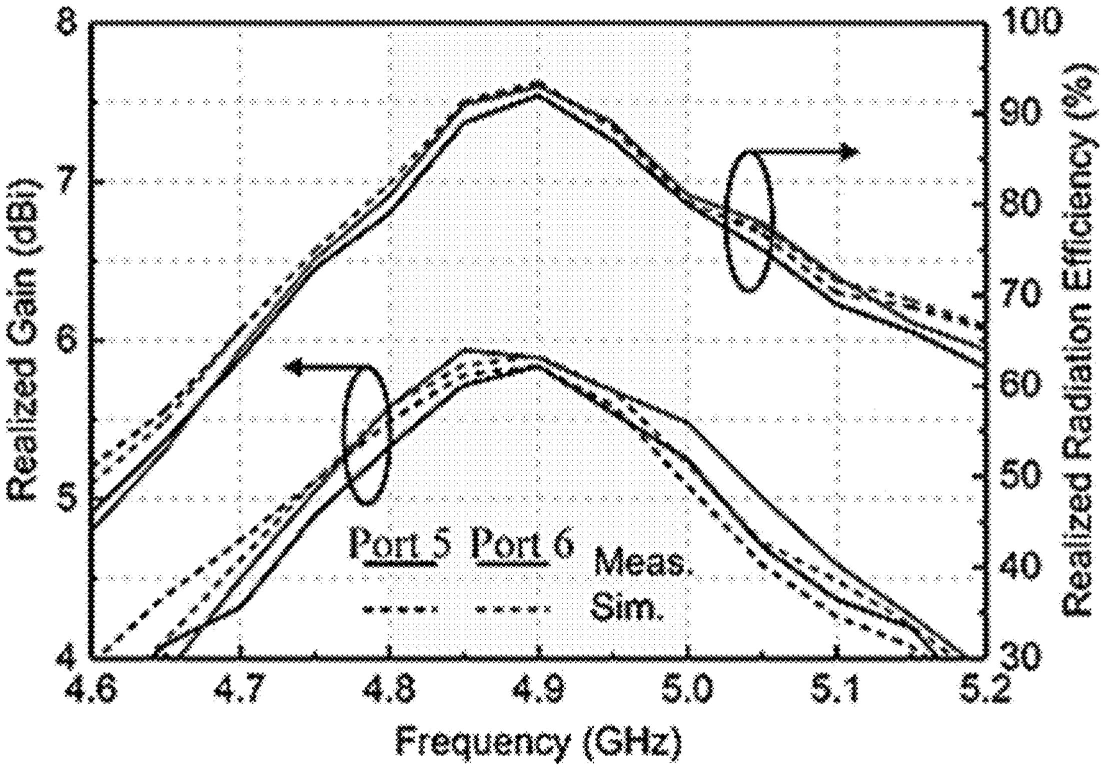
FIG. 18*a* shows measured and simulated ECCs related to the port of the $1^{st}$ patch of the array in FIG. 14 according to the specific implementation.
Figure 18A:
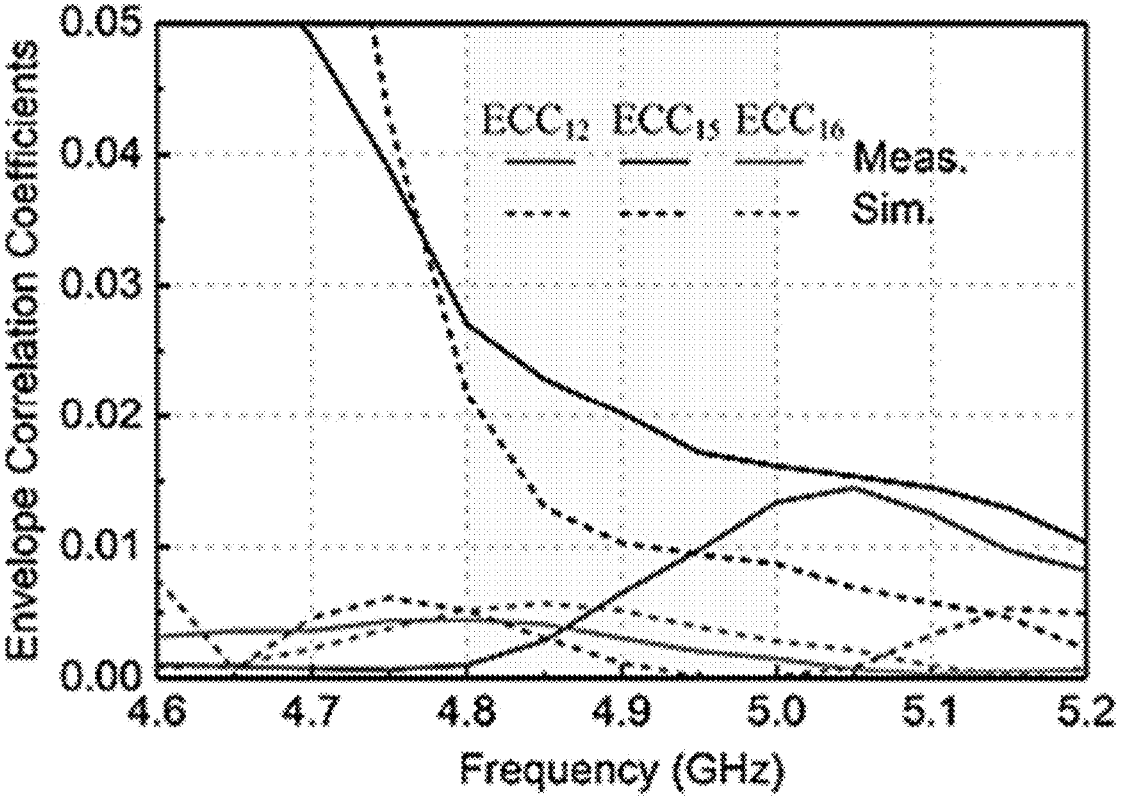
Figure 18B:
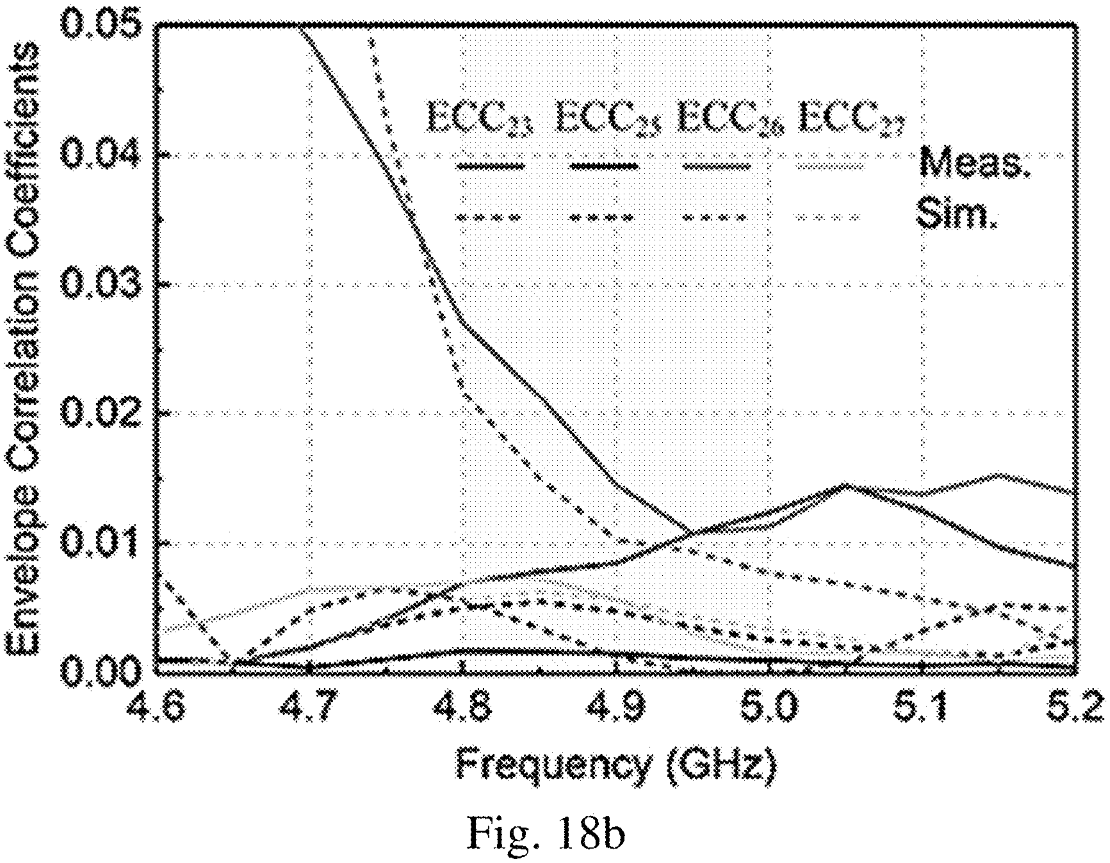
FIG. 18*b* shows measured and simulated ECCs related to the port of the $2^{nd}$ patch of the array in FIG. 14 according to the specific implementation.
Figure 18C:
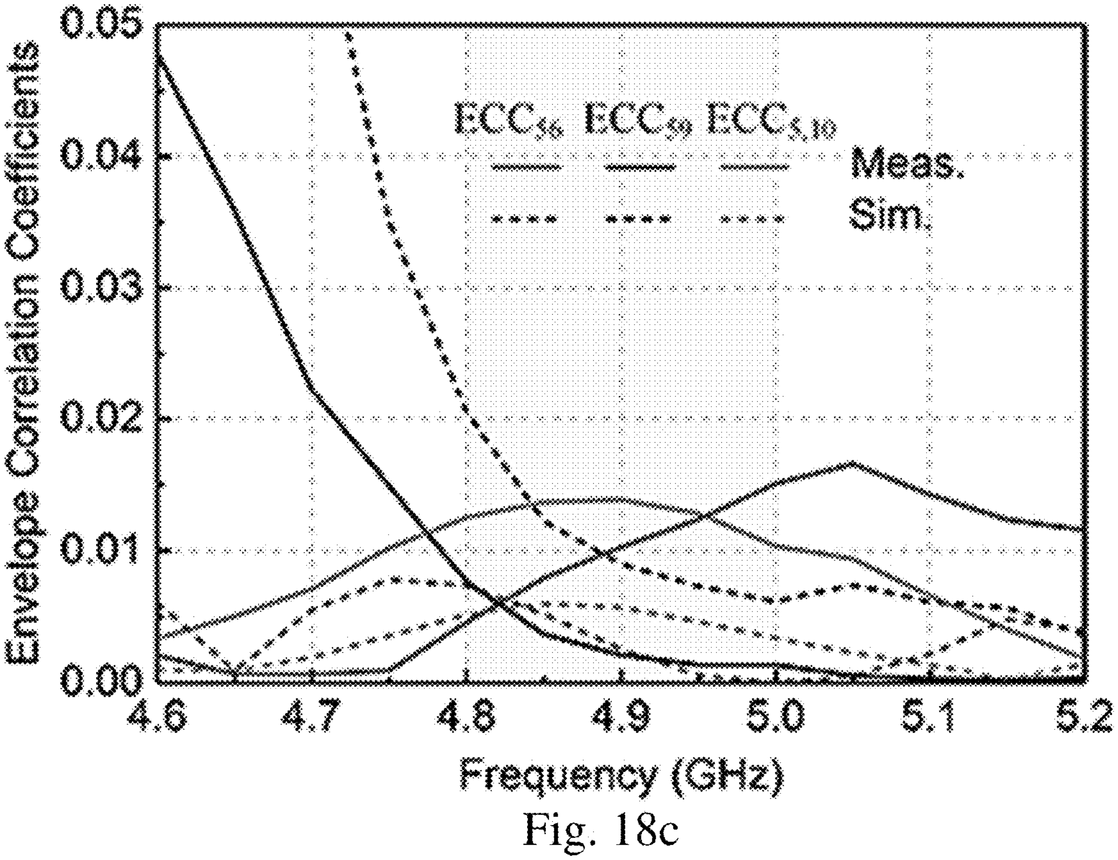
FIG. 18*c* shows measured and simulated ECCs related to the port of the $5^{th}$ patch of the array in FIG. 14 according to the specific implementation.
Figure 18D:
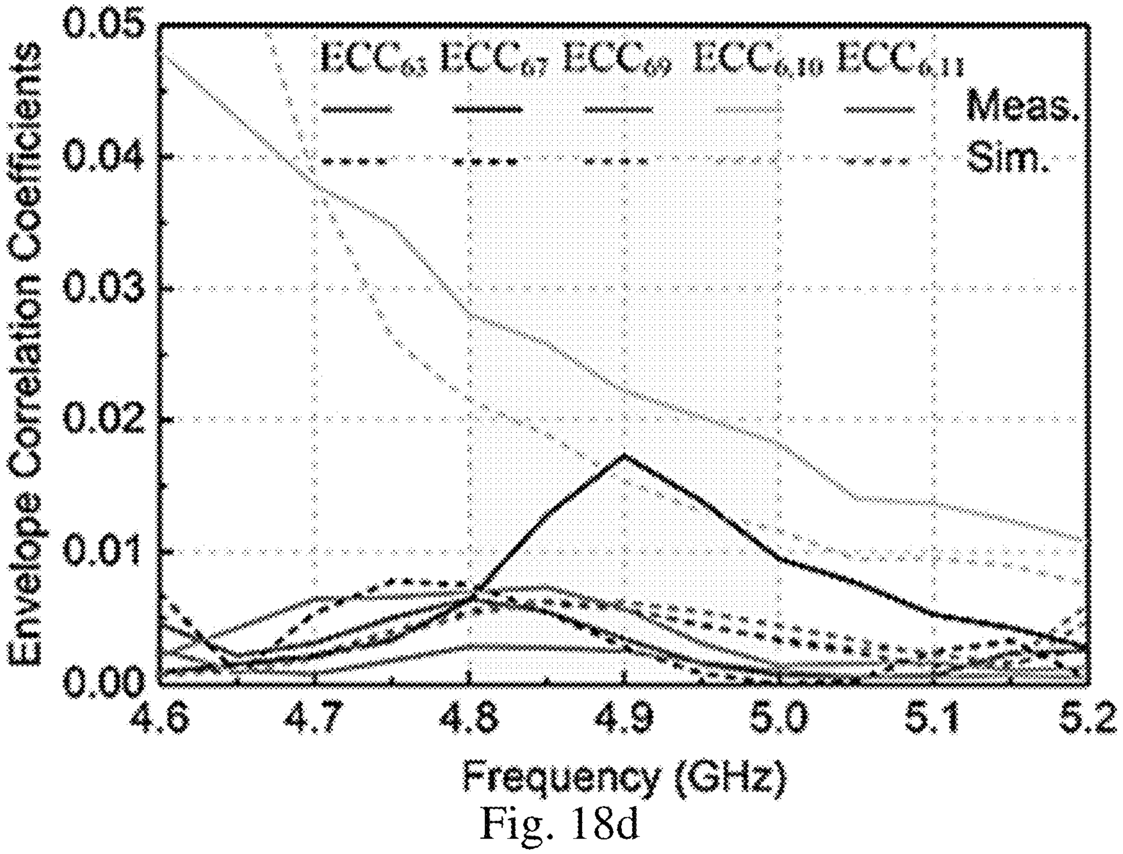
FIG. 18*d* shows measured and simulated ECCs related to the port of the $6^{th}$ patch of the array in FIG. 14 according to the specific implementation.
Figure 19A:
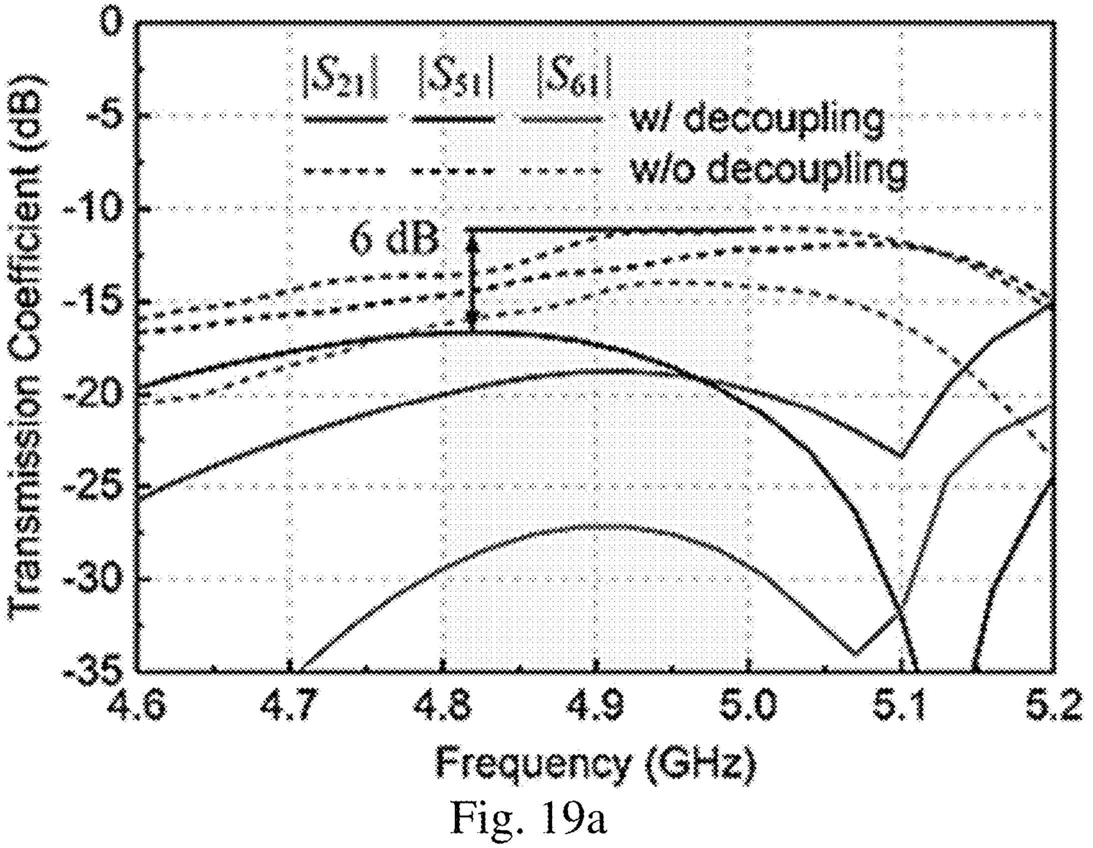
FIG. 19*a* shows comparison of simulated transmission coefficients of the port of the $1^{st}$ patch in the array of FIG. 14 with and without decoupling.
Figure 19B:
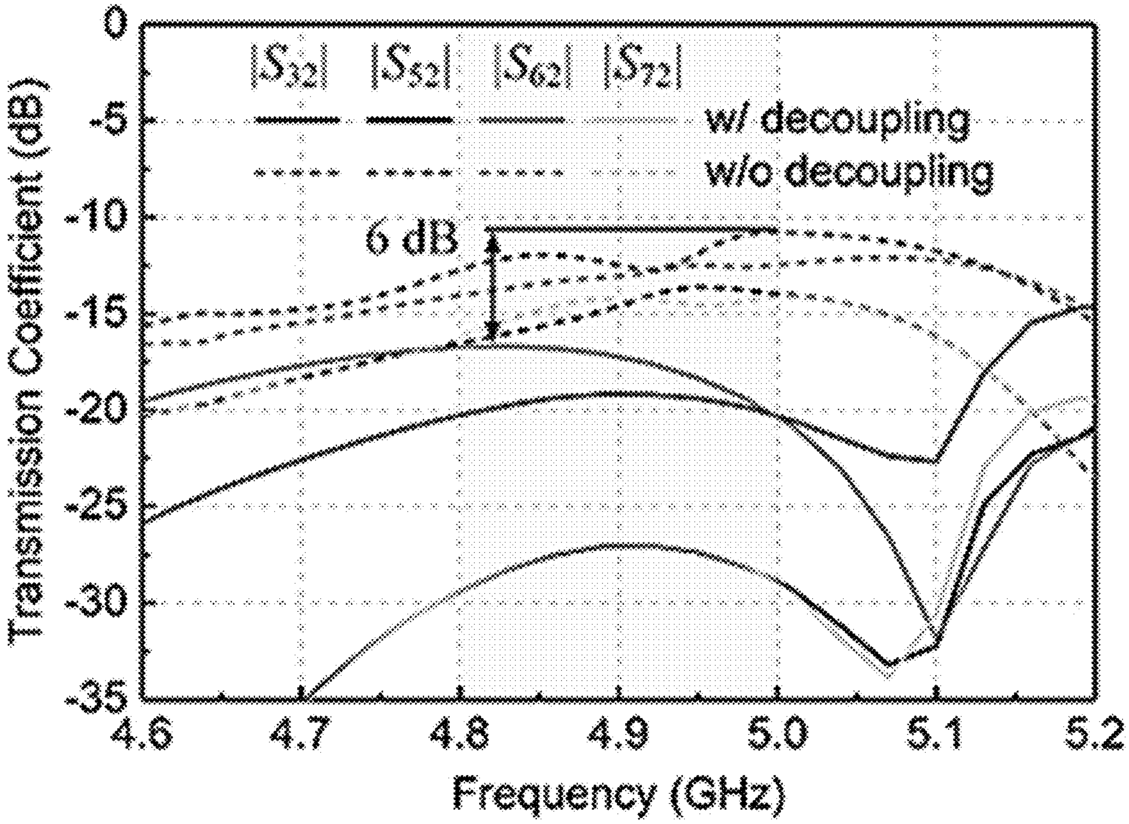
FIG. 19*b* shows comparison of simulated transmission coefficients of the port of the $2^{nd}$ patch in the array of FIG. 14 with and without decoupling.
Figure 19C:
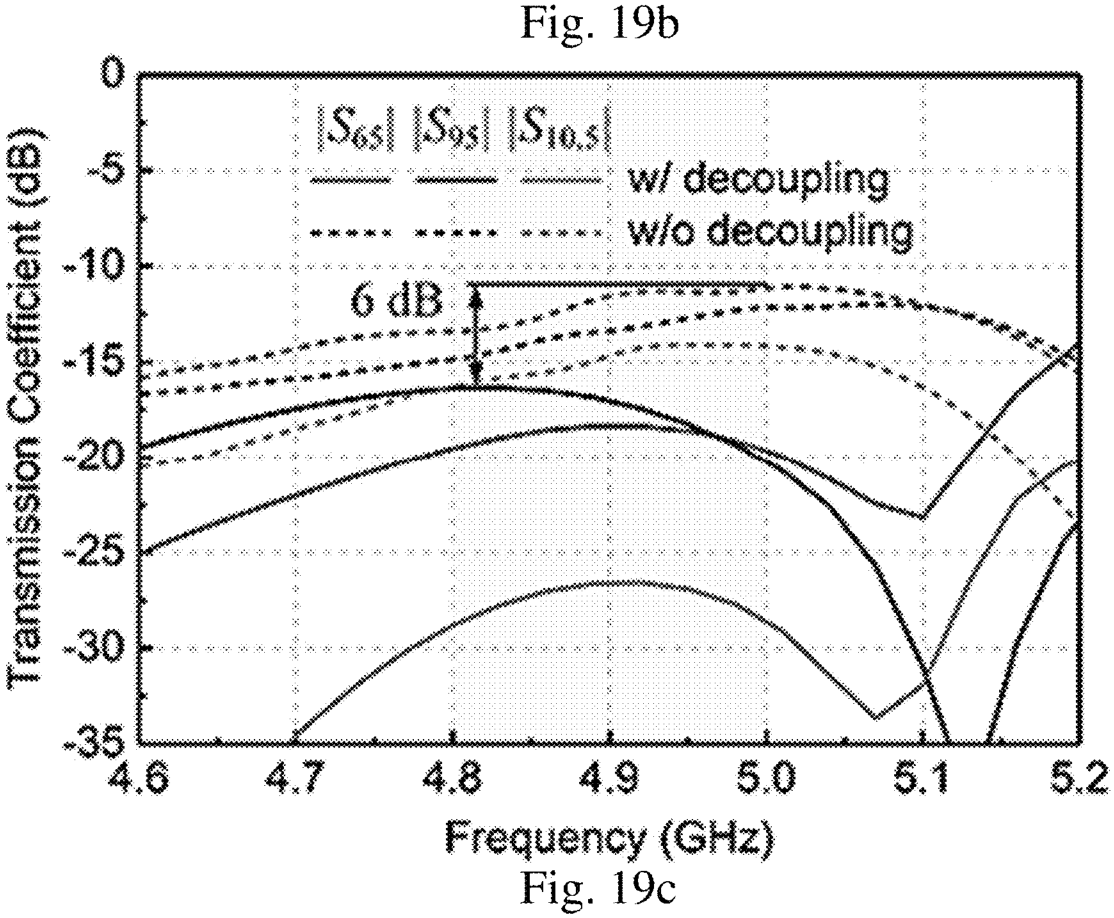
FIG. 19*c* shows comparison of simulated transmission coefficients of the port of the $5^{th}$ patch in the array of FIG. 14 with and without decoupling.
Figure 19D:
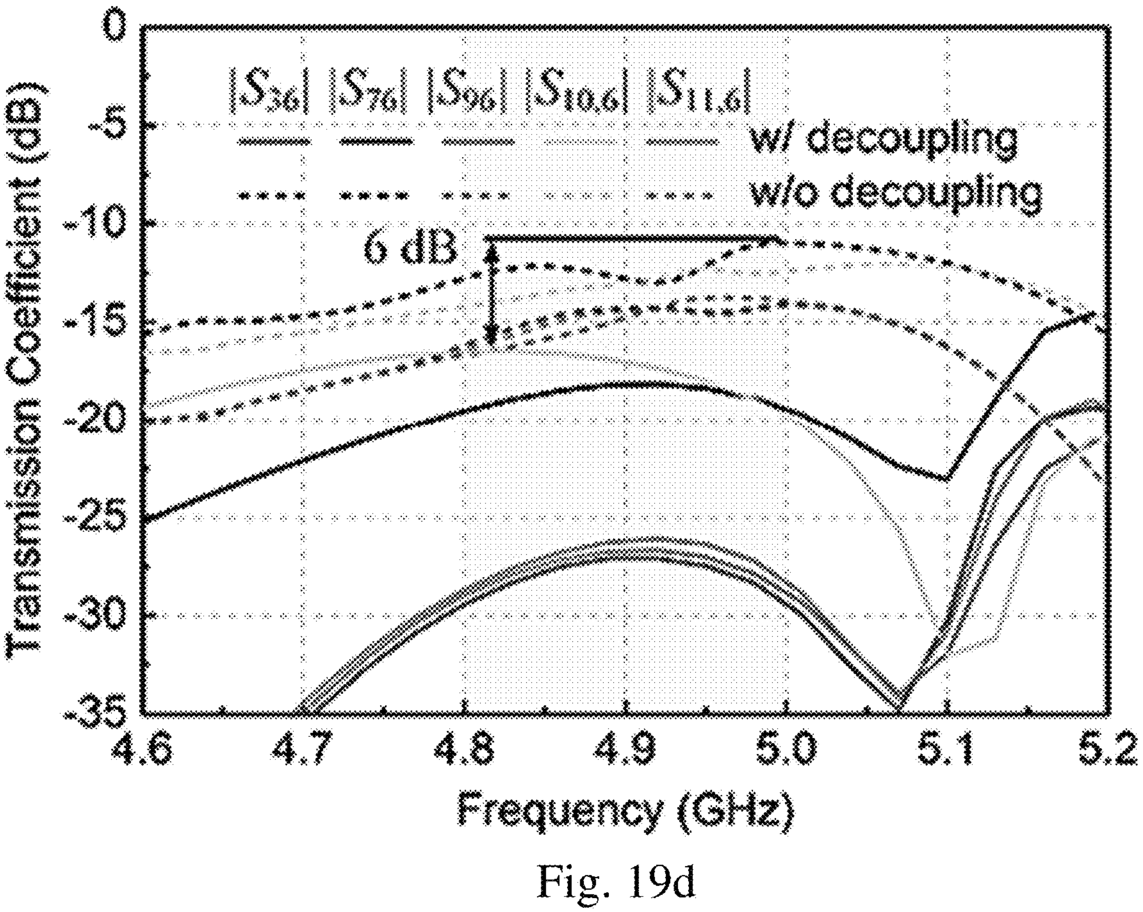
FIG. 19*d* shows comparison of simulated transmission coefficients of the port of the $6^{th}$ patch in the array of FIG. 14 with and without decoupling.
Figure 20A:
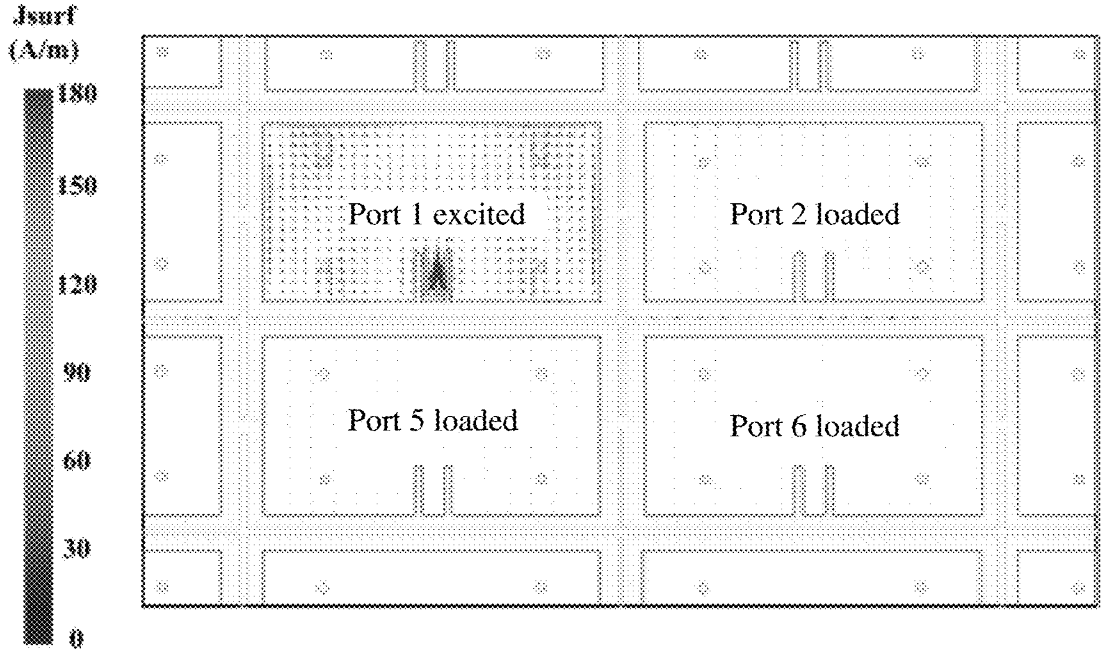
FIG. 20*a* shows simulated current distribution on patches and ground of the 2×2 subarea in FIG. 14 at 4.9 GHZ, when the port of the $1^{st}$ patch is excited.
Figure 20B:
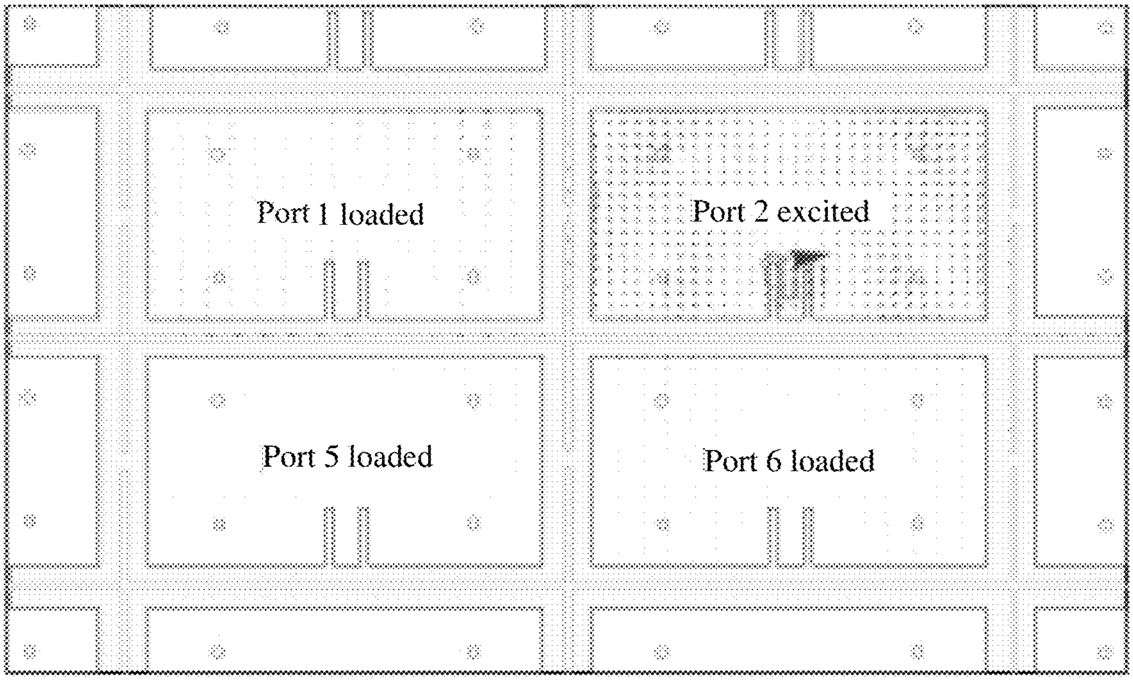
FIG. 20*b* shows simulated current distribution on patches and ground of the 2×2 subarea in FIG. 14 at 4.9 GHz, when the port of the $2^{nd}$ patch is excited.
Figure 20C:
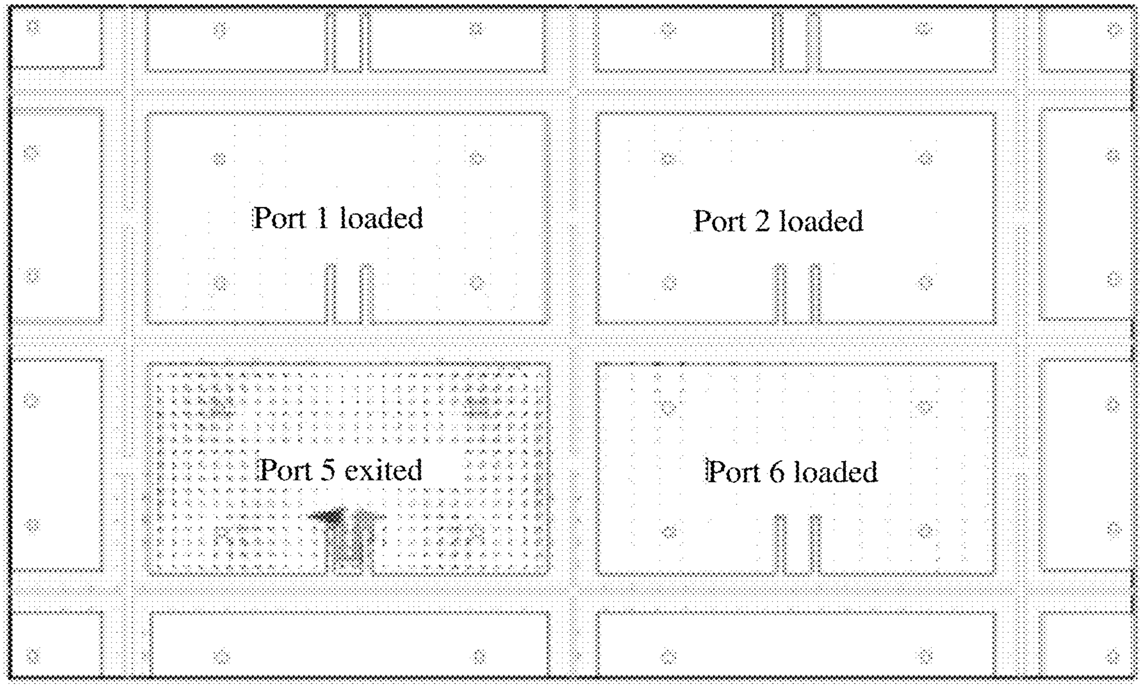
FIG. 20*c* shows simulated current distribution on patches and ground of the 2×2 subarea in FIG. 14 at 4.9 GHZ, when the port of the $5^{th}$ patch is excited.
Figure 20D:
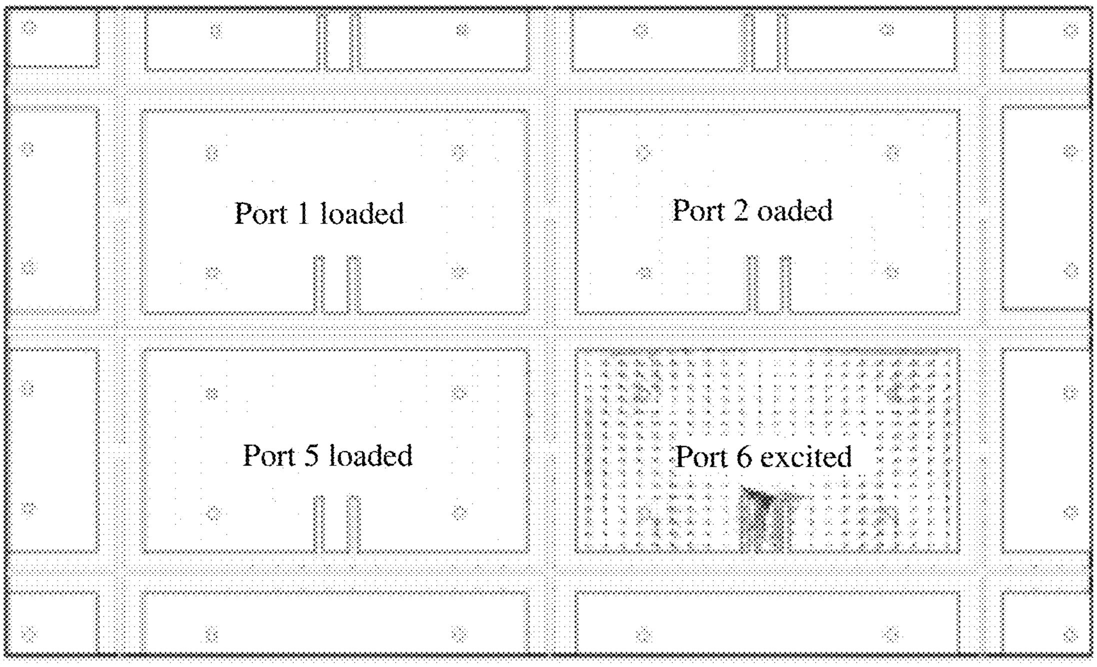
FIG. 20*d* shows simulated current distribution on patches and ground of the 2×2 subarea in FIG. 14 at 4.9 GHZ, when the port of the $6^{th}$ patch is excited.

FIGS. 17*a*-17*b* show the realized gains. With reference to FIGS. 17*a*-17*b*, good agreement can be observed, with all of the measured and simulated realized gains ranging from 5.2 to 6.1 dBi over the 4.80-5.00 GHz band. It should be mentioned that the realized gains of the MA elements are relatively low compared with the conventional MA element, which is expected due to the wide beamwidths (see FIGS. 16*a*-16*h*). The realized radiation efficiencies are also plotted in FIGS. 17*a*-17*b* for ease of comparison. As can be seen from the FIGS. 17*a*-17*b*, the trends of the realized radiation efficiencies are nearly the same with those of the realized gains, as expected. Besides, all of the measured realized radiation efficiencies are larger than 80% over the operating band, with a maximum value of 94% at 4.90 GHz.

FIGS. 18*a*-18*d* present the measured and simulated ECCs between the antenna elements in the presented subarea and their adjacent elements, where reasonable agreement can be observed. It can be noted that any measured ECC in the figure is lower than 0.028 over the desired band, good enough for practical applications. It can be found that the ECCs calculated from two E-plane-coupled ports, namely $ECC_{15}$ (which means the ECC between the port of the $1^{st}$ patch 532 and that of the $5^{th}$ patch 532, for example), $ECC_{26}$, $ECC_{59}$, and $ECC_{6,10}$, are higher than other ECCs. This phenomenon can be predicted due to the higher E-plane coupling level and smaller center-to-center spacing. The discrepancy can be attributed to experimental errors.

Table I below compares key performances of decoupling techniques and their flexibility. As shown in the table, [20], [48], and [49] only show their effectiveness in 1×2 antenna designs. Loaded resonators [50] are used for decoupling a 2×2 MIMO design, but without RPD effect. It has been shown in [51] that lumped inductances have RPD abilities for 1×2 E-plane MAs, without showing its effectiveness for 1×4 or 4×4 MIMO designs. RPD performances have been obtained in [28] and [37], and only linear array design examples with 1×4 and 1×2 elements can be found, respectively. In comparison, exemplary embodiments of the invention (labeled "This work" in Table I) not only can be used in both E- and H-plane decoupling designs, but have RPD effects for large-scale 2-D MIMO antenna systems or antenna arrays as well.

TABLE I

PERFORMANCE COMPARISON OF PRESENTED DESIGN WITH OTHER APPROACHES

| Ref. | Decoupling Schemes | Impedance bandwidth | Antenna element | Decoupling type | Pattern uniformity |
|---|---|---|---|---|---|
| [20] | DGS | 1.1% | 1 × 2 | E-plane | Not Given |
| [48] | Feeding network | 5.3% | 1 × 2 | E-plane | Not Given |
| [49] | Metamaterial | 1.2% | 1 × 2 | E-plane | No |
| [50] | Loaded resonator | 9.9% | 2 × 2 | E- and H-plane | No |
| [51] | Inductance | 5.5% | 4 × 4 | E-plane | Not Given |
| [28] | Weak field | 3.4% | 1 × 4 | E-plane | Yes |
| [37] | Superposition principle | 7.7% | 1 × 2 | E- and H-plane | Yes |
| This work | Superposition principle | 5.1% | 4 × 4 | E- and H-plane | Yes |

FIGS. 19*a*-19*d* compare the transmission coefficients of the array of FIG. 14 with and without the decoupling structures. Without the four shorting vias, the reference patch uses l=32.2 mm and w=16.7 mm, which will resonate at the same band for comparison. With reference to FIGS. 19*a*-19*d*, the transmission coefficients of the reference design are lower than −11 dB, whereas those of the presented design can be suppressed to lower than −17 dB, verifying the port decoupling effects. It should be noted that the transmission coefficients of −17 dB are slightly higher than those in the 1×2 approaches (−24 dB in FIGS. 9*a*-9*e* and −19.5 dB in FIGS. 12*a*-12*g*), since the antenna of FIG. 14 should make a compromise between E- and H-plane decoupling effects.

To demonstrate the decoupling effect, FIGS. 20*a*-20*d* plot the simulated current distributions on the patches and ground for the antenna in FIG. 14, when the ports of the $1^{st}$, $2^{nd}$, $5^{th}$ and $6^{th}$ patches are in turn excited and the other ports are loaded. It can be seen in the figure that the current only exists around the excited patch, along with the help of the shorting vias and the slots in the ground. Therefore, the RPD effects can be easily obtained with these constrained field distributions.

One can see that various exemplary embodiments described above utilize an RPD method using shorting vias for 2-D MA MIMO or array designs. The decoupling philosophy can be derived from a simplified two-dipole-source model. When the coupling amplitude is close to zero or the overall phase of the coupled source is in phase with that of the excited source, the superposed fields will radiate along the same direction, thus obtaining an RPD effect.

To verify this decoupling scheme, two MA design examples for H- and E-plane-decoupled cases are designed, fabricated, and measured. It can be proved that the total current on the coupled MA is with nearly-zero amplitude or in phase compared with the excited MA. Both of the designs have overlapping 10 dB impedance bandwidths larger than 4.8%, enough for practical applications. Slots are etched in the ground to further suppress the amplitude of the total current on the coupled patch and then enhance the isolation to higher than 24 dB and 19.5 dB for H- and E-plane decoupled cases, respectively. It should be noted that their main beams of the radiation patterns are along θ=0° direction.

A 2-D 4×4 MA design is then presented to prove the flexibility of the decoupling scheme for large-scale MIMO or array antennas. Again, shorting vias are employed for decoupling and the slots in the ground are used to further enhance the port isolations. The measured overlapping bandwidth is 5.1% (4.79-5.04 GHZ), fully covering the desired band, with isolations between any two adjacent ports higher than 16.5 dB. The measured realized gains and realized radiation efficiencies are larger than 5.2 dBi and 80%, respectively. It should be noted that the radiation patterns of each element feature the RPD effect, which is promising for large-scale MIMO or array antennas. In fact, the 2-D 4×4 MIMO antenna array as shown in FIG. 14 can be regarded as a subarray in a large scale 2-D array.

The exemplary embodiments are thus fully described. Although the description referred to particular embodiments, it will be clear to one skilled in the art that the invention may be practiced with variation of these specific details. Hence this invention should not be construed as limited to the embodiments set forth herein.

While the embodiments have been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

For example, in the exemplary embodiments shown above, the shapes of the patches, the substrates, or that defined by the four shorting vias on each patch, are all rectangles. However, those skilled in the art should realize that in variations of the exemplary embodiments one or more of the above may take a different shape (e.g., circular, cuboid, prism) according to design requirements.

Similarly, although in the exemplary embodiments shown above, there are four shorting vias on each patch, in other variations of the exemplary embodiments there could be more or less shorting vias (e.g., two) configured in each patch. The locations of the shorting vias relative to the patch may also be adjusted according to design requirements.

Microstrip antennas are used as examples to illustrate the RPD method according to embodiments of the invention. Skilled persons should understand the RPD method may be applied also to any types of radiators such as patches, dielectric resonator antennas and dipoles, etc. In addition, specific design parameters are provided above for various antennas according to exemplary embodiments for certain operating frequencies, and one should realize that both the operating frequency and the design parameters (e.g., the dielectric constant of the substrate, its thickness, the separation between the two patches, or other dimensions or parameters mentioned above) are not intended to be limited. Rather, for example the operating frequency can be changed to other frequency bands.

Coaxial probes are used examples in providing feedings to microstrip patches in exemplary embodiments described above. Person skilled in the art will realize that the feed structure of the antenna can be in other forms, such as microstrip coupled line structure or L-shaped probe.

What is claimed is:

1. A microstrip antenna, comprising:

a) a substrate;

b) a ground on a second side of the substrate;

c) a first patch on a first side of the substrate; the first patch connected to a first port;

d) a second patch on the first side of the substrate; the second patch separated from the first patch and connected to a second port;

wherein each of the first and second patches are further formed with a plurality of shorting vias connected to the ground; the plurality of shorting vias being separated from the first port and the second port, and adapted to realize a Radiation Pattern Decoupling (RPD) effect of the microstrip antenna.

2. The microstrip antenna of claim 1, wherein the first patch and the second patch each have a rectangular shape.

3. The microstrip antenna of claim 2, wherein a number of the plurality of the shorting vias is four on the first patch or the second patch.

4. The microstrip antenna of claim 3, wherein the plurality of the shorting vias on the first patch defines a rectangular shape nested in the rectangular shape of the first patch; and the plurality of the shorting vias on the second patch defines a rectangular shape nested in the rectangular shape of the second patch.

5. The microstrip antenna of claim 4, wherein the first port is not located within the rectangular shape defined by the plurality of the shorting vias on the first patch; and the second port being not located within the rectangular shape defined by the plurality of the shorting vias on the second patch.

6. The microstrip antenna of claim 2, wherein on each of the first patch and the second patch, the plurality of the shorting vias is divided into a first pair and a second pair; the first pair and the second pair being symmetrical about a virtual line which passes a corresponding one of the first port and the second port.

7. The microstrip antenna of claim 1, wherein the first patch and the second patch have a same shape and a same dimension.

8. The microstrip antenna of claim 1, wherein relative location of the first port on the first patch is the same as relative location of the second port on the second patch.

9. The microstrip antenna of claim 1, wherein relative locations of the plurality of the shorting vias on the first patch are the same as relative locations of the plurality of the shorting vias on the second patch.

10. The microstrip antenna of claim 1, wherein the first port or the second port is a coaxial probe.

11. The microstrip antenna of claim 1, wherein a slot structure is configured in the ground on the second side of the substrate.

12. The microstrip antenna of claim 11, wherein the slot structure surrounds at least one of the first and second patches.

13. The microstrip antenna of claim 12, wherein the slot structure forms a substantially "H" shape that encloses two sides of the first and second patches that face each other.

14. The microstrip antenna of claim 1, comprising a plurality of patches which includes the first and second patches; the number of the plurality of the patches being a square of N, wherein N is an integer equal to or larger than two.

15. The microstrip antenna of claim 14, wherein the plurality of the patches is configured on the substrate to form a square shape.

16. The microstrip antenna of claim 14, further comprises a plurality of dummy elements that surrounds the plurality of the patches.

17. The microstrip antenna of claim 14, wherein a slot structure is configured in the ground on the second side of the substrate.

18. The microstrip antenna of claim 17, wherein the slot structure comprises a plurality of periodical cross portions; the cross portions substantially enclose each of the plurality of the patches.

19. A multiple-input multiple-output (MIMO) antenna array, comprising a plurality of microstrip antennas according to claim 1.

* * * * *